US012166637B2

(12) United States Patent
Zhu et al.

(10) Patent No.: US 12,166,637 B2
(45) Date of Patent: Dec. 10, 2024

(54) MULTI-ACCESS MANAGEMENT SERVICE FRAMEWORKS FOR CLOUD AND EDGE NETWORKS

(71) Applicant: Intel Corporation, Santa Clara, CA (US)

(72) Inventors: Jing Zhu, Portland, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 17/923,170

(22) PCT Filed: Jun. 18, 2021

(86) PCT No.: PCT/US2021/038063
§ 371 (c)(1),
(2) Date: Nov. 3, 2022

(87) PCT Pub. No.: WO2021/257974
PCT Pub. Date: Dec. 23, 2021

(65) Prior Publication Data
US 2023/0353455 A1    Nov. 2, 2023

Related U.S. Application Data

(60) Provisional application No. 63/041,720, filed on Jun. 19, 2020.

(51) Int. Cl.
*H04L 41/0895* (2022.01)
*H04L 41/0806* (2022.01)

(52) U.S. Cl.
CPC ...... *H04L 41/0895* (2022.05); *H04L 41/0806* (2013.01)

(58) Field of Classification Search
CPC .............. H04L 41/0895; H04L 41/0806
See application file for complete search history.

(56) References Cited

U.S. PATENT DOCUMENTS

| 6,957,212 B2 * | 10/2005 | Peng .................. G06F 16/9574 |
| | | 707/821 |
| 8,949,501 B1 | 2/2015 | Akhter et al. |

(Continued)

FOREIGN PATENT DOCUMENTS

| EP | 3414932 A1 | 12/2018 |
| WO | WO 2015-152787 A1 | 10/2015 |

(Continued)

OTHER PUBLICATIONS

International Search Report and Written Opinion mailed Oct. 8, 2021 for International Patent Application No. PCT/US2021/039253, 12 pages.

(Continued)

*Primary Examiner* — Nicholas P Celani
(74) *Attorney, Agent, or Firm* — Schwabe, Williamson & Wyatt, P.C.

(57) ABSTRACT

The present disclosure is related to Multi-Access Management Services (MAMS), which is a programmable framework that provides mechanisms for the flexible selection of network paths in a multi-access (MX) communication environment, based on an application's needs. Generic Multi-Access (GMA) data plane functions are integrated into the MAMS framework to provide a virtual network connection that acts as the MAMS anchor connection. The virtual (anchor) connection is used for sending time-sensitive MAMS control/management messages. Virtual network configuration parameters are discussed in the present dis- (Continued)

closure, which are used for establishing and setting up the virtual (anchor) connection. Other embodiments may be described and/or claimed.

25 Claims, 17 Drawing Sheets

(56) References Cited

U.S. PATENT DOCUMENTS

| | | | |
|---|---|---|---|
| 9,398,121 | B1 | 7/2016 | Brandwine |
| 2003/0091054 | A1 | 5/2003 | Futenma |
| 2006/0168336 | A1 | 7/2006 | Koyanagi |
| 2010/0202323 | A1 | 8/2010 | Nishida |
| 2013/0246672 | A1 | 9/2013 | Saputra |
| 2014/0307593 | A1 | 10/2014 | Zhao et al. |
| 2015/0029879 | A1 | 1/2015 | Chou et al. |
| 2015/0078359 | A1 | 3/2015 | Scahill et al. |
| 2015/0215835 | A1 | 7/2015 | Sirotkin |
| 2016/0112896 | A1 | 4/2016 | Karampatsis |
| 2016/0270145 | A1* | 9/2016 | Srinivasa Gopalan ............ H04L 67/51 |
| 2016/0381491 | A1 | 12/2016 | Watfa et al. |
| 2017/0019830 | A1 | 1/2017 | Lindoff et al. |
| 2017/0093541 | A1 | 3/2017 | Pan et al. |
| 2018/0027508 | A1 | 1/2018 | Tanaka |
| 2018/0077022 | A1 | 3/2018 | Van Oost et al. |
| 2018/0092085 | A1 | 3/2018 | Shaheen et al. |
| 2018/0018385 | A1 | 6/2018 | Sabella et al. |
| 2018/0270742 | A1 | 9/2018 | Bergstrom et al. |
| 2019/0036841 | A1 | 1/2019 | Nolan |
| 2019/0306749 | A1 | 10/2019 | Bergstrom et al. |
| 2019/0306752 | A1 | 10/2019 | Lai |
| 2019/0394833 | A1 | 12/2019 | Talebi Fard et al. |
| 2020/0045612 | A1 | 2/2020 | Stauffer et al. |
| 2020/0053018 | A1 | 2/2020 | White et al. |
| 2020/0178196 | A1 | 6/2020 | Wang et al. |
| 2021/0051104 | A1 | 2/2021 | He |
| 2021/0058936 | A1 | 2/2021 | Gordaychik |
| 2021/0100047 | A1 | 4/2021 | Chiba et al. |
| 2021/0144590 | A1 | 5/2021 | Li |
| 2021/0211914 | A1 | 7/2021 | De La Oliva et al. |
| 2021/0306900 | A1 | 9/2021 | Mehta |
| 2021/0385865 | A1 | 12/2021 | Mueck |
| 2021/0400537 | A1 | 12/2021 | Zhang et al. |
| 2021/0409335 | A1 | 12/2021 | Zhu et al. |
| 2022/0191733 | A1 | 6/2022 | Ali et al. |
| 2023/0056442 | A1 | 2/2023 | Ly et al. |
| 2023/0189368 | A1 | 6/2023 | Zhou |
| 2023/0276483 | A1 | 8/2023 | Xu et al. |

FOREIGN PATENT DOCUMENTS

| | | |
|---|---|---|
| WO | WO2017/139699 A1 | 8/2017 |
| WO | 2017-189176 A2 | 11/2017 |
| WO | 2019-076440 A1 | 4/2019 |
| WO | WO 2019-192528 A1 | 10/2019 |
| WO | WO 2020/232404 A1 | 11/2020 |
| WO | WO2021/257974 A1 | 12/2021 |
| WO | WO2022005917 A1 | 1/2022 |
| WO | WO2022005918 A1 | 1/2022 |

OTHER PUBLICATIONS

"3rd Generation Partnership Project; Technical Specification Group Services and System Aspects; Study on access traffic steering, switch and splitting support in the 5G system architecture (Release 16)", 3GPP TR 23.793 V16.0.0 (Dec. 19, 2018), 114 pages.

"3rd Generation Partnership Project; Technical Specification Group Services and System Aspects; Study on Access Traffic Steering, Switch and Splitting support in the 5G system architecture Phase 2 (Release 17)", 3GPP TR 23.700-93 V0.1.1 (Jun. 23, 2020), 43 pages.

International Preliminary Report on Patentability mailed Jan. 12, 2023 for International Patent Application No. PCT/US2021/039253, 7 pages.

International Search Report and Written Opinion mailed Nov. 19, 2021 for International Patent Application No. PCT/US2021/039252, 13 pages.

International Preliminary Report on Patentability mailed Jan. 12, 2023 for International Patent Application No. PCT/US2021/039252, 8 pages.

U.S. Appl. No. 63/025,086 "Dynamic Traffic Management in Next Generation Multi-Access Management Service Frameworks", filed May 14, 2020, 78 pages.

U.S. Appl. No. 17/922,947 "Ran-Aware Traffic Distribution Rules and Ran Measurements for Enhanced Access Traffic Steering Switching and Splitting ", filed Nov. 2, 2022, 92 pages.

U.S. Appl. No. 17/925,430 "Wireless Local Area Network Enhancements for Access Traffic Steering Switching Splitting", filed Nov. 15, 2022, 64 pages.

"3rd Generation Partnership Project; Technical Specification Group Services and System Aspects; System architecture for the 5G System (5GS); Stage 2 (Release 15)", 3GPP TS 23.501 V15.9.0 (Mar. 27, 2020), 248 pages.

A. Ford et al., "RFC 8684 TCP Extensions for Multipath Operation with Multiple Addresses": http://tools.ietf.org/html/draft-ietf-mptcp-multiaddressed-09, 6 pages (Mar. 2020).

"3rd Generation Partnership Project; Technical Specification Group Services and System Aspects; Management and orchestration; 5G performance measurements (Release 16)", 3GPP TS 28.552 V16.5.0 (Mar. 27, 2020), 173 pages.

"3rd Generation Partnership Project; Technical Specification Group Radio Access Network; Evolved Universal Terrestrial Radio Access (E-UTRA); Layer 2—Measurements (Release 15)", 3GPP TS 36.314 V15.2.0 (Jan. 11, 2019), 28 pages.

"IEEE Standard for Information technology—Telecommunications and information exchange between systems Local and metropolitan area networks-Specific requirements—Part 11: Wireless LAN Medium Access Control (MAC) and Physical Layer (PHY) Specifications," IEEE Std 802.11-2016, 3534 pages (Dec. 14, 2016).

Wi-Fi Alliance, "Wi-Fi Agile Multiband Technical Specification", Version 1.5, 32 pages (2020).

Wi-Fi Alliance, "Optimized Connectivity Specification", Version 1.1.6, 26 pages (2020).

International Search Report and Written Opinion mailed Apr. 15, 2021 for International Patent Application PCT/US2020/066969, 13 pages.

International Preliminary Report on Patentability mailed Oct. 13, 2022 for International Patent Application PCT/US2020/066969, 8 pages.

Extended European Search Report mailed Apr. 14, 2023 for European Patent Application No. 22203400.1, 13 pages.

Extended European Search Report mailed May 10, 2023 for European Patent Application No. 20806061.6, 11 pages.

S. Kanugovi Nokia e al., "Multiple Access Management Services; Draft-Kanugovi-intarea-mams-fraaework-03", (Feb. 28, 2019), 141 pages.

3GPP, "3rd Generation Partnership Project; Technical Specification Group Services and System Aspects; Study on access traffic steering, switch and splitting support in the 5G system architecture (Release 16)", 3GPP TR 23.793 V16.0.0 (Dec. 2018), 114 pages.

Sangeetha Bangolae et al., "Performance Study of Fast BSS Transition using IEEE 802.11r", Proceedings of the 2006 Int'l Conference on Wireless Comm. and Mobile Computing (IWCMC '06), pp. 737-742 (Jul. 3, 2006), https://dl.acm.org/doi/pdf/10.1145/1143549.1143696.

"Wi-Fi Roaming Aggressiveness Setting", Intel Corporation, Article ID 000005546, 2 pages (Oct. 28, 2021).

Yordan, "Oppo and vivo announce Dual Wi-Fi for their flagships", GSMArena.com, 3 pages (Jul. 18, 2019), https://www.gsmarena.com/oppo_vivo_dual_wifi-news-38203.php.

Q. De Coninck et al., "Multipath Extensions for QUICc (MP-QUIC)", IETF, draft-deconinck-quic-multipath-07, 36 pages (May 3, 2021), https://datatracker.ietf.org/doc/html/draft-deconinck-quic-multipath-07.

(56) References Cited

OTHER PUBLICATIONS

J. Zhu et al., "Generic Multi-Access (GMA) Encapsulation Protocol", IETF, draft-zhu-intarea-gma-14, 17 pages (Nov. 24, 2021), https://datatracker.ietf.org/doc/html/draft-zhu-intarea-gma-14.
J. Zhu et al., "User-Plane Protocols for Multiple Access Management Service", IETF, draft-zhu-intarea-mams-user-protocol-09, 8 pages (Mar. 4, 2020).
"3rd Generation Partnership Project; Technical Specification Group Core Network and Terminals; 5G System; Access Traffic Steering, Switching and Splitting (ATSSS); Stage 3 (Release 17)", 3GPP TS 24.193 v17.2.0 (Sep. 24, 2021), 71 pages.
"3rd Generation Partnership Project; Technical Specification Group Core Network and Terminals; Access Network Discovery and Selection Function (ANDSF) Management Object (MO) (Release 16)", 3GPP TS 24.312 v16.0.0 (Jul. 9, 2020), 394 pages.
"3rd Generation Partnership Project; Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 16)", 3GPP TS 36.361 v16.0.0 (Jul. 24, 2020), 10 pages.
International Search Report and Written Opinion mailed Aug. 31, 2020 for International Patent Application No. PCT/US2020/033261, 14 pages.
International Preliminary Report on Patentability mailed Nov. 25, 2021 for International Patent Application No. PCT/US2020/033261, 10 pages.
"Study on access traffic steering, switch and splitting support in the 5G system architecture (Release 16)", 3GPP TR 23.793 V16.0.0, 115 pages (Dec. 19, 2018).
S. Kanugovi et al., Multiple Access Management Services, IETF, draft-kanugovi-intarea-mams-framework-03, 156 pages (Feb. 28, 2019).
S. Kanugovi et al., Multiple Access Management Services, draft-kanugovi-intarea-mams-framework-04, May 31, 2019, 122 pages.
J. Zhu et al., "User-Plane Protocols for Multiple Access Management Service", IETF, draft-zhu-intarea-mams-user-protocol-07, 14 pages (Apr. 3, 2019).
"3rd Generation Partnership Project; Technical Specification Group Services and System Aspects; System Architecture for the 5G System; Stage 2 (Release 16)", 3GPP Ts 23.501 V16.1.0, 368 pages (Jun. 2019).
"3rd Generation Partnership Project; Technical Specification Group Core Network and Terminals; 5G System; Access and Mobility Management Services; Stage 3 (Release 16)", 3GPP TS 29.518 V16.0.0, 199 pages (Jun. 2019).
"Multi-access Edge Computing (MEC); Framework and Reference Architecture Disclaimer", ETSI GS MEC 003 V2.1.1, 21 pages (Jan. 2019).
"Multi-access Edge Computing (MEC); Phase 2: Use Cases and Requirements", ETSI GS MEC 002 V2.1.1, 66 pages (Oct. 2018).
"Mobile Edge Computing(MEC); Bandwidth Management API", ETSI GS MEC 015 V1.1.1, 20 pages (Oct. 2017).
"3rd Generation Partnership Project; Technical Specification Group Core Network and Terminals; 5G System; Network Exposure Function Northbound APIs; Stage 3 (Release 16)", 3GPP TS 29.522 V16.0.0, 43 pages (Jun. 2019).
"Multi-access Edge Computing (MEC); General principles for MEC Service APIs Disclaimer", ETSI GS MEC 009 V2.1.1, 64 pages (Jan. 2019).
"3rd Generation Partnership Project; Technical Specification Group Services and System Aspects; System Architecture for the 5G System; Stage 2 (Release 16)" 3GPP TS 23.501 V16.0.2, 317 pages (Apr. 2019).
"3rd Generation Partnership Project; Technical Specification Group Core Network and Terminals; 5G System; Access and Mobility Management Services; Stage 3 (Release 15)", 3GPP TS 29.518 V15.3.0, 195 pages (Mar. 2019).
"Mobile Edge Computing (MEC); Radio Network Information API Disclaimer", ETSI GS MEC 012 V1.1.1, 57 pages (Jul. 2017).
G. Dommety, "Key and Sequence Number Extensions to GRE", Internet Engineering Task Force (IETF) RFC 2890, 7 pages (Sep. 2000).
A. Huttunen et al., "UDP Encapsulation of IPsec ESP Packets", Internet Engineering Task Force (IETF) RFC 3984, 15 pages (Jan. 2005).
A. Ford et al., "TCP Extensions for Multipath Operation with Multiple Addresses", Internet Engineering Task Force (IETF) RFC 6824, 64 pages (Jan. 2013).
N. Leymann et al., "Huawei's GRE Tunnel Bonding Protocol", Internet Engineering Task Force (IETF) RFC 81557, 44 pages (May 2017).
S. Kanugovi et al., "Multi-Access Management Services (MAMS)", Internet Engineering Task Force (IETF) RFC 8743, 143 pages (Mar. 2020).
J. Zhu et al., "Generic Multi-Access (GMA) Encapsulation Protocol", Internet Engineering Task Force (IETF) RFC 9188, 15 pages (Feb. 2022).
Kanugovi et al., "Control Plane Protocols and Procedures for Multiple Access Management Services", IETF, draft-zhu-intarea-mams-control-protocol-02 (Jul. 3, 2017), 31 pages.
Li et al., "Multipath Transmission for Internet: A Survey", 39 pages, IEEE Communications Surveys & Tutorials, vol. 18, No. 4, Fourth Quarter 2016, pp. 2887-2925 (Jun. 29, 2016).
"TCP Keep-Alives" in Braden, "Requirements for Internet Hosts—Communication Layers", IETF RFC 1122, section 4.2.3.6, pp. 101-102 (Oct. 1, 1989), 2 pages.
J. Zhu et al., "Generic Multi-Access (GMA) Encapsulation Protocol", IETF, draft-zhu-intarea-gma-07, 13 pages (May 14, 2020).
Kanugovi et al., "Multi-Access Management Services (MAMS)", IETF RFC 8743, 143 pages (Mar. 2020).
International Search Report and Written Opinion mailed Oct. 6, 2021 for International Patent Application No. PCT/US2021/038063, 14 pages.
"3GPP; TSG SA; Study on enhanced support of Industrial Internet of Things (IIoT) in 5G System (Release 17)", 3GPP TR 23.700-20 V0.3.0 (Jan. 28, 2020).
Hsieh et al., "5G Virtualized Multi-access Edge Computing Platform for IoT Applications", Journal of Network and Computer Applications, vol. 115, pp. 94-102 (available online: May 10, 2018), http://www.abderrahimbenslimane.org/public/pdf/180.pdf.
Office Action mailed Mar. 6, 2024 for U.S. Appl. No. 17/469,331, 96 pages.
Nádas et al., "Per Packet Value: A Practical Concept for Network Resource Sharing", 2016 IEEE Global Communications Conference (GLOBECOM), pp. 1-7 (Dec. 4, 2016).
Laki et al., "Take your own share of the PIE", Proceedings of the Applied Networking Research Workshop, pp. 27-32 (Jul. 15, 2017).
Nádas et al., "Towards a congestion control-independent core-stateless AQM", Proceedings of the Applied Networking Research Workshop, pp. 84-90 (Jul. 16, 2018).
Laki et al., "Scalable Per Subscriber QoS with Core-Stateless Scheduling", ACM SIGCOMM Industrial Demos, 2 pages (2018).
Nádas et al., "Stateless resource sharing in networks with multilayer virtualization", 2019 IEEE International Conference on Communications (ICC), pp. 1-7 (May 20, 2019).
Nádas et al., "Towards core-stateless fairness on multiple timescales", Proceedings of the Applied Networking Research Workshop, pp. 30-36 (Jul. 22, 2019).
Fejes et al., "Decoupling delay and resource sharing targets with efficient core-stateless AQM", Proceedings of the ACM SIGCOMM 2019 Conference Posters and Demos, pp. 128-130 (Aug. 19, 2019).
Fejes et al., "Who will Save the Internet from the Congestion Control Revolution?", Workshop on Buffer Sizing, Stanford University, 6 pages (2019), http://ppv.elte.hu/buffer-sizing/.
Fejes et al., "On the Incompatibility of Scalable Congestion Controls over the Internet", 2020 IFIP Networking Conference (Networking), IEEE, pp. 749-754 (Jun. 22, 2020), http://ppv.elte.hu/scalable-cc-comp/.
Nádas et al., A congestion control independent L4S scheduler. Proceedings of the Applied Networking Research Workshop, pp. 45-51 (Jul. 27, 2020).

(56) References Cited

OTHER PUBLICATIONS

Laki et al., "Core-Stateless Forwarding With QoS Revisited: Decoupling Delay and Bandwidth Requirements", IEEE/ACM Transactions on Networking 29, No. 2, pp. 503-516 (Dec. 9, 2020).
Fejes et al., "A Core-Stateless LAS Scheduler for P4-enabled hardware switches with emulated HQoS", IEEE Infocom 2021 Demo (Virtual), 2 pAGES (2021), http://ppv.elte.hu/ic21/.
Bemten et al., "Network Calculus: A Comprehensive Guide", Technical Report No. 201603, 57 pages (Oct. 8, 2016).
Charny et al., "Delay Bounds in a Network with Aggregate Scheduling", International Workshop on Quality of Future Internet Services 2000 (QoFIS'2000), Springer Berlin, Heidelberg, pp. 1-13 (Sep. 25, 2000).
Zhu et al., "Generic Multi-Access (GMA) Encapsulation Protocol", IETF INTAREA/Network Working Group, draft-zhu-Intarea-gma-07, 13 pages (May 14, 2020), https://datatracker.ietf.org/doc/pdf/draft-zhu-intarea-gma-07.
Feng et al., "The BLUE active queue management algorithms", IEEE/ACM Transactions on Networking, vol. 10, No. 4, pp. 513-528, 19 pages, (Aug. 2002).
Maad Hamdi et al., "A review on Queue Management Algorithms in Large Networks", 2nd International Scientific Conference of Engineering Sciences, vol. 1076, No. 1, p. 012034, 13 pages (2020).
Nichols et al., "Definition of the Differentiated Services Field (DS Field) in the IPV4 and IPV6 Headers", IETF RFC 2474, 20 pages (Dec. 1998).
Ramakrishnan et al., "The Addition of Explicit Congestion Notification (ECN) to IO", IETF RFC 3168, 63 pages (Sep. 2001).
Amante et al., "IPv6 Flow Label Specification", IETF RFC 6437, 15 pages (Nov. 2011).
Black, "Relaxing Restrictions on Explicit Congestion Notification (ECN) Experimentation", IETF RFC 8311, 20 pages (Jan. 2018).
Fairhurst, "Update to IANA Registration Procedures for Pool 3 Values in the Differentiated Services Field Codepoints (DSCP) Registry", IETF RFC 8436, 7 pages (Aug. 2018).
Zhu et al., "Improving QoE for Skype Video Call in Mobile Broadband Network", 2012 IEEE Global Communications Conference (GLOBECOM), Anaheim, CA, pp. 1938-1943, 6 pages (2012).
Nikc Mckeown et al., "Tiny Tera: A Packet Switch Core", IEEE Micro, IEEE Service Center, Los Alamitos, CA, US deel 17, nr.1, (Jan. 1, 1997), 8 pages.
S. Kanugovi et al., "Multi-Access Management Services (MAMS)", rtc8743.txt, Multi-Access Management Services (MAMS); RFC8743. TXT, Internet Engineering Task Force, IETF; Standard, Internei Society (ISOC) 4, Rue Des Falaises CH-1205 Geneva, Switzerland, (Mar. 25, 2020), 73 pages.
Boyd et al., "Convex Optimization", Cambridge University Press, Cambridge, UK, ISBN: 978-0-521-83378-3, 730 pages (Mar. 2004).
"Mobile Edge Computing (MEC); Radio Network Information API", ETSI GS MEC 012 V1.1.1, 57 pages (Jul. 2017).
"Multi-access Edge Computing (MEC); Radio Network Information API", ETSI GS MEC 012 V2.1.1, 66 pages (Dec. 2019).
Ford et al., "TCP Extensions for Multipath Operation with Multiple Addresses", Internet Engineering Task Force (IETF), Internet Draft, draft-ietf-mptcp-multiaddressed-09, 62 pages (Jun. 6, 2012), https://datatracker.ietf.org/doc/html/draft-etf-mptcp-multiaddressed-09.
"Intel® Network Edge Virtualization (NEV) Software Development Kit", Intel Corp., Intel® Network Edge Virtualization Product Brief, 3 pages (Aug. 16, 2015), https://networkbuilders.intel.com/docs/Intel_Wireless_Product_Brief_for_IDF_v8.pdf.
"Simplify Application Development for the Network Edge", Intel Corp., Service Provider NFV, White Paper, 5 pages (Sep. 26, 2018), https://www.intel.com/content/dam/www/public/us/en/documents/white-papers/nev-sdk-white-paper.pdf.
"O-RAN Architecture Description", O-RAN Alliance, O-RAN-WG1-O-RAN Architecture Description, v01.00.00, 24 pages (Feb. 2020).
"O-RAN Working Group 2, AI/ML workflow description and requirements", O-RAN Alliance, ORAN-WG2.AIML, v01.00, 34 pages (Dec. 2019).
Singh et al., "Optimal Traffic Aggregation in Multi-RAT Heterogeneous Wireless Networks", IEEE ICC2016-Workshops: W09-Workshop on 5G RAN Design, 6 pages (Mar. 7, 2016).
Zhu et al., "Generic Multi-Access (GMA) Convergence Encapsulation Protocols", INTAREA/Network Working Group, Internet Draft, draft-zhu-intarea-gma-04, 10 pages (Sep. 30, 2019), https://datatracker.ietf.org/doc/pdf/draft-zhu-intarea-gma-04.
Zhu et al., "Generic Multi-Access (GMA) Convergence Encapsulation Protocols", INTAREA/Network Working Group, Internet Draft, draft-zhu-intarea-gma-05, 12 pages (Dec. 16, 2019), https://datatracker.ietf.org/doc/pdf/draft-zhu-intarea-gma-05.
International Preliminary Report on Patentability mailed Dec. 29, 2022 for International Patent Application PCT/US2021/038063, 10 pages.
Extended European Search Report issued Jun. 14, 2024 for EP Application No. 21825017.3, 4 pages.
Deutsche Bahn AG, "Exemplary Mapping of 3GPP Building Blocks to FRMCS Logical Architecture Draft," ETSI Draft RT(19)075028r3, ETSI, Dec. 12, 2019, 13 pages.
Office Action mailed Jun. 21, 2024 for U.S. Appl. No. 17/437,711, 96 pages.
Notice of Allowance mailed Aug. 20, 2024 for U.S. Appl. No. 17/469,331, 21 pages.
Office Action mailed Sep. 18, 2024 for U.S. Appl. No. 17/797,661, 72 pages.

\* cited by examiner

MULTI-ACCESS MANAGEMENT SERVICE FRAMEWORKS FOR CLOUD AND EDGE NETWORKS

RELATED APPLICATIONS

The present application is a national phase entry under 37 U.S.C. § 371 of Int'l App. No. PCT/US2021/038063, filed Jun. 18, 2021, which designated, among various States, the United States of America and which claims priority to U.S. Provisional App. No. 63/041,720 filed Jun. 19, 2020, the contents of each of which are hereby incorporated by reference in its entirety their entireties and for all purposes.

TECHNICAL FIELD

The present application is generally related to edge computing, network communication, and communication system implementations, and in particular, to Multiple Access Management Services (MAMS) systems/networks, Generic Multi-Access (GMA), and/or edge computing systems and networks.

BACKGROUND

Internet of Things (IoT) devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated. The deployment of IoT devices and edge computing services, such as Multi-access Edge Computing (MEC), have introduced a number of advanced use cases and scenarios occurring at or otherwise involving the edge of the network. However, these advanced use cases have also introduced a number of corresponding technical challenges related to security, processing/computing resources, network resources, service availability and efficiency, among many other issues.

Multiple Access Management Services (MAMS) is a programmable framework that provides mechanisms for flexible selection of network paths in a multi-connection (access) communication environment based on application needs and/or requirements. The MAMS framework can be supported by an edge computing system/network, such as ETSI MEC or the like. Additionally, the Third Generation Partnership Project (3GPP) Fifth Generation (5G) system architecture has been extended to support functionality similar to MAMS, which is referred to as Access Traffic Switching, Steering, and Splitting (ATSSS).

BRIEF DESCRIPTION OF THE DRAWINGS

In the drawings, which are not necessarily drawn to scale, like numerals may describe similar components in different views. Like numerals having different letter suffixes may represent different instances of similar components. Some implementations are illustrated by way of example, and not limitation, in the figures of the accompanying drawings in which.

DETAILED DESCRIPTION

Figure 1A:
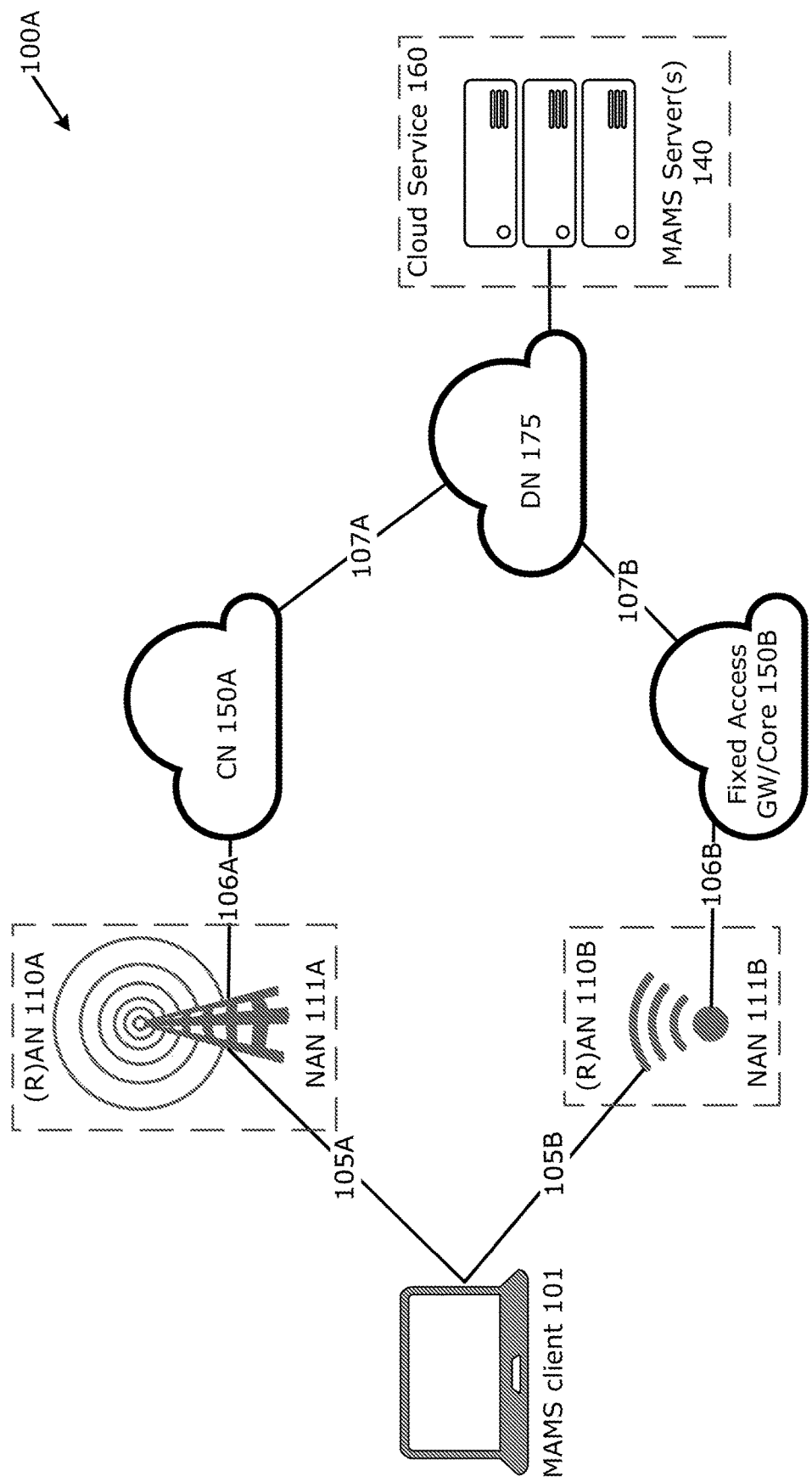
FIG. 1A depicts an example Over-The-Top (OTT) MAMS Service Model.

The present specification generally relates to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment. The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the present disclosure. However, it will be apparent to those skilled in the art having the benefit of the present disclosure that the various aspects of the present disclosure may be practiced in other ways that depart from the specific details discussed herein. In certain instances, descriptions of well-known devices, circuits, and methods are omitted so as not to obscure the description with unnecessary detail.

1. Multiple Access Management Services (MAMS) and Generic Multi-Access (GMA)

Today, a device (e.g., mobile stations, user equipment (UEs), etc.) can be simultaneously connected to multiple communication networks based on different technology implementations (including different Radio Access Technologies (RATs)) and network architectures. In such multi-connectivity scenarios, it may be desirable to combine multiple access networks or select the best one to improve quality of experience (QoE) for a user and improve overall network utilization and efficiency. An access network is the segment in a network that delivers user data packets to a client via an access link such as a WiFi airlink, an cellular airlink, or DSL. The overall QoE perceived by the end users as well as utilization of the resources can be optimized with smart selection and combination of the paths used for the user plane (UP). In an advanced solution, the network paths can be dynamically selected based on knowledge of current conditions in the relevant access networks. The Multiple Access Management Services (MAMS) framework enables the smart selection and flexible combination of access and core network paths based on defined policies. By use of up-to-date information from available access networks, the best possible network efficiency and end user QoE perception based on application needs can be guaranteed. The MAMS framework can be used to flexibly select the combination of uplink (UL) and downlink (DL) access and core network paths having an optimal performance, and UP treatment for improving network utilization and efficiency and enhanced QoE for user applications (apps). With the MAMS framework, the optimal network paths can selected on UP level without any impact on the control plane signaling of the underlying access networks. Aspects of the MAMS framework are discussed in Kanugovi et al., "Multi-Access Management Services (MAMS)", Internet Engineering Task Force (IETF), Request for Comments (RFC) 8743 (March 2020) ("[RFC8743]"), and an example multi-access (MA) network implementing the MAMS framework is shown by FIGS. 1A and 1B.

Figure 1B:
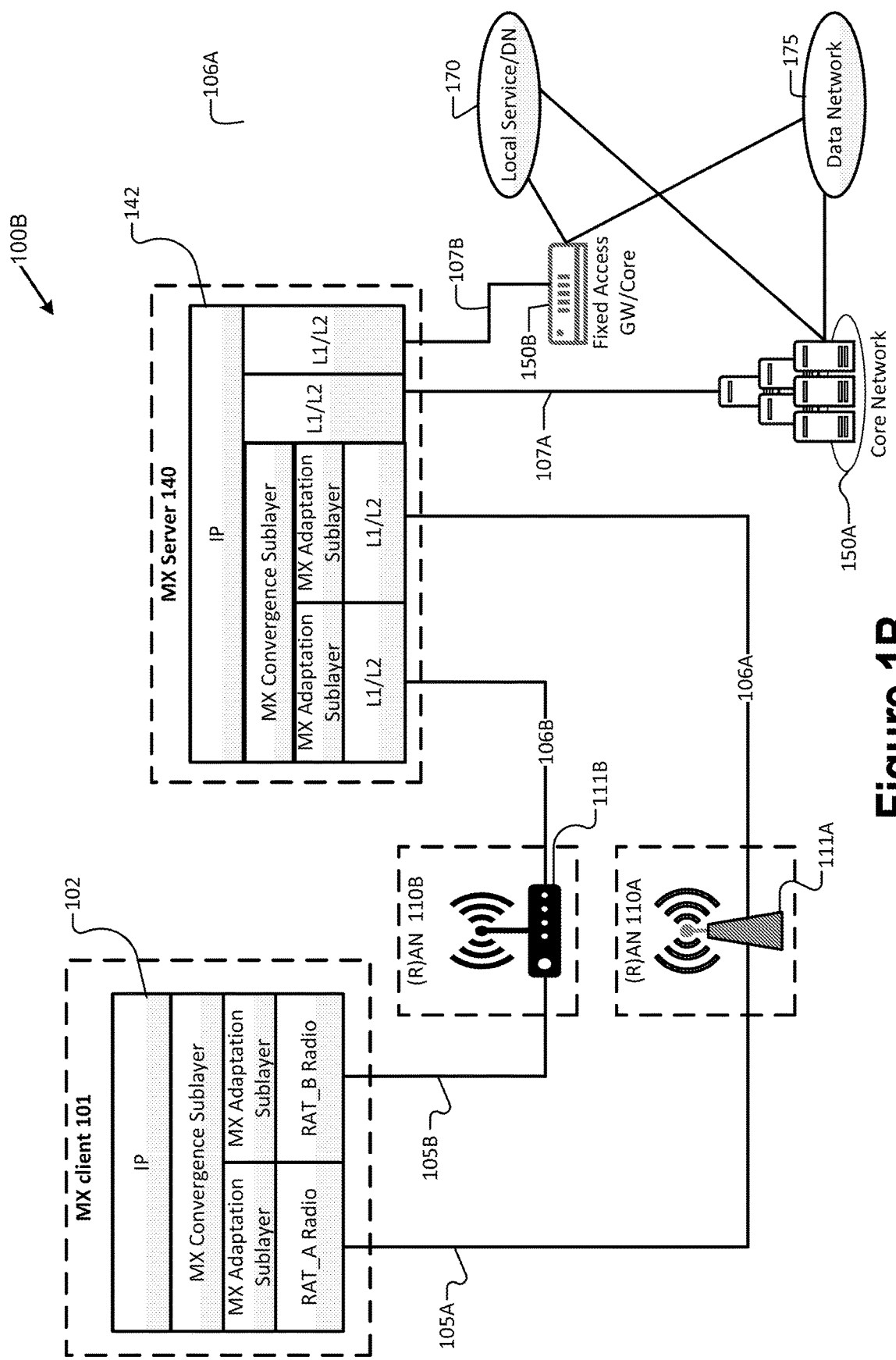
FIG. 1B depicts an example multi-access network utilizing Multiple Access Management Services (MAMS) technology.

FIG. 1A depicts an Over-The-Top (OTT) MAMS Service Model 100A. In this example, a MAMS server 140 runs in the cloud as part of cloud service 160 (e.g., Amazon Web Services®, Microsoft® Azure® (MSFT), Google®, Facebook®, etc.) instead of in the (radio) access network ((R) AN) 110a, 110b (e.g., 3GPP 5G, 3GPP LTE, WiFi, DSL, etc.), and can deliver traffic between client 101 and server 140 over multiple connections or paths.

The client 101, also referred to as a user device, user equipment (UE), and/or the like, is an end-user device that supports connections with multiple access nodes 111, possibly over different access technologies. The client 101 may be a Multiconnectivity client 101 that has, or supports, multiple network connections.

The access networks 110a, 110b is/are the segment in the network that delivers user data packets to the client via an access link such as a Wi-Fi airlink, an LTE airlink, or DSL. Each (R)AN 110a, 110b includes one or more respective network access nodes (NANs) 111a, 111b, which is/are communicatively coupled with/to a respective back-end network. One way to implement this service model is to use a multi-path Layer-4 (transport) solution such as Multi-Path TCP (see e.g., IETF RFC 6824 (January 2013)("[rfc6824]")) or MultiPath QUIC (MPQUIC) (see e.g., De Coninck et al., "Multipath Extensions for QUIC (MP-QUIC)," draft-deconinck-quic-multipath-07, IETA, QUIC Working Group (3 May 2021) ("[MPQUIC]")). Such solution is usually OS dependent and only applicable to specific application/traffic. Moreover, it operates at the individual flow level and offer suffers from high complexity & low efficiency. Recently, a new Layer-3 solution (see e.g., Zhu et al., "User-Plane Protocols for Multiple Access Management Service," draft-zhu-intarea-mams-user-protocol-09, IETA, INTAREA (4 Mar. 2020) ("[UPMAMS]")) has been proposed to support multi-path management without such limitations and drawback. Here, the addition control information for multi-path management (e.g., sequence number, etc.) is appended as a trailer at the end of IP packet.

As mentioned previously, MAMS is a programmable framework that provides mechanisms for flexible selection of network paths in a multi-connection (access) communication environment, based on application needs. It leverages network intelligence and policies to dynamically adapt traffic distribution across selected paths and user plane treatment to changing network/link conditions. The network path selection and configuration messages are carried as user plane data between the functional elements in the network and the end-user device, and thus without any impact to the control plane signaling schemes of the individual access network. Today's MAMS solutions require deploying MAMS control and data plane network functions in the network [RFC8743]. The present disclosure extends the MAMS framework to support OTT MAMS (e.g., lossless switching, aggregation, etc.) without any change or dependency in network. The OTT MAMS can run as part of MAMS hosted on a cloud computing service/platform, an edge computing platform/service (e.g., ETSI MEC, and/or the like), and/or using suitable Virtual Machines (VMs) and/or containers provided by such a cloud computing service/platform and/or edge computing platform/service.

Furthermore, as the mobile and/or wireless access technologies and networks continue to evolve, it is becoming clear that no single radio technology will be able to meet the variety of requirements for human and machine communications. On the other hand, driving more data through a scarce and finite radio spectrum becomes a real challenge, and spectrum efficiency is approaching a plateau and will not deliver the needed increase in bandwidth improvement itself. For example, 3GPP 5G cellular technology is likely to utilize frequencies below 6 Gigahertz (GHz) as well as millimeter wave ("mmWave" or "MMW"), in both licensed and unlicensed bands. The present disclosure also provides a Software-Defined, Access-Agnostic, and High-Performance solution to such issues, which is referred to herein as Generic Multi-Access (GMA) to enable integration of multiple (heterogeneous or homogeneous) radio access networks and RATs at the edge, without impacting existing RAT protocol stacks (e.g. PDCP, RRC, Ethernet, etc.) or existing network protocols (e.g., internet protocol (IP), transmission control protocol (TCP), user datagram protocol (UDP), Quick UDP Internet Connections (QUIC), etc.). GMA may be considered a Layer 2.5 protocol. The present disclosure describes various GMA e2e network architecture, protocols, procedures, algorithms, and system functionalities as well as deployment implementations.

Figure 1C:
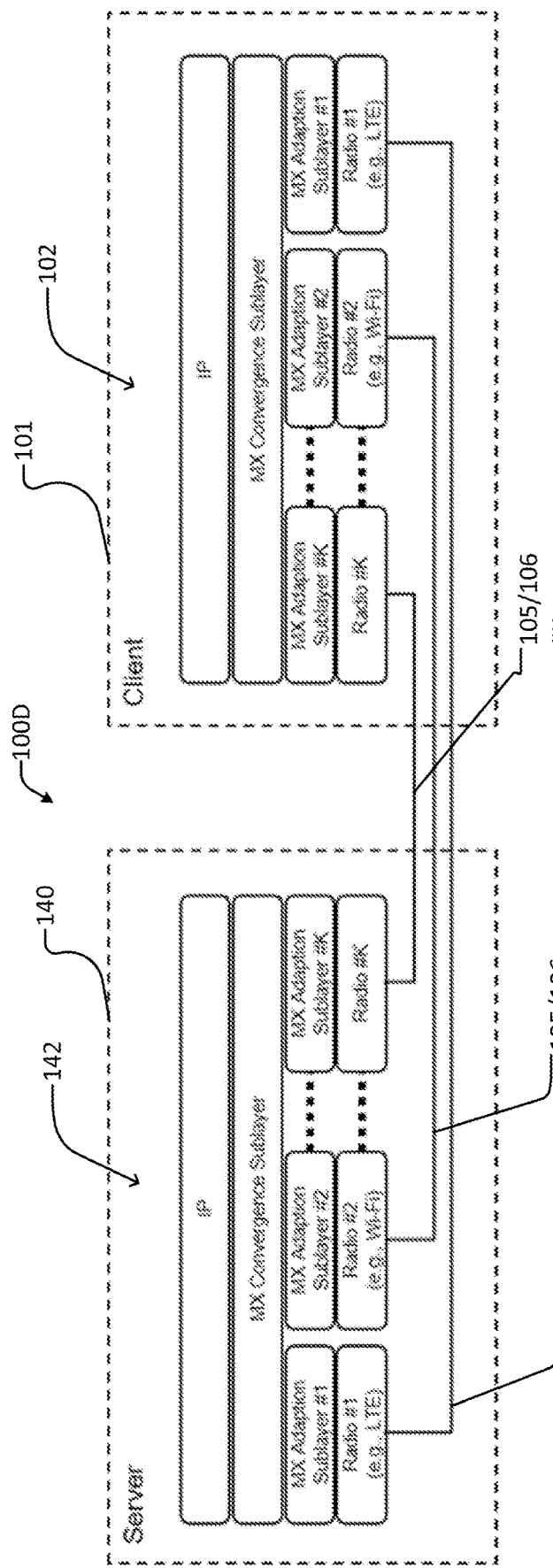
FIGS. 1C and 1D depict MAMS Data Plane Protocol Stacks (DPPS).
Figure 1D:
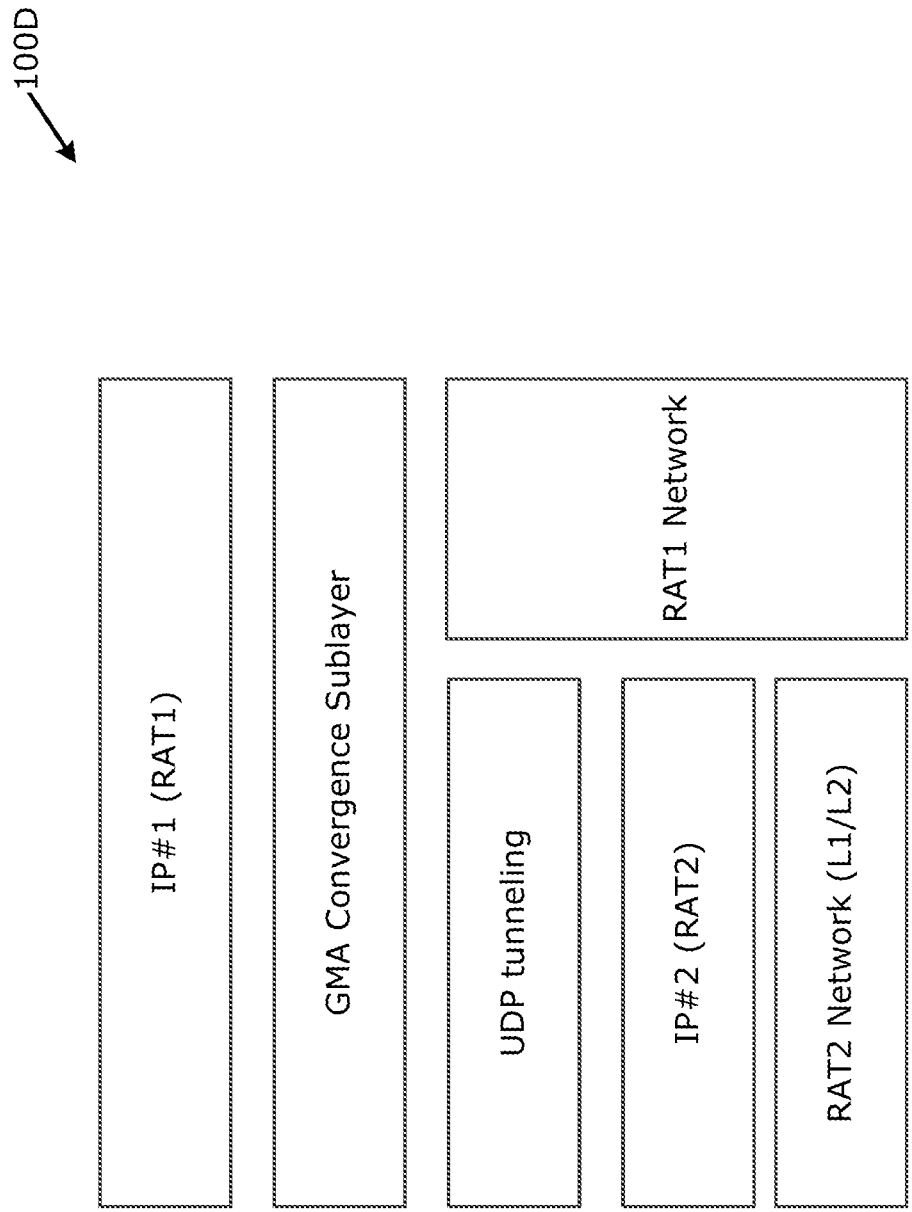

FIG. 1D depicts an example data plane protocol stack 100D, which includes RAT1 connection as the anchor connection for applications, and a RAT2 connection only as the delivery connection. In one example, RAT1 is a cellular RAT such as 5G/NR, LTE, and/or the like, and RAT2 is a WLAN RAT such as WiFi or the like. UDP tunneling (with or without Datagram Transport Layer Security (DTLS) (see e.g., [DTLS])) or IP Security Protocol (IPSec) may be used for delivering RAT1 IP traffic over a RAT2 network. The GMA convergence (also referred to as Trailer-based MAMS convergence [UPMAMS]) sublayer is responsible for multi-path management operations, e.g. lossless switching, aggregation/splitting, etc. However, such solution does not work for the OTT MAMS service model, in which the access network 110 does not support any MAMS network function. The present disclosure provides solutions to address this issue. Specifically, as discussed in more detail infra, a virtual connection is established between an end-device (e.g., client device 101) and cloud server 160 (or edge server). This virtual connection may then be used as the anchor connection for cloud applications (or edge applications). Additionally or alternatively, the virtual (anchor) connection is established for sending time-sensitive MAMS control/management messages (e.g., probes, traffic splitting updates, etc.) The (virtual) packets carrying a GMA control/management messages are also encapsulated with the GMA header, which is also discussed in more detail infra.

FIG. 1B depicts an example multi-access ("MX" or "MA") network 100B utilizing MAMS technology. In particular, FIG. 1B shows a MAMS e2e UP protocol stack in the MX network 100, which includes both WiFi and 3GPP-based access. In this example, an MX client 101 includes a UP protocol stack 102 and a server 140 includes a UP protocol stack 142. The MX client 101 is an end-user device that supports connections with multiple access nodes, possibly over different access technologies (or RATs), and is also referred to as a user station, user device, user equipment (UE), or multi-radio UE 101.

The MX server 140 (or "MAMS server 140") provides MAMS-related UP functionalities and/or optimizations in the network 100. The MX server 140 handles aggregation of multiple network paths 105, 106, 107, and/or the forwarding of user data traffic across multiple network paths 105, 106, 107. The MX server 140 may also be referred to as an MX gateway and/or a Network Multi Access Data Proxy (N-MADP) (see e.g., N-MADP 237 in FIG. 2).

Figure 9:
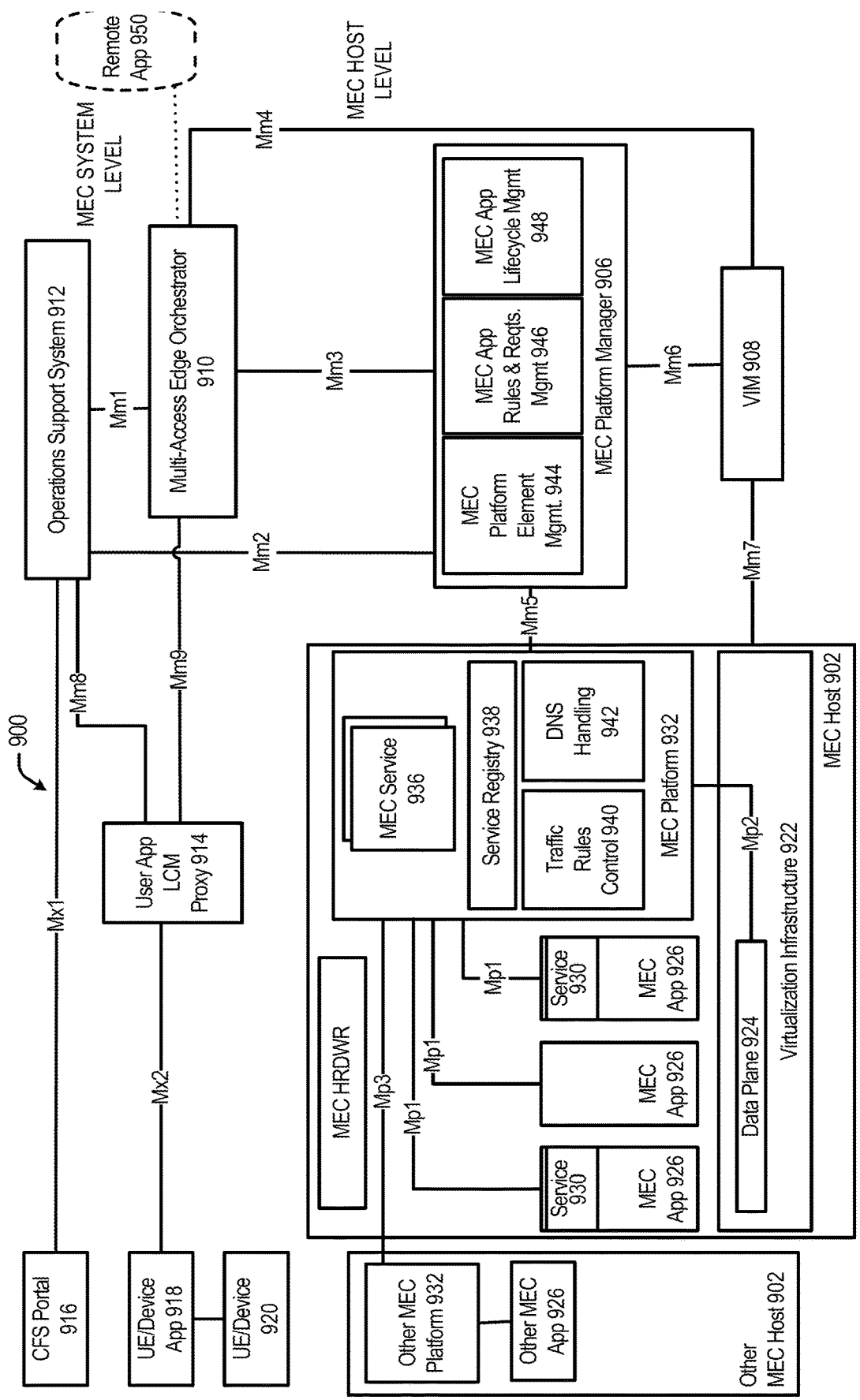
FIG. 9 illustrates a MEC system reference architecture.
Figure 10:
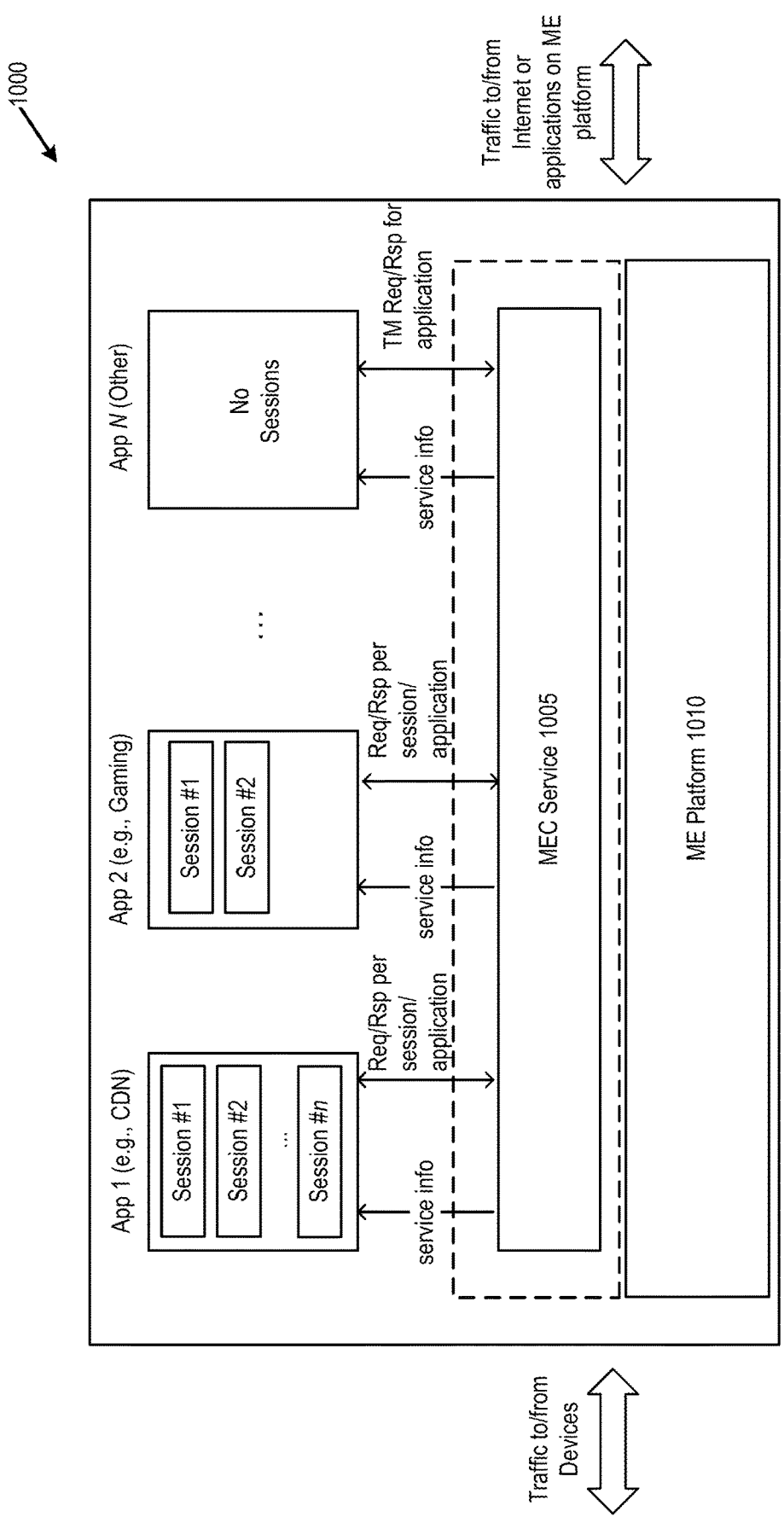
FIG. 10 illustrates an example MEC service architecture.

In one implementation, the MX server 140 is a MEC host (or MEC server), or is one or more MEC applications (apps) operated by a MEC server/host (see e.g., FIGS. 9-10). A MEC host/server is an entity that contains a MEC platform and a virtualization infrastructure to provide compute, storage and network resources to MEC apps. A MEC platform is a collection of functionality (including hardware and software elements) that is required to run MEC apps on a specific MEC host's virtualization infrastructure and to enable them to provide and consume MEC services, and that can provide itself a number of MEC services. MEC apps are applications that can be instantiated on a MEC host 140 within the MEC system and can potentially provide or consume MEC services, and MEC services are services provided via a MEC platform either by the MEC platform itself or by a MEC app. Various aspects of MEC hosts and MAMS servers are discussed in more detail infra. Throughout the present disclosure, the server 140 may be referred to as a MAMS server 140, a MEC host 140, MAMS-MEC system 140, or similar. In another implementation, the MAMS server 140 runs in an edge computing system/platform/network and/or a cloud computing system/service/platform, and can deliver traffic between client server over multiple connections or paths.

The MX UE 101 (or "multi-radio UE 101") accesses or otherwise communicates with a data network (DN) 175 or local service 170 (also referred to as a local DN 170) via one or more (radio) access networks ("(R)ANs") 110 and the server 140. Each (R)AN 110 is a segment in a network that delivers user data packets to the client 101 and/or server 140 via access link(s) 105, which may be a wired connection (e.g., Ethernet, DSL, Coax, USB, and/or the like) or a wireless (radio) connection (e.g., WiFi airlink, 5G/NR airlink, LTE airlink, and/or the like). Each of the (R)ANs 110 implement an access technology ("AT"), which is the underlying mechanism(s) used to access a corresponding network, and includes one or more network access nodes (NANs) 111.

In some implementations, the AT is a fixed access (wired) technology such as Ethernet, digital subscriber line technologies (DSL or xDSL); G.hn; coaxial cable access ("coax") such as Multimedia over Coax Alliance (MoCA), Data Over Cable Service Interface Specification (DOCSIS), and/or the like; powerline communication ("PLC" or "powerline") such as high definition (HD)-PLC and/or the like; Fiber to the x (FTTX; also referred to as "fiber in the loop"); Passive Optical Network (PON); and/or the like. Here, (R)AN node 111 may be a broadband modem (e.g., cable modem, DSL modem, an Optical Network Terminal (ONT) or an Optical Network Unit (ONU), G.hn semiconductor device, etc.), which may be used in combination with customer premises equipment (e.g., home/enterprise router(s), residential/enterprise gateway(s), mesh network device(s), WiFi access point(s), etc.). The fixed AN node 111 connects the client 101 to the access network 110 via an access connection 105 that operates according to an access protocol (e.g., Ethernet, V. 35, Universal Serial Bus (USB) and/or Ethernet over USB, Point-to-Point Protocol over Ethernet (PPPoE), Internet Protocol over Ethernet (IPoE), G.hn, DOCSIS, and/or the like). Here, the access connection 105 may include one or more wires (e.g., telephone wiring, coax, power lines, plastic and/or glass optical fibers, and/or the like), and the particular wires used may depend on the underlying AT.

In other implementations, the AT may be a radio access technology (RAT) such as 3GPP Long Term Evolution (LTE), 3GPP Fifth Generation (5G)/New Radio (NR), MulteFire, ETSI Global System for Mobile Communications (GSM), WiFi®, Worldwide Interoperability for Microwave Access (WiMAX) (sometimes referred to as "wireless broadband" or "WiBro"), and/or the like. (R)ANs 110 could also encompass personal area network technologies such as Bluetooth® or Bluetooth Low Energy (BLE), IEEE 802.15.4 based protocols (e.g., 6LoWPAN, WirelessHART, MiWi, Thread, etc.), WiFi-direct, and/or the like. Each (R)AN 110 includes one or more (R)AN nodes 111, which may be macro cell base stations, remote radio heads (RRHs), small and/or micro cell base stations, access points (APs), home gateways (HGs), and/or other like network elements. A collection of (R)AN nodes 111 may also be referred to as an "access level edge network" or "access level edge." The (R)AN nodes 111 are configurable or operable to perform setup of transport resources, (e.g., for CDN services and/or other application level services) as well as scheduling signaling resources for providing network service of the underlying access network/RAT.

In the example of FIGS. 1A-1B, the (R)AN 110A is a 3GPP-based access network such as an LTE E-UTRAN where the one or more (R)AN nodes 111A are evolved NodeBs (eNBs) or a next generation RAN (NG-RAN) where the one or more (R)AN nodes 111 are Next Generation NodeBs (gNBs) and/or NG Evolved Node-Bs (NG-eNBs). Additionally, in the example of FIG. 1, the (R)AN 110A is a WiFi-based access network where the (R)AN nodes 111B are WiFi Access Points (APs). The APs may be, for example, wireless routers, roadside ITS stations or roadside units, gateway appliances, central hubs, or the like. The multi-radio UE 101 is capable of establishing a 3GPP access link 105A with the eNB/gNB 111A (e.g., Uu interface or the like), and capable of establishing a WiFi access link 105B with the AP 111B. The eNB/gNB 111A communicates with the server 140 via a 3GPP backhaul link 106A and the AP 111B communicates with the server 140 via a WiFi backhaul link 106B. The 3GPP backhaul link 106A and the WiFi backhaul link 106B may be a suitable wired connection such as Ethernet, USB, Data Highway Plus (DH+), PROFINET, or the like. Furthermore, the MX server 140 is also communicatively coupled with a core network 150A via backhaul interface 107A and communicatively coupled with a Fixed Access (FA) gateway (GW) and/or FA-Core network 150B via the backhaul link 107B. In this example, the core network 150A may be a 3GPP core network such as a 5G core network (5GC) or an LTE Evolved Packet Core (EPC).

Additionally or alternatively, the FA-GW may be a broadband network gateway (BNG) and/or the FA-Core may be broadband core that provides transport, and various resources provide content (provider data center, video head end, and so on). Additionally or alternatively, the FA-GW/Core may be a residential gateway (RG), a 5G-RG, a Fixed Network (FN) RG (FN-RG), an FN Broadband RG (FN-BRG), an FN Cable RG (FN-CRG), a Wireline 5G Access Network (W-5GAN), a Wireline 5G Cable Access Network (W-5GCAN), a Wireline Access Gateway Function (W-AGF), and/or some other suitable element/entity.

For purposes of the present disclosure, individual links 105, 106, or 107 may be referred to as access network connections (ANCs) or access network paths (ANPs). For example, an ANC or ANP may comprise a radio link 105 between client 101 and (R)AN node 111 in one or both directions. Additionally or alternatively, an ANC or ANP may refer to a combination of a link 105 and link 106 between client 101 and MX server 140 in one or both directions. Additionally or alternatively, an ANC or ANP may refer to a combination of a of links/paths 105, 106 and 107 between client 101 and local service 170 or data network 175 in one or both directions. Unless stated otherwise, the terms ANC, ANP, "link," "channel," "path," "connection," and the like may be used interchangeably throughout the present disclosure.

Additionally, the client 101 is configured provide radio information to one or more NANs 111 and/or one or more other entities/elements (e.g., edge server(s), (R)AN(s) 110, core network function(s) (NF(s)), application function(s) (AF(s)), app server(s), cloud service(s), and/or the like). The radio information may be in the form of one or more measurement reports, and/or may include, for example, signal strength measurements, signal quality measurements, and/or the like. Each measurement report is tagged with a timestamp and the location of the measurement (e.g., the current location of the client 101). As examples, the measurements collected by the client 101 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/No), energy per bit to interference power density ratio ($E_c/I_0$), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v 16.2.0 (2021 Mar. 31) ("[TS36214]"), 3GPP TS 38.215 v 16.4.0 (2021 Jan. 8) ("[TS38215]"), IEEE 802.11, Part 11: "Wireless LAN Medium Access Control (MAC) and Physical Layer (PHY) specifications, IEEE Std." ("[IEEE80211]"), and/or the like.

Additionally or alternatively, any of the aforementioned measurements (or combination of measurements) may be collected by one or more NANs 111 and provided to a suitable entity/element (e.g., edge server(s), (R)AN(s) 110, NF(s), AF(s), app server(s), cloud service(s), and/or the like). The radio information may be reported either at a low periodicity or a high periodicity depending on a data transfer that is to take place, and/or other information about the data transfer. Additionally or alternatively, the element/entity may request the measurements from the NANs 111 at low or high periodicity, or the NANs 111 may provide the measurements to the element/entity at low or high periodicity. Additionally or alternatively, the element/entity may obtain other relevant data (e.g., Key Performance Indicators (KPIs), Key Quality Indicators, (KQIs), and/or the like) from other same or similar elements/entities with the measurement reports or separately from the measurement reports.

MAMS is a programmable framework that provides mechanisms for the flexible selection of network paths in an MX communication environment 100, based on the application needs and/or requirements, as well as adapt to dynamic network conditions when multiple network connections serve a client device 101. The MAMS framework leverages network intelligence and policies to dynamically adapt traffic distribution across selected paths and UP treatments (e.g., encryption needed for transport over WiFi, or tunneling needed to overcome a network address translation (NAT) between client 101 and a multi-path proxy) to changing network/link conditions. Network path selection and configuration messages are carried as UP data between the functional elements in the MX network 100B and the client 101, and thus, with little or no impact on the control plane (CP) signaling schemes of the underlying access networks (e.g., WiFi and 3GPP access networks in FIGS. 1A-1B). For example, in MX network 100B with 3GPP and WiFi technologies existing LTE and WiFi signaling procedures will be used to set up the LTE and WiFi connections, respectively, and MAMS-specific CP messages are carried as LTE or WiFi UP data. The MAMS framework defined in this document provides the capability to make a smart selection of a flexible combination of access paths and core network paths, as well as to choose the UP treatment when the traffic is distributed across the selected paths. Thus, it is a broad programmable framework that provides functions beyond the simple sharing of network policies such as those provided by the Access Network Discovery and Selection Function (ANDSF) discussed in 3GPP TS 24.312 v 15.0.0 (2018 Jun. 21), which offers policies and rules for assisting 3GPP clients to discover and select available access networks. Further, it allows the choice and configuration of UP treatment for the traffic over the paths, depending on the application's needs The MAMS framework mechanisms are not dependent on any specific access network types or UP protocols (e.g., TCP, UDP, Generic Routing Encapsulation (GRE), QUIC, Multipath TCP (MPTCP), SCTP, MultiPath QUIC (MPQUIC), etc.). The MAMS framework coexists and complements the existing protocols by providing a way to negotiate and configure those protocols to match their use to a given MA scenario based on client and network capabilities, and the specific needs of each access network path. Further, the MAMS framework allows load balancing of the traffic flows across the selected access network paths, and the exchange of network state information to be used for network intelligence to optimize the performance of such protocols.

The MAMS framework is based on principles of UP interworking, which can be deployed as an overlay without impacting the underlying networks. MAMS co-exists and complements existing communication protocols by providing a way to negotiate and configure the protocols based on client and network capabilities. Further it allows exchange of network state information and leveraging network intelligence to optimize the performance of such communication protocols. MAMS has minimal or no dependency on the actual access technology of the participating links, which allows MAMS to be scalable for addition of newer access technologies and for independent evolution of the existing access technologies.

The MAMS framework defines or provides the UP protocol stacks 102 and 142 for transporting user payloads, for example, an IP Protocol Data Unit (PDU) carried via the IP layer. The MAMS UP protocol 102, 142 includes the following two layers: an MX convergence layer (or sublayer) and an MX adaptation layer (or sublayer) for respective RATs.

The MX convergence layer is configurable or operable to perform MX-specific tasks in the UP. The MX convergence layer performs such functions as access (path) selection, multi-link (path) aggregation, splitting/reordering, lossless switching, fragmentation, and/or concatenation. The MX convergence layer can be implemented by using existing UP protocols such MPTCP, Multipath QUIC (MPQUIC), or by adapting encapsulating header/trailer schemes such as GRE or Generic Multi-Access (GMA). The MX convergence may support GMA, MPTCP Proxy, GRE Aggregation Proxy, and MPQUIC.

The MX adaptation layer is configurable or operable to address transport-network-related aspects such as reachability and security in the UP. This layer performs functions to handle tunneling, network-layer security, and NAT. The MX Adaptation Layer can be implemented using UDP tunneling, IPsec, DTLS (see e.g., Rescorla et al., "Datagram Transport Layer Security Version 1.2", IETF, RFC 6347 (January 2012) and/or Moriarty et al., "Deprecating TLS 1.0 and TLS 1.1", IETF, RFC 8996 (March 2021) (collectively "[DTLS]"), or a Client NAT (e.g., a source NAT at the client with inverse mapping at the server 140 and/or Network Multi Access Data Proxy (N-MADP) 237 of FIG. 2). Additionally or alternatively, the adaptation method of the MX Adaptation Layer is UDP without DTLS, UDP with DTLS, IPsec (see e.g., Huttunen et al., "UDP Encapsulation of IPsec ESP Packets", IETF, Network Working Group, RFC 3948 (January 2005) ("[RFC3948]")), or Client NAT.

The MX Adaptation Layer can be independently configured for each of the access links 105A and 105B. In particular, UP packets of the anchor connection can be encapsulated in a UDP tunnel of a delivery connection between the N-MADP and C-MADP (see e.g., N-MADP 237 and C-MADP 207 in FIG. 2A), an IPsec tunnel can be established between the N-MADP and C-MADP (see e.g., FIG. 2A) on the network path that is considered untrusted, and/or DTLS can be used if UDP tunneling is used on the network path that is considered "untrusted". For example, in FIG. 1B including 3GPP (R)AN 110A (assumed secure) and WiFi (R)AN 110B (assumed to not be secure), the MX adaptation layer can be omitted for the 3GPP link 105A, but is configured with IPsec to secure the WiFi link 105B.

The MX convergence layer operates on top of the MX adaptation sublayer in the protocol stack. From the transmitter (Tx) perspective, a user payload (e.g., IP PDU) is processed by the MX convergence layer first, and then by the MX adaptation layer before being transported over a delivery access connection, From the receiver (Rx) perspective, an IP packet received over a delivery connection is processed by the MX adaptation sublayer first, and then by the MX convergence sublayer.

Where GMA is used, the MX convergence layer may be replaced with a "GMA convergence layer" or "GMA convergence sublayer." Here, multiple access networks 110 are combined into a single IP connection. If the NCM (see e.g., NCM 236 of FIG. 2A) determines that N-MADP (see e.g., N-MADP 237 of FIG. 2A) is to be instantiated with GMA as the MX Convergence Protocol, it exchanges the support of GMA convergence capability in the discovery and capability exchange procedures.

Where MPTCP is used, the MX convergence layer may be replaced with an MPTCP layer on top of individual TCP layers, where each TCP layer is onto of a respective MX adaption layer. Here, MPTCP is reused as the "MX Convergence Sublayer" protocol, and multiple access networks are combined into a single MPTCP connection. Hence, no new UP protocol or PDU format is needed in this case. If the NCM 236 determines that the N-MADP is to be instantiated with MPTCP as the MX Convergence Protocol, it exchanges the support of MPTCP capability during discovery and capability exchange procedures. MPTCP proxy protocols may be used to manage traffic steering and aggregation over multiple delivery connection.

Where GRE is used, the MX convergence layer may be replaced with a GRE layer on top of a GRE Delivery Protocol (e.g., IP) layer. Here, GRE is reused as the "MX Convergence sub-layer" protocol, and multiple access networks are combined into a single GRE connection. Hence, no new UP protocol or PDU format is needed in this case. If the NCM 236 determines that N-MADP is to be instantiated with GRE as the MX Convergence Protocol, it exchanges the support of GRE capability in the discovery and capability exchange procedures.

The MAMS framework can be supported by an edge computing system/network, such as ETSI Multi-access Edge Computing (MEC), which defines the technical requirements for the implementation of MEC platforms. MEC is a technology that allows applications to be instantiated at the edge of an access network, and provides a low-latency and a close proximity environment to user equipment (UEs). As a result, vertical industries are expected to significantly benefit from the deployment of MEC infrastructure together with the deployment of (R)ANs 110. These RANs 110 may be operated by different mobile network operations (MNOs) and/or operate different RATs.

MEC systems are access agnostic, and thus, can support MAMS. In some implementations, MAMS can be a MEC service which provides services to MEC applications over the Mp1 interface. Meanwhile, the MEC platform can consume services provided by NFs in 3GPP network via an NEF or PCF if the AF is in the trust domain. Moreover, the 3GPP 5G system architecture has been extended to support functionality similar to MAMS, which is referred to as ATSSS.

FIG. 1C depicts a MAMS Data Plane Protocol Stack (DPPS) 100C. The MAMS DPPS 100C may also be referred to as a MAMS UP protocol stack and/or the like. The DPPS 100C includes the client-side MAMS DPPS 102 implemented by the client 101 and the server-side MAMS DPPS 142 implemented by the server 140. When the client 101 transmits packets to the server 140, the client 101 may be referred to as a "MAMS transmitter," "MX transmitter," or the like, and the server 140 may be referred to as a "MAMS receiver," "MX receiver," or the like. When the client 101 receives packets from the server 140, the client 101 may be referred to as a "MAMS receiver," "MX receiver," or the like, and the server 140 may be referred to as a "MAMS transmitter," "MX transmitter," or the like.

For devices equipped with multiple radio link technologies (or multiple RAT circuitries), such as 5G/NR, LTE, WiFi, etc., MAMS [RFC8743] provides a programmable framework to dynamically select and transmit data simultaneously over multiple radio links for high throughput, low latency, and improved reliability. The MAMS DPPS 100C includes the following two (sub)layers: the convergence (sub)layer and the adaptation (sub)layer. The MX adaptation (sub)layer is added to each radio link, and the MX convergence (sub)layer connects the IP and MX adaptation (sub) layers.

The convergence (sub)layer performs multi-access specific tasks such as, for example, access (path) selection, multi-link (path) aggregation, splitting/reordering, lossless switching, keep-alive, and probing, etc. As discussed in more detail infra, the GMA protocol is specified to encode additional control information (e.g., Key, Sequence Number, Timestamp, etc.) at this (sub)layer. The adaptation (sub) layer performs functions to handle tunneling, network layer security, and NAT, and the existing protocols (e.g. TCP, UDP, IPSec, QUIC, etc.) can be reused.

Figure 2A:
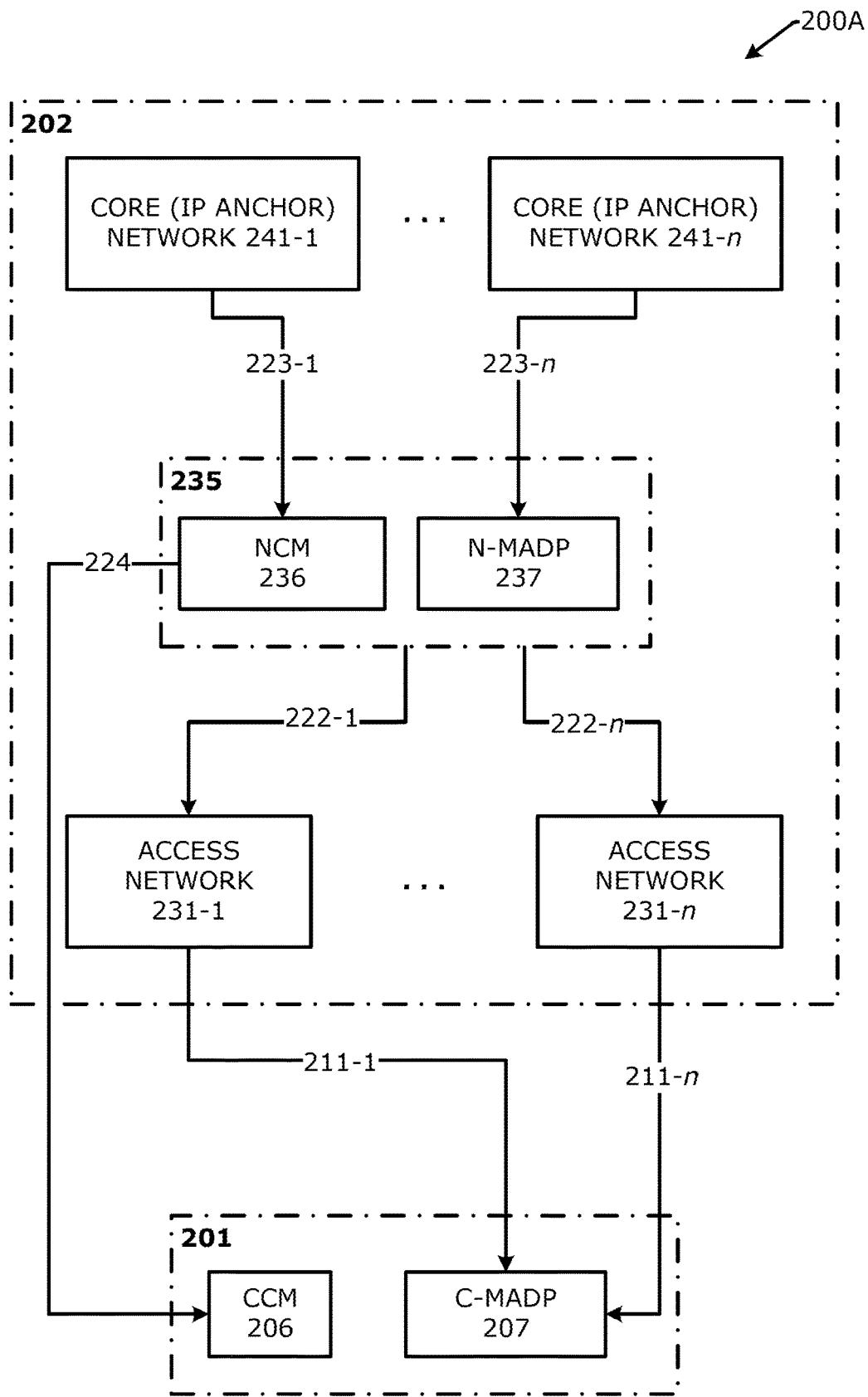
FIG. 2A illustrates an example MAMS reference architecture.

FIG. 2A illustrates an example MAMS reference architecture 200A for a scenario of a client served by n networks (where n is a number). The MAMS framework allows for dynamic selection and flexible combination of access and core network paths as UL and DL for a device connected to multiple communication networks. The multiple communication networks interwork at the UP. The architecture is extendable to combine any number of networks, as well as any choice of participating network types (e.g., LTE, WLAN, MuLTEfire, DSL, 5G/NR, etc.) and deployment architectures (e.g., with UP gateway function at the access edge).

FIG. 2A illustrates a scenario of a client 201 served by multiple (1 to n) core networks 241-1 to 241-n (where n is a number). The client 201 may be the same or similar as the client 101 of FIGS. 1A-1D. The MAMS architecture 200 includes the following functional elements: a client 201 including a Client Connection Manager (CCM) 206 and a Client Multi Access Data Proxy (C-MADP) 207; multiple (1 to n) access networks (ANs) 231 (including AN 231-1 to AN 231-n); a MAMS system 235 including a Network Connection Manager (NCM) 236 and a Network Multi Access Data Proxy (N-MADP) 237; and the multiple (1 to n) core networks 241-1 to 241-n. The CCM 206 and NCM 236 handle CP aspects, and the C-MADP 207 and N-MADP 237 handle UP aspects. The core networks (or simply "cores") 241-1 to 241-n are elements that anchor the client's 201 network address (e.g., IP address or the like) used for communication with applications via the network. One or more of the cores 241-1 to 241-n may correspond to cloud computing service(s), 5G core network(s) (5GCs), LTE core network(s) (e.g., evolved packet core (EPC)), a DSL/FIXED core, WLAN core, data center(s), and/or other like back-end system.

The client 201 is an end-user device supporting connections with multiple access nodes (e.g., (R)ANs 110 and/or (R)AN nodes 111 in FIG. 1A-1C), possibly over different access technologies. When the client 201 is capable of handling multiple network connections, the client 201 may be referred to as a "multiconnectivity client" or the like. The client 201 may be the same or similar as client 101 depicted by FIGS. 1A-1C and 3.

The ANs 231 are network elements in the network that deliver user data packets to the client 201 via respective point-to-point access links 211-1 to 211-n, which may include, for example, WiFi links, LTE cellular links, 5G/NR cellular links, DSL (fixed access) connections, and/or the like. In some implementations, the point-to-point access links 211-1 to 211-n may additionally or alternatively include short-range radio links such as, for example, Bluetooth® or BLE, IEEE 802.15.4 based protocols (e.g., 6LoWPAN, WirelessHART, MiWi, Thread, etc.), WiFi-direct, and/or the like. The ANs 231 may correspond to (R)ANs 110 and/or (R)AN nodes 111 of FIGS. 1A-1C and 3.

A server manager (e.g., NCM 236) is a functional entity in a network 202 (e.g., network element, network appliance, gateway, edge node(s), cloud node(s), etc.) that handles control messages from a client manager (e.g., CCM 206) and configures multi-access operations on the server side 202. Additionally or alternatively, the NCM 236 is a functional element in the network that handles MAMS control messages from the client 201 and configures the distribution of data packets over the available access and core network paths, and manages the UP treatment (e.g., tunneling, encryption, etc.) of the traffic flows. Additionally or alternatively, the NCM 236 provides the intelligence in the network to configure network paths and UP protocols based on client negotiation. The NCM 236 also acts as a common MA gateway for network policy input and interface to application platforms. One or more NCM 236 instances can be hosted at the access edge (e.g., in one or more access networks 110, at individual access network nodes 111, and/or in one or more edge compute nodes) and/or core network gateways.

The NCM 236 configures the network (N-MADP 237) and client (C-MADP 207) UP functions, such as negotiating with the client 201 for the use of available AN paths 221-1 to 221-n, protocols, and rules for processing the UP traffic, as well as link-monitoring procedures. The CP messages between the NCM 236 and the CCM 206 are transported as an overlay on the UP, without any impact on the underlying access networks. The NCM 236 handles MAMS CP messages from the client 201 and configures distribution of data packets over the multiple available access paths 221-1 to 221-n, delivery paths 222-1 to 222-n, and/or core network paths 223-1 to 223-n, as well as UP treatment of traffic flows. The CP messages exchanged between the NCM 236 and CCM 206 are transported as an overlay on the UP, without any impact to the underlying ANs 231.

The CP path 224 may be overlaid over any access UP path. A "path" may be a UDP flow between two hosts, which may be denoted by a 4-tuple (e.g., IP source address, IP destination address, source port, destination port). Additionally or alternatively, WebSocket is used for transporting management and control messages between the NCM 236 and CCM 206, wherein MX Control Message are carried over (or encapsulated in) a WebSocket, and the WebSocket is carried over (or encapsulated in) TCP/TLS.

A client manager (e.g., CCM 206) is a functional entity in the client device 201 (e.g. desktop, workstation, laptop, smartphone, smart appliance, IoT device, etc.) that exchanges control messages with a server manager (e.g., NCM 236) to configure multi-access operations on the client side 201. Additionally or alternatively, the CCM 206 is a functional entity in the client 201 that exchanges MAMS signaling messages with the NCM 236, and which configures the network paths at the client 201 for the transport of user data.

The CCM 206 is a peer functional element in the client 201 for handling MAMS CP procedures. The CCM 206 manages multiple network connections 221-1 to 221-n at the client 201, and configures the multiple network paths 221-1 to 221-n at the client 201 for transport of user data. The CCM 206 exchanges MAMS signaling with the NCM 236 to support such functions as the configuration of the UL and DL user network path for transporting user data packets and the adaptive selection of network path by the NCM 236 by reporting on the results of link probing. Link probing and reporting may be used to support adaptive network path selection by the NCM 236. In the DL for user data received by the client 201, the CCM 206 configures C-MADP 207 such that application data packet received over any of the accesses to reach the appropriate application on the client 201. In the UL for the data transmitted by the client 201, the CCM 206 configures the C-MADP 207 to determine the best access links 221 to be used for UL data based on a combination of local policy and network policy delivered by the NCM 236 over link 224.

The C-MADP 207 is a functional entity in the client 201 that handles user data traffic forwarding across multiple network paths. The C-MADP 207 is responsible for MAMS-specific UP functionalities in the client 201 such as encapsulation, fragmentation, concatenation, reordering, retransmissions, etc. The C-MADP 207 is configured by the CCM 206 based on signaling exchange with the NCM 236 and local policies at the client 201. The CCM 206 configures the selection of delivery connections 222-1 to 222-n and the UP protocols to be used for UL user data traffic based on the signaling exchanged with the NCM 236.

The N-MADP 237 is a functional entity in the network 202 that handles the forwarding of user data traffic across multiple network paths. The N-MADP 237 is responsible for MAMS-related UP functionalities in the network 202. Such as encapsulation, fragmentation, concatenation, reordering, retransmission, etc. The N-MADP 237 is the distribution node that routes the UL UP traffic to the appropriate anchor connection 223-1 to 223-n towards a respective core network 241-1 to 241-n, and the DL user traffic to the client 201 over the appropriate delivery connection(s) 222-1 to 222-n. The anchor connections 223-1 to 223-n are network paths from the N-MADP 237 to the UP gateway (IP anchor) that has assigned an network address to the client 201, and the delivery connections 222-1 to 222-n are network paths from the N-MADP 237 to the client 201. One or more The N-MADP 237 instances can be hosted at the Access Edge (e.g., in one or more access networks 110 and/or at individual access network nodes 111) and/or Core Gateways. The N-MADP 237 instances may be hosted with or separate from the NCM 236 instances.

In the DL, the NCM 236 configures the use of delivery connections 222-1 to 222-n, and UP protocols at the N-MADP 237 for transporting user data traffic. The N-MADP 237 may implement Equal-Cost Multi-Path routing (ECMP) support for the down link traffic. Additionally or alternatively, the N-MADP 237 may be connected to a router or other like network element (e.g., AP XE136 of Figure XE1) with ECMP functionality. The NCM 236 configures the N-MADP 237 with a load balancing algorithm based on static and/or dynamic network policies. These network policies may include assigning access and core paths for specific user data traffic type, data volume based percentage distribution, link availability and feedback information from exchange of MAMS signaling with the CCM 206 at the client 201, and/or the like. The N-MADP 237 can be configured with appropriate UP protocols to support both per-flow and per-packet traffic distribution across the delivery connections.

In the UL, the N-MADP 237 selects the appropriate anchor connection 223-1 to 223-n over which to forward the user data traffic, received from the client 201 via one or more delivery connections 222-1 to 222-n. The forwarding rules in the UL at the N-MADP 237 are configured by the NCM 236 based on application requirements (e.g., enterprise hosted application flows via a LAN or WLAN anchor 241 (e.g., WiFi, cloud, and/or edge network), Mobile Operator hosted applications via a cellular core network 241, and/or the like).

The NCM 236 and the N-MADP 237 can be either collocated with one another or instantiated on different network nodes. The NCM 236 can setup multiple N-MADP 237 instances in the network. The NCM 236 controls the selection of an individual N-MADP 237 instance by the client and the rules for distribution of user traffic across the N-MADP 237 instances. In this way, different N-MADP 237 instances may be used to handle different sets of clients for load balancing across clients. Additionally, the different N-MADP 237 instances may be used for different address deployment topologies (e.g., N-MADP 237 hosted at the UP node at the access edge or in the core network, while the NCM 236 hosted at the access edge node), as well as address access network technology architecture. For example, an N-MADP 237 instance at a CN node 241 may be used to manage traffic distribution across LTE and DSL networks, and another N-MADP 237 instance at a (R)AN node 231-1, 231-n may be used to manage traffic distribution across LTE and WiFi traffic. Furthermore, a single client 201 can be configured to use multiple N-MADP 237 instances, which may be used for addressing different application requirements. For example, individual N-MADP 237 instances may be used to handle TCP and UDP transport based traffic.

The CCM 206 and NCM 236 exchange signaling messages to configure the UP functions, C-MADP 207 and N-MADP 237, at the client and network respectively. The CCM 206 may obtain the CCM 236 credentials (FQDN or network address) for sending the initial discovery messages. As an example, the client 201 can obtain the NCM 236 credentials using methods like provisioning, DNS query. Once the discovery process is successful, the (initial) NCM 236 can update and assign additional NCM 236 addresses, for example, based on MCC/MNC tuple information received in the MX Discovery Message, for sending subsequent CP messages.

The CCM 206 discovers and exchanges capabilities with the NCM 236. The NCM 236 provides the credentials of the N-MADP 237 end-point and negotiates the parameters for UP with the CCM 206. CCM 206 configures C-MADP 207 to setup the UP path (e.g., MPTCP/UDP Proxy Connection) with the N-MADP 237 based on the credentials (e.g., (MPTCP/UDP) Proxy network address (e.g., IP address and port), Associated Core Network Path), and the parameters exchanged with the NCM 236. Further, NCM 236 and CCM 206 exchange link status information to adapt traffic steering and UP treatment with dynamic network conditions. The key procedures are described in details in the following subsections.

A UDP (or QUIC) connection may be configured between the C-MADP 207 and the N-MADP 237 to exchange control messages. The control messages may be or include, for example, keep-alive, probe request (REQ)/acknowledgement (ACK), Packet Loss Report (PLR), First Sequence Number (FSN), Coded MX SDU (CMS), Traffic Splitting Update (TSU), Traffic Splitting ACK (TSA) messages, and/or path quality estimation information. The N-MADP 237 end-point network address (e.g., IP address or the like) and port number (e.g., UDP port number of the UDP connection) is used to identify MX control PDUs.

The various elements depicted in the example of FIG. 2A may be implemented using a variety of different physical and/or virtualized components. For example, the elements within MAMS network 202 may be implemented using one or more components of an edge node, such as one or more LTE or 5G RANs, or the MEC system 900 of FIG. 9 or the like. Additionally or alternatively, the MAMS system 235 may be implemented in or by an individual RAN node, such as one or more of the RAN nodes 111 in FIGS. 1A-1C. In one example, the MAMS system 235 is implemented as part of the layer 3 (L3) protocol stack (e.g., the RRC layer or the like). In another example, the MAMS system 235 is implemented as part of a layer above L3 such as the network layer (e.g., IP, UDP, QUIC, GTP-U, etc.) data plane protocol stack of the RAN nodes. In another example, the MAMS system 235 may be is implemented as a separate layer between the L3 and upper layers. In another example, the MAMS system 235 may be implemented in or by a gNB-CU of a CU/DU split architecture. In another example, the MAMS system 235 may be implemented in or by a vBBU pool, or a cloud RAN (C-RAN). Additionally or alternatively, the functional elements within MAMS network 202 may be implemented by one or more network functions (or as a VNF) of CN 150A in FIGS. 1A-1C. For example, the N-MADP 237 may run on an S-GW or P-GW when CN 150A is an EPC, or the N-MADP 237 may run on a User Plane Function (UPF) when CN 150A is a 5GC.

In MEC-based implementations (see e.g., FIG. 9), the MAMS system 235 may be implemented in or by a MEC host/server (e.g., MEC host 902 of FIG. 9) that is located in, or co-located with, a RAN 110 or RAN node 111. The functions that are located in the network side (e.g., the NCM 236 and N-MADP 237) can be hosted either at a centralized location or at the edge cloud (see e.g., edge cloud 1263 of FIG. 12). They can be deployed either as MEC application (e.g., MEC apps 926 of FIG. 9) or co-located with other functions (e.g., MEC platform 932 of FIG. 9). Additionally or alternatively, up-to-date information from the access networks may be provided to the NCM 236 for intelligent network path selection over APIs by the MEC platform (e.g., MEC platform 932 of FIG. 9) the same way as it exposes RNI over RNI API or BWMS over BWM API. Additionally or alternatively, similar levels of information may be defined for 3GPP access networks as well as for WiFi, MulteFire, DSL, etc., either by amending the existing RNI/BWM APIs or by defining new APIs specific for the new access technologies.

In additional or alternative MEC-based implementations (see e.g., FIGS. 9-10), the NCM 236 can be hosted on a MEC cloud server (e.g., MEC host 902 and/or MEC app(s) 926 in FIG. 9) that is located in the UP path at the edge of the multi-technology access network. The NCM 236 and CCM 206 can negotiate the network path combinations based on an application's needs and the necessary UP protocols to be used across the multiple paths. The network conditions reported by the CCM 206 to the NCM 236 can be complemented by a Radio Analytics application (see e.g., [MEC012]) residing at the MEC cloud server to configure the UL and DL access paths according to changing radio and congestion conditions. Additionally or alternatively, the UP functional element (e.g., the N-MADP 237) can either be collocated with the NCM 236 at the MEC cloud server (e.g., MEC-hosted applications, etc.) or placed at a separate network element like a common UP gateway across the multiple networks. Also, even in scenarios where an N-MADP 237 is not deployed, the NCM 206 can be used to augment the traffic steering decisions at the client 201. These enhancements is to improve the end user's QoE by leveraging the best network path based on an application's needs and network conditions, and building on the advantages of significantly reduced latency and the dynamic and real-time exposure of radio network information available at the MEC.

As used herein a "GMA receiver" may be an N-MADP 237 instance or C-MADP 207 instance (see e.g., FIG. 2A) instantiated with GMA as the convergence protocol that receives packets encapsulated or otherwise generated according to GMA procedures, and processes the received packets per the procedures discussed in [GMA07] and/or [GMA09]. Additionally, as used herein a "GMA transmitter" may be an N-MADP 237 instance or C-MADP 207 instance (see e.g., FIG. 2A) instantiated with GMA as the convergence protocol that processes and/or encapsulates or otherwise generates packets/PDUs according to GMA procedures discussed in [GMA07] and/or [GMA09].

Figure 2B:
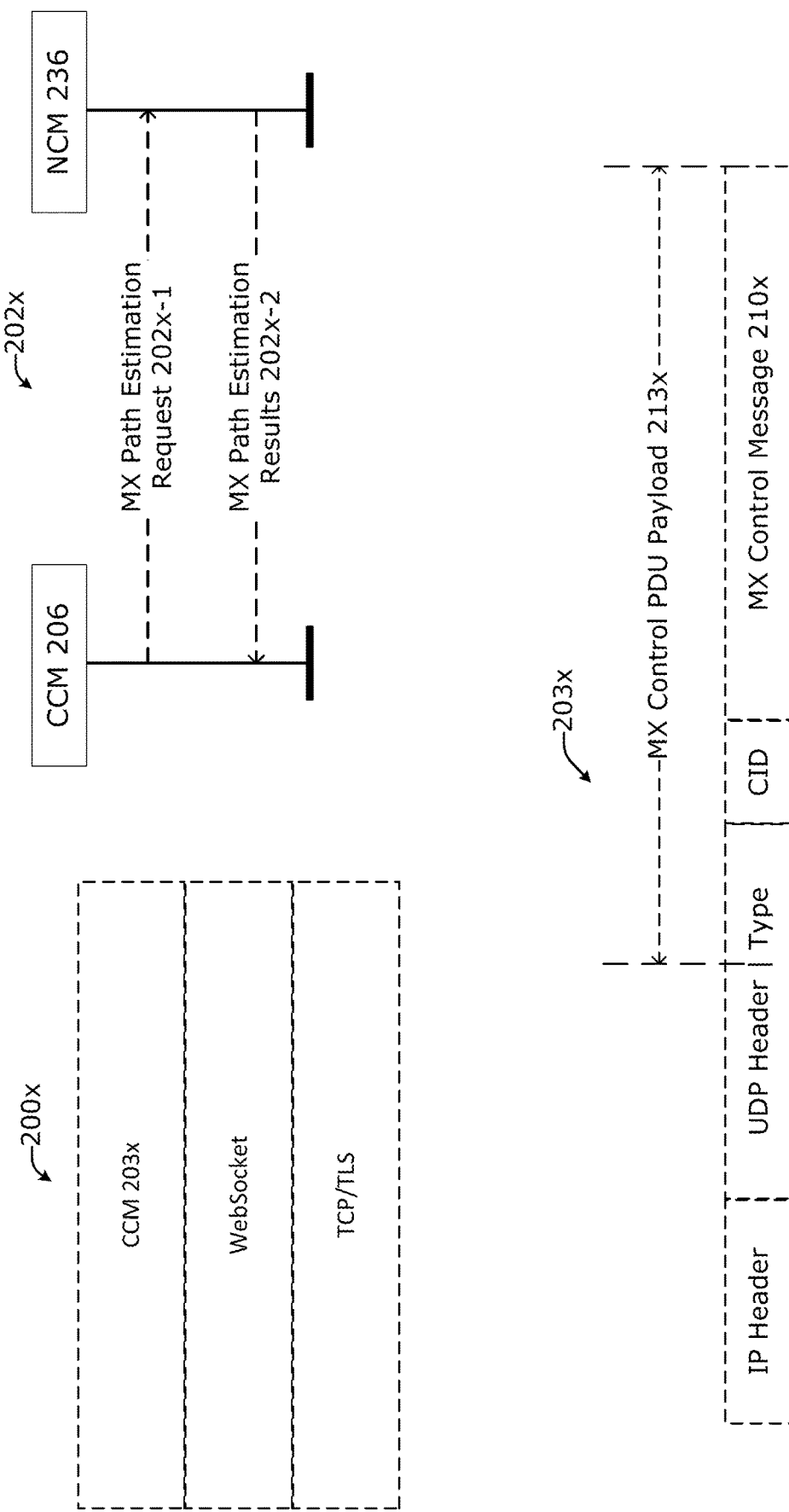
FIG. 2B illustrates an example MX control plane protocol and MX control message.

FIG. 2B depicts an example MAMS Control Plane Protocol Stack (CPPS) 200*x*. The CPPS 200*x* includes an Multi-Access (MX) Control Message layer 203*x*, a WebSocket layer, and a Transport Control Protocol (TCP)/Transport Layer Security (TLS) layer. Here, WebSocket (see e.g., IETF RFC 6455 (December 2011) and IETF RFC 8441 (September 2018)) is used for transporting management and control messages (e.g., MX Control Messages 203*x*) between the NCM 236 and the CCM 206. Each MAMS control message 203*x* may include one or more of the following fields: Version (indicates the version of the MAMS control protocol); Message Type (indicates the type of the message, e.g., MX Discover, MX Capability Request (REQ)/Response (RSP)); and Sequence Number (SN) (Auto-incremented integer to uniquely identify a particular message exchange, e.g., MX Capability Request/Response).

FIG. 2B also shows a MAMS Control-Plane (CP) Procedure 202*x* for Path Quality Estimation. Path quality estimations can be done either passively or actively. Traffic measurements in the network can be performed passively by comparing real-time data throughput of the client 201 with the capacity available in the network. In special deployments where the NCM 236 has interfaces 222 with access nodes 231, 111, the direct interfaces can be used to gather information regarding path quality. For example, the utilization of an LTE access node (eNB), to which the client 201 is attached, could be used as data for the estimation of path quality without creating any extra traffic overhead. Active measurements by the client 201 provide an alternative way to estimate path quality.

Procedure 202*x* begins at operation 202*x*-1 where the NCM 236 sends an MX Path Estimation Request to the CCM 206. At operation 202*x*-2, the CCM 206 sends an MX Path Estimation Results message to the NCM 236. The NCM 236 may send one or more of the following configuration parameters in the MX Path Estimation Request (operation 202*x*-1) to the CCM 206: Connection ID (of the delivery connection 222 whose path quality needs to be estimated); Init Probe Test Duration (ms); Init Probe Test Rate (Mbps); Init Probe Size (bytes); Init Probe-ACK Required (0→No/1→Yes); Active Probe Frequency (ms); Active Probe Size (bytes); Active Probe Test Duration (ms); and Active Probe-ACK Required (0→No/1→Yes).

The CCM 226 configures the C-MADP 207 for probe receipt based on these parameters and for collection of the statistics according to the following configuration: Unique Session ID (session identifier provided to the client in an MX Capability Response); Init Probe Results Configuration (e.g., including Lost Probes (percent), and/or Probe Receiving Rate (packets per second)); Active Probe Results Configuration (e.g., including Average Throughput in the last Probe Duration).

The UP probing is divided into two phases: the Initialization phase and the Active phase. For the Initialization Phase, a network path that is not included by the N-MADP 237 for transmission of user data is deemed to be in the Initialization phase. The user data may be transmitted over other available network paths. For the Active Phase, a network path that is included by the N-MADP 237 for transmission of user data is deemed to be in the Active phase.

During the Initialization phase, the NCM 236 configures the N-MADP 237 to send an Init Probe-REQ message. The CCM 206 collects the Init Probe statistics from the C-MADP 207 and sends the MX Path Estimation Results message (operation 202*x*-2) to the NCM 236 per the Initialization Probe Results configuration.

During the Active phase, the NCM 236 configures the N-MADP 237 to send an Active Probe-REQ message. The C-MADP 207 calculates the metrics as specified by the Active Probe Results configuration. The CCM 206 collects the Active Probe statistics from the C-MADP 207 and sends the MX Path Estimation Results message to the NCM 236 (operation 202*x*-2) per the Active Probe Results configuration.

FIG. 2B also shows an MX Control message format 203*x*. As shown, the MX Control message 203*x* includes an IP header, a UDP header, and an MX Control PDU Payload 213*x*. The MX Control PDU Payload 213*x* includes a type field, a CID field, and an MX Control Message 210*x*. The MX Control PDU 213*x* may include one or more of the following fields: Type (1 byte) to indicate the type of the MX Control message (a value of "0" indicates a Keep-Alive type, and a value of "1" indicates a Probe-REQ/ACK type; Others: Reserved); CID (1 byte) to indicate a connection ID of the delivery connection for sending the MX Control message 203*x*; and an MX Control Message 210*x* (variable size/length) including the payload of the MX Control message 210*x*. The MX Control message 203*x*/PDU 210*x* is sent as a normal UP packet over the desired delivery connection whose quality and reachability need to be determined.

The control message 203*x*/PDU 210*x* may be encoded as a Keep-Alive and/or Probe-REQ/ACK messages to support path quality estimation. The "Type" field is set to "0" for Keep-Alive messages. The C-MADP 207 may periodically send a Keep-Alive message over one or multiple delivery connections 222-1 to 222-*n* (e.g., ANCs 105, 106, and/or 107), especially if UDP tunneling is used as the adaptation method for the delivery connection 222 with a NAT function on the path. A Keep-Alive message is 2 bytes long and includes a Keep-Alive Sequence Number field (2 bytes) to indicate the sequence number (SN) of the Keep-Alive message. The "Type" field is set to "1" for Probe-REQ/ACK messages. The N-MADP 237 may send a probe request (Probe-REQ) message for path quality estimation. In response, the C-MADP 207 may return a probe acknowledgement (Probe-ACK) message.

A Probe-REQ message may include one or more of the following fields: Probing Sequence Number (2 bytes) to indicate an SN of the Probe REQ message; Probing Flag (1 byte) where Bit 0 is a Probe-ACK flag to indicate whether the Probe-ACK message is expected (1) or not (0), Bit 1 is a Probe Type flag to indicate whether the Probe-REQ/ACK message was sent during the Initialization phase (0) when the network path is not included for transmission of user data, or during the Active phase (1) when the network path is included for transmission of user data, Bit 2 is a bit flag to indicate the presence of the Reverse Connection ID (R-CID) field, and Bits 3-7 are Reserved; Reverse Connection ID (R-CID) (1 byte) to indicate the connection ID of the delivery connection for sending the Probe-ACK message on the reverse path; and Padding (variable). The "Padding" field is used to control the length of the Probe-REQ message. The "R-CID" field is only present if both Bit 0 and Bit 2 of the "Probing Flag" field are set to "1". Moreover, Bit 2 of the "Probing Flag" field should be set to "0" if Bit 0 is "0", indicating that the Probe-ACK message is not expected. If the "R-CID" field is not present, but Bit 0 of the "Probing Flag" field is set to "1", the Probe-ACK message should be sent over the same delivery connection as the Probe-REQ message.

The C-MADP 207 should send the Probe-ACK message in response to a Probe-REQ message with the Probe-ACK flag set to "1". A Probe-ACK message is 3 bytes long and includes a Probing Acknowledgment Number field (2 bytes) to indicate/include a sequence number of the corresponding Probe-REQ message.

The CCM 206 and NCM 236 exchange signaling messages to configure the UP functions via the C-MADP 207 and the N-MADP 237 at the client and the network, respectively. The means for the CCM 206 to obtain the NCM 236 credentials (e.g., Fully Qualified Domain Name (FQDN) or network address (e.g., IP address, or the like)) for sending the initial discovery messages are out of scope for this document. As an example, the client can obtain the NCM 236 credentials by using such methods as provisioning or DNS queries. Once the discovery process is successful, the (initial) NCM 236 can update and assign additional NCM 236 addresses (e.g., based on Mobile Country Code (MCC)/Mobile Network Code (MNC) tuple information received in the MX Discover message) for sending subsequent CP messages.

The CCM 206 discovers and exchanges capabilities with the NCM 236. The NCM 236 provides the credentials of the N-MADP 237 endpoint and negotiates the parameters for the user plane with the CCM. The CCM 206 configures the C-MADP 207 to set up the UP path (e.g., MPTCP/UDP Proxy connection) with the N-MADP, based on the credentials (e.g., (MPTCP/UDP) Proxy network address (e.g., IP address or the like) and port, associated core network path), and the parameters exchanged with the NCM 236. Further, the NCM 236 and CCM 206 exchange link status information to adapt traffic steering and UP treatment to dynamic network conditions.

After sending a MAMS control message, the MAMS CP peer (NCM 236 or CCM 206) waits for a duration of MAMS_TIMEOUT ms before timing out in cases where a response was expected. The sender of the message will retransmit the message for MAMS_RETRY times before declaring failure if no response is received. A failure implies that the MAMS peer is dead or unreachable, and the sender reverts to native non-multi-access/single-path mode. The CCM 206 may initiate the MAMS discovery procedure for re-establishing the MAMS session.

MAMS CP peers execute the keep-alive procedures to ensure that the other peers are reachable and to recover from dead-peer scenarios. Each MAMS CP endpoint maintains a Keep-Alive timer that is set for a duration of MAMS_KEEP_ALIVE_TIMEOUT. The Keep-Alive timer is reset whenever the peer receives a MAMS control message. When the Keep-Alive timer expires, an MX Keep-Alive Request is sent.

The values for MAMS_RETRY and MAMS_KEEP_ALIVE_TIMEOUT parameters used in keep-alive procedures are deployment dependent. As an example, the client 201 and network can obtain the values using provisioning. On receipt of an MX Keep-Alive Request, the receiver responds with an MX Keep-Alive Response. If the sender does not receive a MAMS control message in response to MAMS_RETRY retries of the MX Keep-Alive Request, the MAMS peer declares that the peer is dead or unreachable. The CCM 206 may initiate the MAMS discovery procedure for re-establishing the MAMS session.

Additionally, the CCM 206 immediately sends an MX Keep-Alive Request to the NCM whenever it detects a handover from one (R)AN node 111 to another (R)AN node 111. During this time, the client 201 stops using MAMS UP functionality in the UL direction until it receives an MX Keep-Alive Response from the NCM 236.

The MX Keep-Alive Request includes the following information: Reason (e.g., can be timeout or handover. Handover shall be used by the CCM 206 only on detection of a handover); Unique Session ID (Unique session identifier for the CCM 206 that set up the connection. If the session already exists, then the existing unique session identifier is returned. An NCM ID is a unique identity of the NCM 236 in the operator network, and the session ID is a unique identity assigned to the CCM 206 instance by this NCM 236 instance); Connection ID (if the reason is handover, the inclusion of this field may be mandatory); and Delivery Node ID (identity of the node to which the client is attached. In the case of LTE, this is an E-UTRAN Cell Global Identifier (ECGI). In the case of WiFi, this is an AP ID or a Media Access Control (MAC) address. If the reason is "Handover", the inclusion of this field may be mandatory).

The present disclosure provides new mechanisms to support dynamic traffic splitting/steering at the convergence (sub)layer in MAMS (see e.g., FIGS. 1B-1D). Existing solutions include various are e2e protocols, such as multi-path TCP (MPTCP), to utilize multiple path or RATs to achieve higher throughput. However, these e2e protocol solutions are managed at the server, which is far away from the data splitting point, and therefore, result in relatively high feedback delay. Moreover, the existing solutions cannot access the radio layer information.

A new GMA protocol was specified in Zhu et al., "Generic Multi-Access (GMA) Convergence Encapsulation Protocols," draft-zhu-intarea-gma-07, IETA, INTAREA/Network Working Group (14 May 2020) ("[GMA07]") to allow dynamically splitting user data traffic over multiple links at the MX convergence sublayer. The present disclosure provides dynamic traffic splitting for different optimization targets such as reducing e2e delay (e.g., "low delay") or minimizing cellular (e.g., 5G/NR, LTE, etc.) usage (e.g., "low cost"). Updates to [GMA07] are specified in Zhu et al., "Generic Multi-Access (GMA) Convergence Encapsulation Protocols," draft-zhu-intarea-gma-09, IETA, INTAREA/Network Working Group (1 Apr. 2021) ("[GMA09]")

The present disclosure introduces GMA-based traffic splitting that operates in the convergence layer of the MAMS framework (see e.g., FIGS. 1B-1D). The GMA-based traffic splitting mechanisms are transparent to lower layers and do not require any information from those layers. Two multi-path traffic splitting options are provided including a low delay and low cost options. Various edge computing frameworks, such as the MEC framework discussed herein, may be used to operate/implement the GMA-based traffic splitting. In one example, the embodiments may be implemented using the Smart-Edge/MEC platform provided by Intel®.

1.1. OTT MAMS

Figure 3:
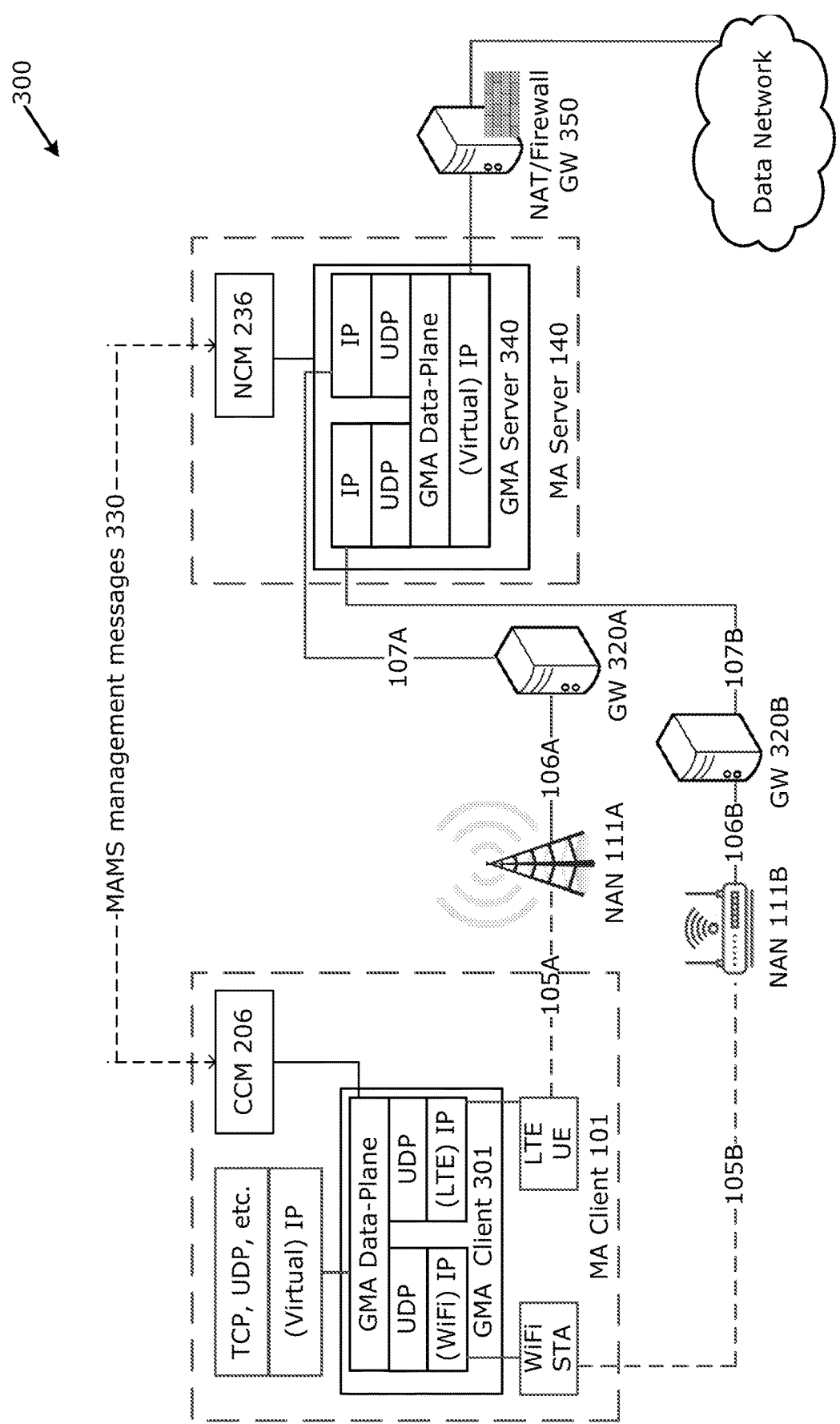
FIG. 3 depicts an OTT GMA end-to-end (e2e) Network Reference Architecture.

FIG. 3 shows an OTT GMA E2E Network Reference Architecture 300. In FIG. 3, the MA client 101 includes the CCM 206, which is a control-plane functional entity in the client that exchanges MAMS control messages with the NCM 236 and configures multiple network paths at the client for transport of user data. The CCM 206 is communicatively coupled with a GMA client (Gc) 301 in the MA client 101. The Gc 301 is a data plane functional entity in the client 101 that handles user data forwarding across multiple network paths 105 and MA convergence operations (e.g., splitting, steering, duplication, measurement, etc.)

The MA server 140 includes the NCM 236, which is control-plane functional entity in the network that handles MAMS control messages from the client 101, 1 and configures distribution of data packets over multiple network paths, and user plane treatment of the traffic flows. The NCM 236 is communicatively coupled with a GMA server (Gs) 340 in the MA server 140. The Gs 340 is a data plane functional entity in the network that handles user data forwarding across multiple network paths 107 and MA convergence operations (e.g., splitting, steering, duplication, measurement, etc.). Furthermore, the MA server 140, and in particular the Gs 340, may be communicatively coupled with a NAT/Firewall gateway 350. The NAT/Firewall gateway 350 may be disposed between the MA server 140 and a DN 170, 175 (e.g., the Internet, an enterprise network, a local area DN, and/or the like).

A websocket-based (e.g., TCP) secure connection is established between the CCM 206 and NCM 236 to exchange MAMS management messages 330, which are used for configuring the data plane functions (e.g., Gc 301 and Gs 340). The MAMS management messages 330 are discussed in more detail infra.

There are two types of connections in a GMA system 300: anchor connections and delivery connections. An anchor connection is an IP connection that is used by applications for e2edata transfer. A delivery connection is an IP connection that is used to deliver user data between Gc 301 and Gs 340. The anchor connection in the OTA GMA system 300 is virtual IP connection, which is similar to what is used in virtual private networks (VPNs). In some implementations, there may be up to two simultaneous delivery connections (e.g., 5G/NR, LTE, WiFi, etc.) each of which has a dedicated tunnel (e.g., UDP tunnel or the like) established for data transfer.

Figure 4:
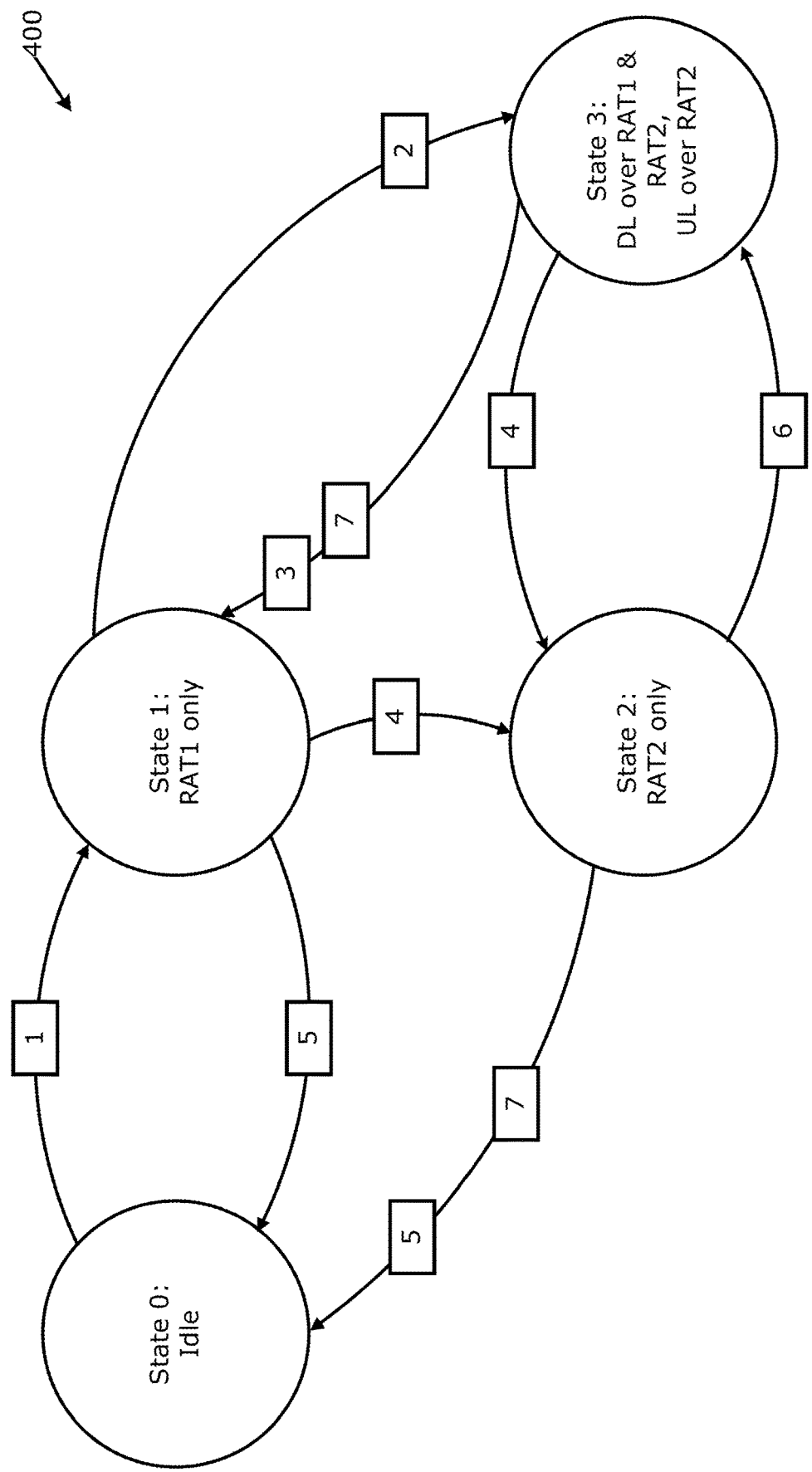
FIG. 4 illustrates a client-based GMA Data Traffic Control State Machine.

The Gc 301 and/or the Gs 340 select the delivery connection for MAMS messages based on a current state of the Gc 301 and/or the Gs 340, which may include one or more of the following: send all MAMS messages over a first (preferred) delivery connection (e.g., WiFi) in state 1 or 3 (see e.g., FIG. 4); and send all MAMS message over the second delivery connection (e.g., Cellular) in state 2 or 4 (see e.g., FIG. 4).

In one example implementation, the NAN 111A is a cellular base station such as a 5G/NR gNB, an LTE eNB, and/or the like, and the GW 320A comprises one or more servers operating as an Evolved Packet Core (EPC) for LTE implementations or a 5G system (5GS)/5G core network (5GC) for 5G/NR implementations. In this example implementation, the one or more servers operate one or more network functions (NFs) such as a UPF in 5G/NR implementations, a Serving Gateway (S-GW) and/or Packet Data Network Gateway (P-GW) in LTE implementations, or the like. In this example implementation, connection 106A is an N3 reference point/interface for 5G/NR implementations or an S1 reference point/interface for LTE implementations, and connection 107A is an N6 reference point/interface for 5G/NR implementations or an SGi reference point/interface for LTE implementations.

In another example implementation (with may be combined with the previously described example implementation), the NAN 111B is a WLAN access point (AP) such as a WiFi AP, and the GW 320B comprises one or more servers and/or network elements operating as a WLAN (WiFi) access gateway (WAG), a broadband network gateway (BNG), and/or the like. In this example implementation, each of connection 106B and connection 107B may be a suitable tunneling interface/link such as a GRE tunnel, general packet radio service (GPRS) Tunneling Protocol (GTP) tunnel, Mobile IP (MIP), a Proxy MIP (PMIP) tunnel, VPN tunnel, and/or the like. The connection 106B and connection 107B may utilize the same or different tunneling protocols and/or communication technologies.

FIG. 4 illustrates a client-based GMA data traffic control state machine 400. The data traffic control state machine 400 includes the following states:

State 0 (Idle): the (anchor) virtual connection is down.
State 1 (RAT1 only): all data traffic (DL and UL) are delivered over the first (preferred) RAT connection (RAT1).
State 2 (RAT2 only): all data traffic are delivered over the second connection (RAT2).
State 3 (DL over RAT1 & RAT2, UL over RAT2): DL traffic are delivered over both connections, and UL traffic are delivered over the second connection (RAT2).

The data traffic control state machine 400 includes the following state-transition triggers:

(1) The (anchor) virtual connection is established successfully. This trigger causes a transition from state 0 to state 1.
(2) Congestion is detected over the RAT1 DL and RAT2 Link Success has been declared/detected wherein the last control message over RAT2 was successful. This trigger causes a transition from state 1 to state 3. In some implementations, congestion detection (based on packet loss) is applicable only if the RAT1 Congestion Detection flag is disabled.
(3) Congestion is no longer present over the RAT1 DL (applicable only if the RAT1 Congestion Detection flag is disabled). This trigger causes a transition from state 3 to state 1.
(4) RAT1 received signal quality (or received signal strength) is relatively poor (e.g. <−75 decibel-milliwatts (dBm)) and/or RAT1 has declared or detected a link failure (or Radio Link Failure (RLF)). The particular mechanism for detecting and/or declaring a link failure (or RLF) is defined by the standards/specifications of RAT1. This trigger causes a transition from state 1 to state 2 or a transition from state 3 to state 2.
(5) The GMA/MAMS operation is terminated or suspended. Termination of the GMA/MAMS operation may include a delivery connection (RAT2 or RAT1) being lost for a predefined period (e.g., 10 minutes or some other amount of time) and/or total throughput is relatively low (e.g., <10 kilobits per second (Kbps)). Suspended GMA/MAMS operation may include a screen being off and/or total throughput is low (e.g., <10 Kbps). This trigger causes a transition from state 1 to state 0 or a transition from state 2 to state 1.
(6) RAT1 received signal quality is relatively good (e.g., >−70 dBm) and RAT1 has detected/declared a Link Success. This trigger causes a transition from state 2 to state 3.
(7) RAT2 has detected/declared a link failure (or RLF). The particular mechanism for detecting and/or declaring a link failure (or RLF) is defined by the standards/specifications of RAT2. This trigger causes a transition from state 3 to state 1 or a transition from state 2 to state 0.

If a link is declared "Link Failure", it should not be used to send any data or control packets, except "Probe/ACK", and the "Link Failure" status can only be turned off after successfully transmitting a probe message over the link.

The following three flows are defined for data traffic:
High Reliability (Flow ID=1): High Reliability traffic will be delivered by duplication over both RAT1 and RAT2 in state 1, 2 and 3. Notice that the receiver will be responsible for detecting and removing duplicated packet based on their sequence number (using the algorithm defined in 6.6.1). Notice that high reliability flow should have low data rate (e.g., <1 Mbps).
Delay Sensitive (Flow ID=2): Delay Sensitive traffic will be delivered over RAT2 only in State 1, 2 and 3.
High Throughput (Flow ID=3): High Throughput (e.g., DL) traffic will be delivered by aggregation over both RAT1 and RAT2 in State 3, and the receiver (Gc) will be responsible for reordering packets using algorithm defined in 6.6.1 or 6.6.2. UL traffic will be delivered by RAT1 in state 1 and by RAT2 in state 2. In state 3, UL traffic will be delivered by RAT2 if the "UL-over-RAT2 flag" is set to "1", and by RAT1 otherwise. The default value of "UL-over-RAT2 flag" is 0 (disabled).

In the example of FIG. 4, RAT1 may be a WLAN RAT (e.g., WiFi) and RAT2 may be a cellular RAT (e.g., 5G/NR, LTE, GSM, GPRS, WiMAX, etc.). The specific RAT protocols may define the mechanisms and/or parameters for determining Link Failures and/or Link Successes.

Figure 5:
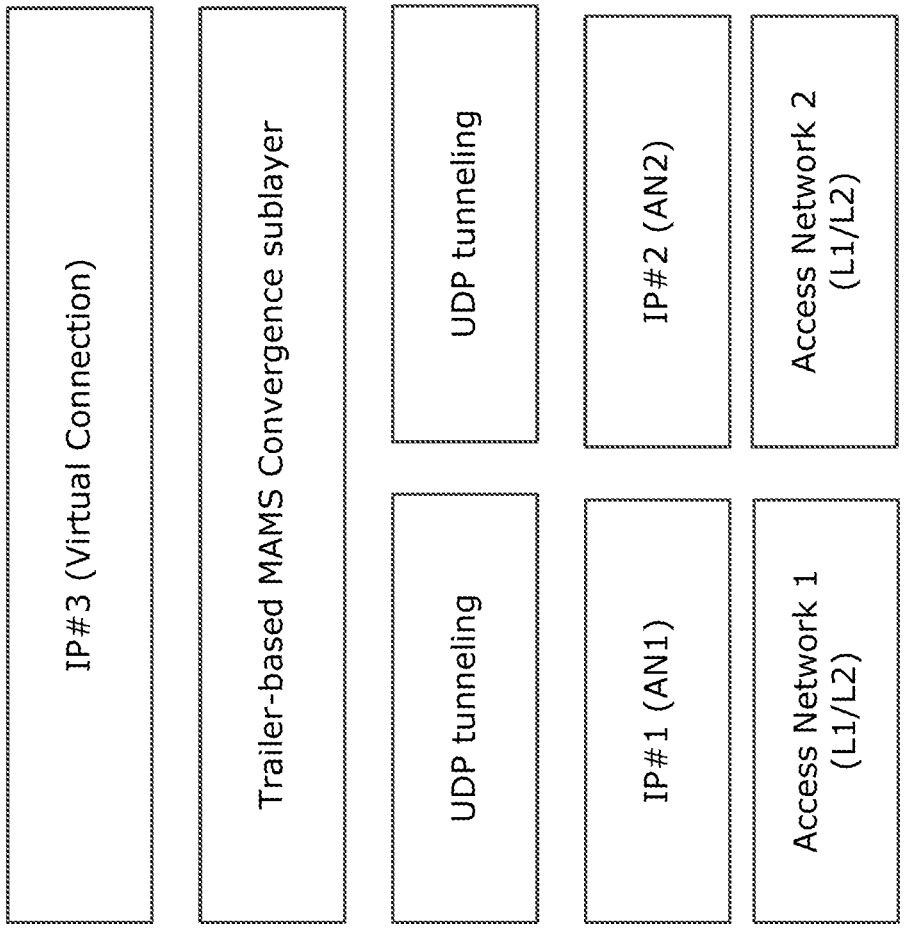
FIG. 5 depicts an example GMA-based data plane protocol stack for OTT MAMS deployments.

FIG. 5 depicts an example GMA-based data plane protocol stack 500 for OTT MAMS deployments. The GMA-based data plane protocol stack 500 includes a Virtual Connection (IP #3) layer on top of a trailer-based MAMS Convergence sublayer, which resides on top of UDP tunneling layers for respective access networks (ANs) 1 and 2, which is on top of IP layers of respective ANs 1 and 2, which is on top of layer 2 (L2) and Layer 1 (L1) of the respective ANs 1 and 2.

The anchor connection is now virtual and no longer tied to any specific access network (e.g., AN1 and AN2 in the example of FIG. 5). This virtual anchor connections may be an IP connection that is used by applications for end-to-end data transfer. The other connections (e.g., delivery connections) of AN1 and AN2 may be IP connections to deliver user data between the client and server. Additionally, the existing MAMS convergence sublayer functionalities [UP-MAMS] can be reused as is. The present disclosure provides various changes to the MAMS control signaling & messages for new functions (e.g., virtual network address (e.g., IP address or the like) assignment, etc.).

Figure 6A:
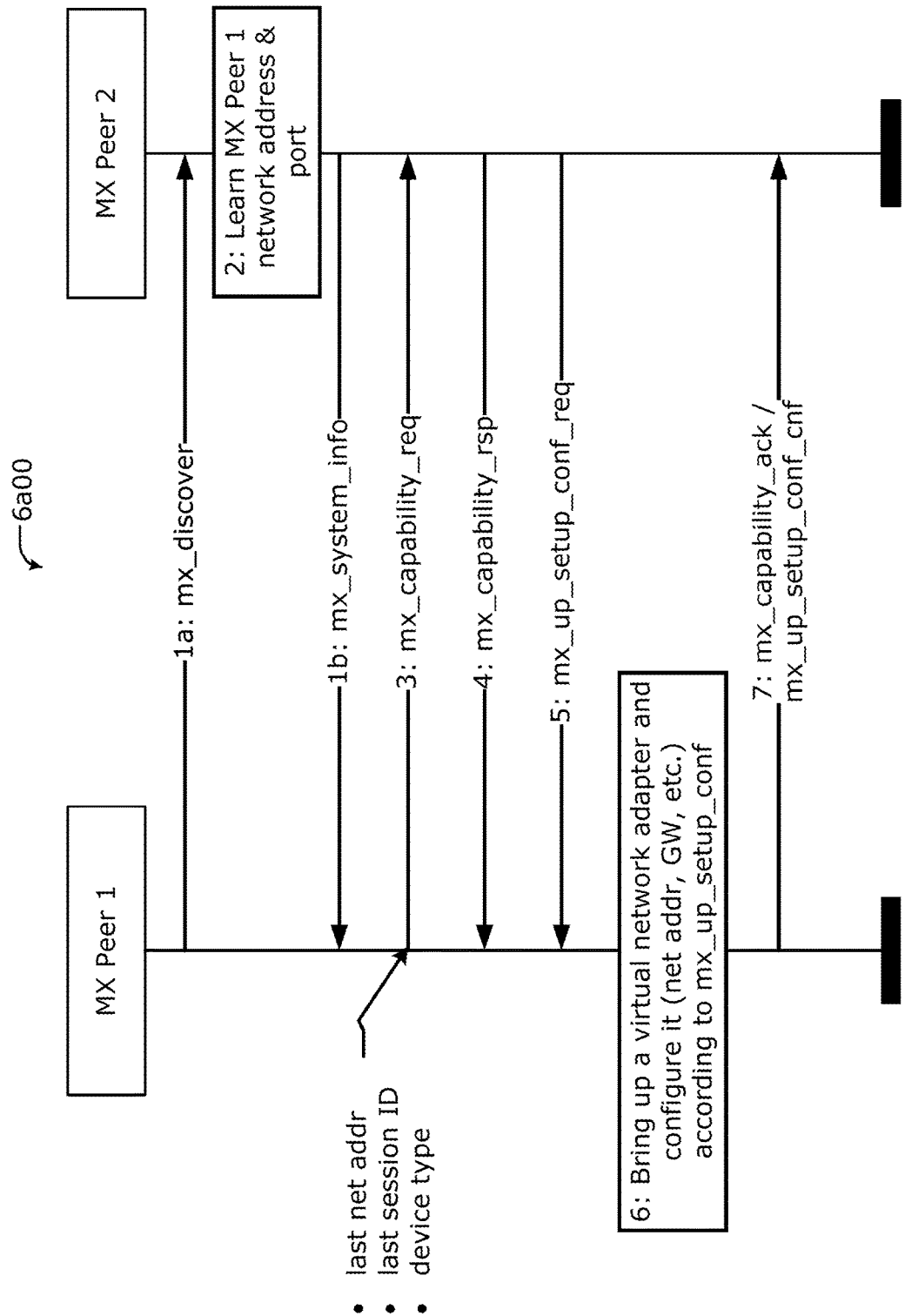
FIG. 6a shows an example MAMS service control procedure.

FIG. 6a shows an example MAMS service control procedure 6a00. In FIG. 6a, MX Peer 1 may be the CCM 206 and/or the MAMS client 101 and the MX Peer 2 may be the NCM 236 and/or the MAMS server 140 discussed previously. However, the MX Peer 1 could be the NCM 236 and/or the MAMS server 140 and the MX Peer 2 may be the CCM 206 and/or the MAMS client 101.

Procedure 6a00 begins at step 1 (discovery) where the MX Peer 1 periodically sends an MX Discover (mx_discover) message to a predefined network address (e.g., IP address or the like)/port associated with an MX Peer 2 (step 1a) until an MX System Information (mx_system_info) message is received in acknowledgment (ACK) (step 1c).

The mx_discover message includes MX Base information (MXBase) discussed infra. Additionally or alternatively, the mx_discover message may include a Mobile Country Code (MCC)/Mobile Network Code (MNC) Tuple, which is a parameter to identify the operator network to which the MX Peer 1 is subscribed, in conformance with the format specified in International Telecommunication Union, "The international identification plan for public networks and subscriptions", ITU-T Recommendation E.212, September 2016, <https://www.itu.int/rec/T-REC-E.212-201609-I/en>.

Contents of the mx_system_info message is discussed infra. Additionally or alternatively, the MX System Info message includes the following information: Number of Anchor Connections; and for each anchor connection, the following parameters are included: Connection ID: Unique identifier for the anchor connection; Connection Type (e.g., WiFi, 5G/NR, MulteFire, LTE, WiMAX, DSL, etc.); and NCM 236 Endpoint Address (for control-plane messages over this connection) such as network address (e.g., IP address, or the like), FQDN, and/or port number.

At Step 2 (capability exchange), the MX Peer 1 learns the network address (e.g., IP address or the like) and port of MX Peer 2, which may take place before or after sending the MX System Info message to the MX Peer 1.

At step 3, the MX peer 1 sends the MX Capability request (mx_capability_req) message to MX Peer 2. The MX Capability REQ includes the following parameters: MX Feature Activation List: Indicates whether the corresponding feature is supported or not (e.g., lossless switching, fragmentation, concatenation, UL aggregation, DL aggregation, measurement, probing, etc.); Number of Anchor Connections (core networks); for each anchor connection, the following parameters are included: Connection ID, and Connection Type (e.g., WiFi, 5G NR, MulteFire, LTE, etc.); Number of Delivery Connections (access links). For each delivery connection, the following parameters are included: Connection ID, Connection Type (e.g., WiFi, 5G NR, MulteFire, LTE, etc.), MX Convergence Method Support List: GMA, MPTCP Proxy, GRE Aggregation Proxy, MPQUIC; MX Adaptation Method Support List: UDP without DTLS; UDP with DTLS, IPsec [RFC3948], and/or Client NAT.

The mx_capability_req message provides the following information for the anchor connection: Connection ID: Unique identifier for the Anchor Connection; and Connection Type (e.g., 0: WiFi; 1: 5G NR; 2: MulteFire; 3: LTE, and so forth). A new "Connection Type" value (e.g., 4) is added to indicate the anchor is a virtual connection. Additionally or alternatively, the following two new parameters are added in the MX Capability Request message so that the MAMS server can determine if a MAMS client is new or reconnecting: last/previous network address (net addr) to indicate/identify the virtual network address (virtual anchor) (e.g., IP address or the like) assigned to the client in the last MAMS session (also referred to as "last_session_id"); last/previous session ID to indicate/identify the unique session id of the last MAMS session (also referred to as "last_ip_address"); and device type of the MX Peer 1 to indicate the device type (0: Android, 1: iOS, 2: Windows, 3: Linux, etc.) (also referred to as "device_type").

In response at step 4, the NCM 236 creates a unique identity for the CCM 206 session and sends the MX Capability Response (RSP). The MX Capability RSP includes the following information: MX Feature Activation List: Indicates whether the corresponding feature is enabled or not (e.g., lossless switching, fragmentation, concatenation, UL aggregation, DL aggregation, measurement, probing, etc.). Number of Anchor Connections (core networks): For each anchor connection, the following parameters are included: Connection ID, Connection Type (e.g., WiFi, 5G NR, MulteFire, LTE, etc.); Number of Delivery Connections (access links): For each delivery connection, the following parameters are included: Connection ID; Connection Type (e.g., WiFi, 5G NR, MulteFire, LTE, etc.); MX Convergence Method Support List: GMA, MPTCP Proxy, GRE Aggregation Proxy, MPQUIC; MX Adaptation Method Support List: UDP without DTLS, UDP with DTLS, IPsec [RFC3948], and/or Client NAT; Unique Session ID: Unique session identifier for the CCM 206 that set up the connection. If the session already exists, then the existing unique session identifier is returned; NCM 236 ID: Unique identity of the NCM 236 in the operator network; and/or Session ID: Unique identity assigned to the CCM 206 instance by this NCM 236 instance.

At step 5, the MX Peer 2 (e.g., NCM 237 and/or server 140) sends an MX UP Setup Configuration (mx_up_setup_conf_req) message to the MX Peer 1 (e.g., CCM 206 and/or client 101). The mx_up_setup_conf_req message is used to configure the MAMS data plane operation, and includes the following parameters for each anchor connection: Anchor Connection ID; Connection Type (e.g., 0: WiFi; 1: 5G NR; 2: MulteFire; 3: LTE, and so forth); Convergence Method & parameters.

A new parameter "Virtual Network Client IP parameters" is defined for the MX UP Setup Config message if the (anchor) Connection Type is "Virtual Network". It may include the following information: Client network address (e.g., IPv4 address, IPv6 address, or the like) on the virtual network; Gateway network address (e.g., IPv4 address, IPv6 address, or the like) of the virtual network; Domain Name Service (DNS) server network address (e.g., IPv4 address, IPv6 address, or the like) of the virtual network; and MAMS server Endpoint Address on the virtual network, which may include network address (e.g., IP address or the like), FQDN, and/or port number. Additionally or alternatively, the Virtual Network Client IP parameters includes a network mask (e.g., a "netmask" or "subnet mask").

At step 6 after receiving the mx_up_setup_conf_req message, the MX Peer 1 (e.g., MAMS client 101) brings up a virtual network adapter, and configure its network address (e.g., IP address or the like), Gateway, and DNS accordingly. All other MAMS signaling & control messages can be reused as is discussed in [RFC8743] (e.g., receiving a MX Capability Response (mx_capability_rsp) and so forth).

In response to the MX Capability RSP, at step 7 the CCM 206 sends a confirmation (or rejection) in the MX Capability Acknowledge (mx_capability_ack) message and/or MX UP Setup Confirm (mx_up_setup_conf_cnf) message. The MX Capability ACK includes the following parameters: Unique Session ID: Same identifier as the identifier provided in the MX Capability Response; Acknowledgment: An indication of whether the client has accepted or rejected the capability exchange phase; MX ACCEPT: The CCM 206 accepts the capability set proposed by the NCM 236; MX REJECT: The CCM 206 rejects the capability set proposed by the NCM 236.

The mx_up_setup_conf_cnf message is enhanced to configure the virtual IP interface on the MX Peer 1 (e.g., client 101) including, for example, network address (e.g., IP address), gateway, DNS server, network mask, etc.; provide some or all GMA client configuration parameters (as discussed) to the MX Peer 1 (e.g., client 101); and provide a list of applications allowed to use GMA optimizations using a parameter "APP List" to list such applications.

If the NCM 236 receives an MX_REJECT, the current MAMS session will be terminated. If the CCM 206 can no longer continue with the current capabilities, may send an MX Session Termination Request to terminate the MAMS session. In response, the NCM 236 may send an MX Session Termination Response to confirm the termination. The client 101 additionally or alternatively sends an MX UP Setup Confirm (CNF) message. This message may be included with the acknowledgement (ACK) message discussed above or sent as a separate message.

Figure 6B:
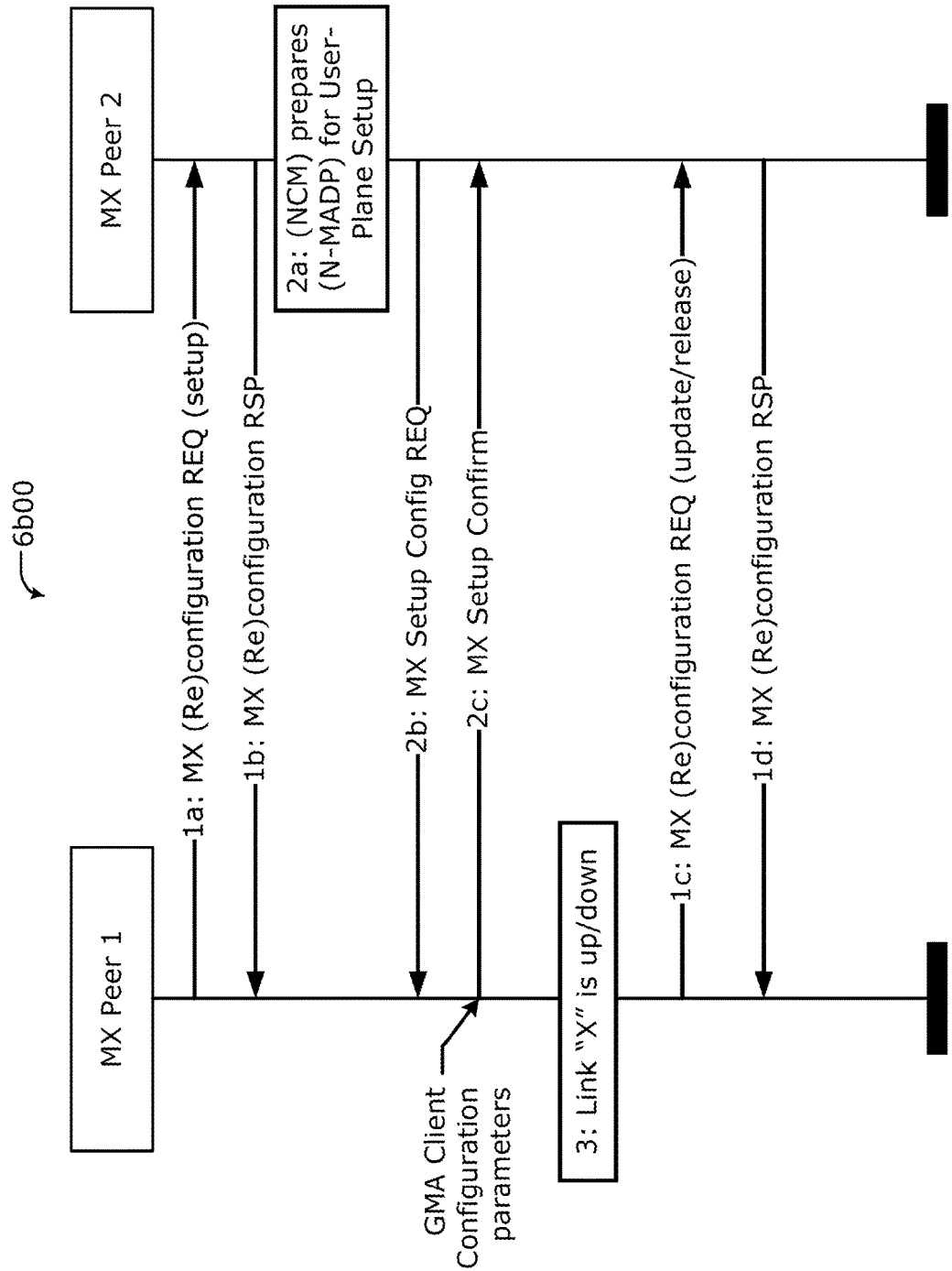
FIG. 6b shows an example MAMS control procedure for user plane configuration.

FIG. 6b shows a MAMS UP configuration procedure 6b00. In FIG. 6b, MX Peer 1 may be the CCM 206 and/or the MAMS client 101 and the MX Peer 2 may be the NCM 236 and/or the MAMS server 140 discussed previously. However, the MX Peer 1 could be the NCM 236 and/or the MAMS server 140 and the MX Peer 2 may be the CCM 206 and/or the MAMS client 101.

Procedure 6b00 includes reconfiguration steps/operations and user plane (UP) setup steps/operations. For reconfiguration, the MX Peer 1 (e.g., CCM 206) informs the MX Peer 2 (e.g., NCM 236) about the changes to the MX Peer 1's connections—setup of anew connection, teardown of an existing connection, or update of parameters related to an existing connection. The MX Peer 1 (e.g., client 101) triggers the procedure by requesting an update to the connection configuration, and a response from the MX Peer 2 (e.g., NCM 236). For the UP Setup, the MX Peer 2 (e.g., NCM 236) configures the UP protocols at the MX Peer 1 (e.g., CCM 206) and the network. The MX Peer 2 (e.g., NCM 236) initiates the UP setup by sending the MX UP Setup Configuration Request to the MX Peer 1 (e.g., client 101), which confirms the set of mutually acceptable parameters by using the User Plane Setup Confirmation (CNF) message. Reconfiguration includes the following steps/operations:

When the client detects that the link is up/down or the network address (e.g., IP address or the like) changes (e.g., via APIs provided by the client OS), the MX Peer 1 (e.g., CCM 206) sends an MX Reconfiguration Request (REQ) to setup the connection at step 1a. At step 1b, the MX Peer 2 (e.g., NCM 236) sends an MX Reconfiguration Response (RSP) to confirm receipt of the MX Reconfiguration REQ and includes the base information discussed infra.

The MX Reconfiguration REQ message includes the following information: Unique Session ID (identity of the MX Peer 1 (e.g., CCM 206) at the MX Peer 2 (e.g., NCM 236), created by the MX Peer 2 (e.g., NCM 236) during the capability exchange phase); Reconfiguration Action (indicates the reconfiguration action (release, setup, or update)); and Connection ID (identifies the connection for reconfiguration).

If the Reconfiguration Action is set to "setup" or "update", then the MX Reconfiguration Request message includes the following parameters: network address (e.g., IP address or the like) of the connection; identifier(s) of the connection (e.g., Service Set Identifier (SSID) of the WiFi connection); MTU of the connection (the MTU of the delivery path that is calculated at the client 101 for use by the MX Peer 2 (e.g., NCM 236) to configure fragmentation and concatenation procedures [UPMAMS] at the N-MADP 237; and Delivery Node ID (identity of the node to which the client is attached (e.g., ECGI for an LTE connection, 5GCGI for a 5G/NR connection, an AP ID or a MAC address for a WiFi connection, and the like).

At the beginning of a connection setup, the MX Peer 1 (e.g., CCM 206) informs the MX Peer 2 (e.g., NCM 236) of the connection status using the MX Reconfiguration REQ with the Reconfiguration Action set to "setup". The MX Peer 2 (e.g., NCM 236) acknowledges the connection setup status and exchanges parameters with the MX Peer 1 (e.g., CCM 206) for UP setup, as described below.

Setup of UP Protocols includes the following steps/operations:

Based on the negotiated capabilities, at step 2a the MX Peer 2 (e.g., NCM 236) sets up the UP (e.g., Adaptation Layer and Convergence Layer) protocols at the MX Peer 2 (e.g., N-MADP 237) and informs the MX Peer 1 (e.g., CCM 206) of the UP protocols to be set up at the MX Peer 1 (e.g., client, C-MADP 207) and the parameters for the MX Peer 1 (e.g., C-MADP 207) to connect to the MX Peer 2 (e.g., N-MADP 237).

At step 2b, the MX UP Setup Configuration REQ is used to create one or more MADP instances, with each anchor connection having one or more configurations, namely MX Configurations. The MX UP Setup Configuration Request includes the following parameters: Number of Anchor Connections (core networks). For each anchor connection, the following parameters are included: Anchor Connection ID; Connection Type (e.g., WiFi, 5G/NR, MulteFire, LTE, etc.); and Number of Active MX Configurations (included only if more than one MX configuration is active for the anchor connection). For each active MX configuration, the following parameters are included: MX Configuration ID (included if more than one MX configuration is present); MX Convergence Method, which may be, for example, GMA, MPTCP Proxy, GRE Aggregation Proxy, and MPQUIC; MX Convergence Method Parameters, which may be, for example, Convergence Proxy IP Address, Convergence Proxy Port, and Client Key; MX Convergence Control Parameters (included if any MX Control PDU types (e.g., Probe-REQ/ACK) are supported): UDP port number for sending and receiving MX Control PDUs (e.g., Probe-REQ/ACK, Keep-Alive), and Convergence Proxy Port; Number of Delivery Connections. For each delivery connection, include the following: Delivery Connection ID, Connection Type (e.g., Wi-Fi, 5G NR, MulteFire, LTE, etc.), MX Adaptation Method, which may be, for example, UDP without DTLS, UDP with DTLS, IPsec, Client NAT; and MX Adaptation Method Parameters, which may be, for example, Tunnel Endpoint Network Address (e.g., IP address or the like), Tunnel Endpoint Port, Shared Secret, and Header Optimization (e.g., included only if the MX Convergence Method is GMA).

For example, when LTE and WiFi are the two UP accesses, the MX Peer 2 (e.g., NCM 236) conveys to the MX Peer 1 (e.g., CCM 206) that IPsec needs to be set up as the MX Adaptation Layer over the WiFi access, using the following parameters: IPsec endpoint IP address, and Pre-Shared Key. No Adaptation Layer is needed if it is considered secure with no NAT, or a Client NAT may be used over the LTE access. Similarly, as an example of the MX Convergence Method, the configuration indicates the convergence method as the MPTCP proxy, along with parameters for a connection to the MPTCP proxy: namely the IP address and port of the MPTCP proxy for TCP applications.

Once the UP protocols are configured, at step 2c the MX Peer 1 (e.g., CCM 206) informs the MX Peer 2 (e.g., NCM 236) of the status via the MX UP Setup Confirmation (mx_up_setup_conf_cnf) message. The MX UP Setup Confirmation includes the following parameters: Unique Session ID (session identifier provided to the client in an MX Capability Response); MX Convergence Control Parameters (included if any MX Control PDU types (e.g., Probe-REQ/ACK, Keep-Alive) are supported), which may include, for example, port number (e.g., one or more TCP and/or UDP port numbers) for sending and receiving MX Control PDUs (e.g., Probe-REQ/ACK, Keep-Alive), convergence proxy port, and/or MX Configuration ID (if an MX Configuration ID is specified in an MX UP Setup Configuration Request) to indicate the MX Configuration that will be used for probing) and MX Peer 1 (e.g., client 101) Adaptation-Layer Parameters, which may include, for example, Number of Delivery Connections. Each delivery connection includes the following: Delivery Connection ID, and port number (e.g., UDP port number, if UDP-based adaptation is in use, the UDP port on the C-MADP 207 side).

The mx_up_setup_conf_cnf message is enhanced to configure virtual IP interface on the MX Peer 1 (e.g., client 101) including, for example, network address (e.g., IP address or the like), gateway, DNS server, network mask, etc., provide all the GMA client configuration parameters (discussed infra), and provide a list of applications (apps) allowed to use GMA optimizations. The mx_up_setup_conf_cnf message contains the following information: APP List indicating/including a list of apps allowed to use GMA optimizations (e.g. com.google.android.youtube, etc.).

After the Setup of UP Protocols (step 2), the MX Peer 1 (e.g., CCM 206) detects that the link is up/down or the network address (e.g., IP address or the like) changes (e.g., via APIs provided by the client OS) at step 3. Then, at step 1c the MX Peer 1 (e.g., CCM 206) sends another MX Reconfiguration REQ to update or release the connection. At step 1d, the MX Peer 2 (e.g., NCM 236) sends another MX Response RSP to confirm receipt of the other MX Reconfiguration REQ and includes the base information discussed infra.

1.2. MAMS Management Messages

As mentioned previously, the GMA system 300 may use various MAMS management messages 330 configure the data plane functions (e.g., Gc 301 and Gs 340), These MAMS management messages 330 may include one or more of the following MAMS messages:

MX Discover Message (mx_discover): This message is the first message sent by the CCM 206 to discover the presence of NCM 236 in the network. It contains only the base information as described in Appendix C.2.1 of [RFC8743] with message_type set as mx_discover).

MX System Info Message (mx_system_info): This message is sent by the NCM 236 to the CCM 206 to inform the endpoints that the NCM 236 supports MAMS functionality. In addition to the base information described in Appendix C.2.1 of [RFC8743], it contains the following information:
NCM Connection described infra and in Appendix C.2.3 of [RFC8743].

MX Capability Request (mx_capability_req): This message is sent by the CCM 206 to the NCM 236 to indicate the capabilities of the CCM 206 instance available to the NCM 236 indicated in the System Info message earlier. In addition to the base information described in Appendix C.2.1 of [RFC8743], it contains the following information:
(a) Features and their activation status (see e.g., Appendix C.2.5 of [RFC8743]).
(b) Number of Anchor Connections: The number of anchor connections (toward the core) supported by the NCM 236.
(c) Anchor connections (see e.g., Appendix C.2.6 of [RFC8743]).
(d) Number of Delivery Connections: The number of delivery connections (toward the access) supported by the NCM 236.
(e) Delivery connections (see e.g., Appendix C.2.7 of [RFC8743]).
(f) Convergence methods (see e.g., Appendix C.2.9 of [RFC8743]).
(g) Adaptation methods (see e.g., Appendix C.2.10 of [RFC8743]).

The mx_capability_req message is enhanced to include the following new parameters:
last_ip_address to indicate the virtual network address (e.g., IP address or the like) used in the last MAMS session
last_session_id to indicate the unique session id of the last MAMS session
device_type to indicate the device type (e.g., 0: Android, 1: iOS, 2: Windows, 3: Linux, etc.).

Moreover, the following new messages are introduced in the GMA system 300: mx_session_resume_req/rsp (discussed infra). The mx_session_resume_req/rsp messages is/are for notifying server that client has resumed the GMA operation, and for time synchronization. Both messages share the same format as mx_session_termination_req/rsp, and carry unique_session_id.

MX Capability Response (mx_capability_resp or mx_capability_rsp): This message is sent by the NCM 236 to the CCM 206 to indicate the capabilities of the NCM 236 instance and unique session identifier for the CCM 206. In addition to the base information described in Appendix C.2.1 of [RFC8743], the mx_capability_resp contains the following information:
(a) Features and their activation status (see e.g., Appendix C.2.5 of [RFC8743]).
(b) Number of Anchor Connections: The number of anchor connections (toward the core) supported by the NCM 236.
(c) Anchor connections (see e.g., Appendix C.2.6 of [RFC8743]).
(d) Number of Delivery Connections: The number of delivery connections (toward the access) supported by the NCM 236.
(e) Delivery connections (see e.g., Appendix C.2.7 of [RFC8743]).
(f) Convergence methods (see e.g., Appendix C.2.9 of [RFC8743]).
(g) Adaptation methods (see e.g., Appendix C.2.10 of [RFC8743]).

(h) Unique Session ID: This uniquely identifies the session between the CCM 206 and the NCM 236 in a network (see e.g., Appendix C.2.2 of [RFC8743]).

If the "number of anchor connections" parameter in mx_capability_rsp message is set to "0", indicating the server has rejected the client's request, the client should stop the procedure immediately and wait for the next event (WiFi connect) to start again.

MX Capability Acknowledge (mx_capability_ack): This message is sent by the CCM 206 to the NCM 236 to indicate acceptance of capabilities advertised by the NCM 236 in an earlier MX Capability Response message. In addition to the base information described in Appendix C.2.1 of [RFC8743], it contains the following information:
 (a) Unique Session ID: Same identifier as the identifier provided in the MX Capability Response (see e.g., Appendix C.2.2 of [RFC8743]).
 (b) Capability Acknowledgment: Indicates either acceptance or rejection of the capabilities sent by the CCM 206. Can use either "MX_ACCEPT" or "MX REJECT" as acceptable values.

MX User-Plane Configuration Request (mx_up_setup_conf_req): This message is sent by the NCM 236 the CCM 206 to configure the user plane for MAMS. In addition to the base information described in Appendix C.2.1 of [RFC8743], it contains the following information:
 (a) Number of Anchor Connections: The number of anchor connections supported by the NCM 236.
 (b) Setup of anchor connections (see e.g., Appendix C.2.11 of [RFC8743]).

The mx_up_setup_conf message is enhanced to configure a virtual IP interface on the client 101 (e.g., including the network address (e.g., IP address or the like), gateway, dns server, network mask, or the like).

MX User-Plane Configuration Confirmation (mx_up_setup_conf_cnf): This message is the confirmation of the UP setup message sent from the CCM 206 after successfully configuring the user plane on the client. This message contains the following information:
 (a) Unique Session ID: Same identifier as the identifier provided in the MX Capability Response (see e.g., Appendix C.2.2 of [RFC8743]).
 (b) MX probe parameters (included if probing is supported):
  (1) Probe Port: UDP port for accepting probe message.
  (2) Anchor connection ID: Identifier of the anchor connection to be used for probe function. Provided in the MX UP Setup Configuration Request.
  (3) MX Configuration ID: This parameter is included only if the MX Configuration ID parameter is available from the UP setup configuration. It indicates the MX configuration ID of the anchor connection to be used for probe function.
 (c) The following information is required for each delivery connection:
  (1) Connection ID: Delivery connection ID supported by the client.
  (2) Client Adaptation-Layer Parameters: If the UDP Adaptation Layer is in use, then the UDP port to be used on the C-MADP side.

As discussed herein, the mx_up_setup_cnf message is enhanced to configure a virtual IP interface on the client 101 (e.g., network address (e.g., IP address or the like), gateway, dns server, network mask, or the like), provide all the GMA client configuration parameters to the client 101, and provide a list of applications allowed to use GMA optimizations. It contains the following information: APP List (e.g., com.google.android.youtube, and/or the like).

MX Reconfiguration Request (mx_reconf_req): This message is sent by the NCM 236 to the CCM 206 to configure the user plane for MAMS. In addition to the base information described in Appendix C.2.1 of [RFC8743], it contains the following information:
 (a) Unique Session ID: Identifier for the CCM 206-NCM 236 association (see e.g., Appendix C.2.2 of [RFC8743]).
 (b) Reconfiguration Action: The reconfiguration action type can be one of "setup", "release", or "update".
 (c) Connection ID: Connection ID for which the reconfiguration is taking place.
 (d) Network address (e.g., IP address or the like): Included if Reconfiguration Action is either "setup" or "update".
 (e) SSID: If the connection type is WiFi, then this parameter contains the SSID to which the client has attached.
 (f) MTU of the connection: The MTU of the delivery path that is calculated at the client for use by the NCM 236 to configure fragmentation and concatenation procedures at the N-MADP.
 (g) Connection Status: This parameter indicates whether the connection is currently "disabled", "enabled", or "connected". Default: "connected".
 (h) Delivery Node ID: Identity of the node to which the client is attached. In the case of LTE, this is an ECGI. In the case of WiFi, this is an AP ID or a MAC address.

MX Reconfiguration Response (mx_reconf_rsp): This message is sent by the NCM 236 to the CCM 206 as a confirmation of the received MX Reconfiguration Request and contains only the base information in Appendix C.2.1 of [RFC8743].

MX Path Estimation Request (mx_path_est_req): This message is sent by the NCM 236 toward the CCM 206 to configure the CCM 206 to send MX Path Estimation Results. In addition to the base information described in Appendix C.2.1 of [RFC8743], it contains the following information:
 (a) Connection ID: ID of the connection for which the path estimation report is required.
 (b) Init Probe Test Duration: Duration of initial probe test, in milliseconds.
 (c) Init Probe Test Rate: Initial testing rate, in megabits per second.
 (d) Init Probe Size: Size of each packet for initial probe, in bytes.
 (e) Init Probe-ACK: If an acknowledgment for probe is required. (Possible values: "yes", "no")
 (f) Active Probe Frequency: Frequency, in milliseconds, at which the active probes shall be sent.
 (g) Active Probe Size: Size of the active probe, in bytes.
 (h) Active Probe Duration: Duration, in seconds, for which the active probe shall be performed.
 (i) Active Probe-ACK: If an acknowledgment for probe is required. (Possible values: "yes", "no").

MX Path Estimation Results (mx_path_est_results): This message is sent by the CCM 206 to the NCM 236 to report on the probe estimation configured by the NCM 236. In addition to the base information described in Appendix C.2.1 of [RFC8743], it contains the following information:
 (a) Connection ID: ID of the connection for which the path estimation report is required (see e.g., Appendix C.2.2 of [RFC8743]).
 (b) Init Probe Test Duration: Duration of initial probe test, in milliseconds.

(c) Init Probe Test Rate: Initial testing rate, in megabits per second (see e.g., Appendix C.2.12 of [RFC8743]).
(d) Init Probe Size: Size of each packet for initial probe, in bytes (see e.g., Appendix C.2.13 of [RFC8743]).

MX Traffic Steering Request (mx_traffic_steering_req): This message is sent by the NCM 236 to the CCM 206 to enable traffic steering on the delivery side in UL and DL configurations. In addition to the base information described in Appendix C.2.1 of [RFC8743], it contains the following information:
(a) Connection ID: Anchor connection number for which the traffic steering is being defined.
(b) MX Configuration ID: MX configuration for which the traffic steering is being defined.
(c) DL Delivery (see e.g., Appendix C.2.14 of [RFC8743]).
(d) Default UL Delivery: The default delivery connection for the UL. All traffic should be delivered on this connection in the UL direction, and the Traffic Flow Template (TFT) filter should be applied only for the traffic mentioned in Uplink Delivery
(e) Uplink Delivery (see e.g., Appendix C.2.15 of [RFC8743]).
(f) Features and their activation status (see e.g., Appendix C.2.5 of [RFC8743]).

MX Traffic Steering Response (mx_traffic_steering_rsp): This message is a response to an MX Traffic Steering Request from the CCM 206 to the NCM 236. In addition to the base information described in Appendix C.2.1 of [RFC8743], it contains the following information:
(a) Unique Session ID: Same identifier as the identifier provided in the MX Capability Response (see e.g., Appendix C.2.2 of [RFC8743]).
(b) Features and their activation status (see e.g., Appendix C.2.5 of [RFC8743]).

MX SSID Indication (mx_ssid_indication): This message is sent by the NCM 236 to the CCM 206 to indicate the list of allowed SSIDs that are supported by the MAMS entity on the network side. It contains the list of SSIDs. Each SSID comprises the type of SSID (which can be one of the following: SSID, BSSID, or HESSID) and the SSID itself.

MX Keep Alive Request (mx_keep_alive_req): An MX Keep-Alive Request can be sent from either the NCM 236 or the CCM 206 on expiry of the Keep-Alive timer or a handover event. The peer shall respond to this request with an MX Keep-Alive Response. In the case of no response from the peer, the MAMS connection shall be assumed to be broken, and the CCM 206 shall establish a new connection by sending MX Discover messages. In addition to the base information described in Appendix C.2.1 of [RFC8743], it contains the following information:
(a) Keep-Alive Reason: Reason for sending this message (e.g., "Timeout", "Handover", or the like).
(b) Unique Session ID: Identifier for the CCM 206-NCM 236 association (see e.g., Appendix C.2.2 of [RFC8743]).
(c) Connection ID: Connection ID for which handover is detected, if the reason is "Handover".
(d) Delivery Node ID: The target delivery node ID (e.g., NCGI, ECGI, WiFi AP ID/MAC address, etc.) to which the handover is executed.

MX Keep Alive Response (mx_keep_alive_rsp): On receiving an MX Keep-Alive Request from a peer, the NCM 236/CCM 206 shall immediately respond with an MX Keep-Alive Response on the same delivery path from where the request arrived. In addition to the base information, it contains the unique session identifier for the CCM 206-NCM 236 association (see e.g., Appendix C.2.2 of [RFC8743]).

MX Measurement Configuration (mx_measurement_conf): This message is sent from the NCM 236 to the CCM 206 to configure the period measurement reporting at the CCM 206. The message contains a list of measurement configurations, with each element containing the following information:
(a) Connection ID: Connection ID of the delivery connection for which the reporting is being configured.
(b) Connection Type: Connection type for which the reporting is being configured (e.g., "LTE", "WiFi", "5G NR", etc.).
(c) Measurement Report Configuration: Actual report configuration based on the Connection Type (see e.g., Appendix C.2.17 of [RFC8743]).

MX Measurement Report (mx_measurement_report): This message is periodically sent by the CCM 206 to the NCM 236 after measurement configuration. In addition to the base information, it contains the following information:
(a) Unique Session ID: Same identifier as the identifier provided in the MX Capability Response (see e.g., Appendix C.2.2 of [RFC8743]).
(b) Measurement report for each delivery connection is measured by the client (see e.g., Appendix C.2.18 of [RFC8743]).

MX Session Termination Request (mx_session_termination_req): In the event where the NCM 236 or CCM 206 can no longer handle MAMS for any reason, it can send an MX Session Termination Request to the peer. In addition to the base information (MXBase), it contains a Unique Session ID and the reason for the termination such as, for example, "MX_NORMAL_RELEASE", "MX_NO_RESPONSE", or "INTERNAL_ERROR".

MX Session Termination Response (mx_session_termination_rsp): On receipt of an MX Session Termination Request from a peer, the NCM 236/CCM 206 shall respond with MX Session Termination Response on the same delivery path where the request arrived and clean up the MAMS-related resources and settings. The CCM 206 shall reinitiate a new session with MX Discover messages.

MX Application MADP Association Request (mx_app_madp_assoc_req): This message is sent by the CCM 206 to the NCM 236 to select MADP instances provided earlier in the MX UP Setup Configuration Request, based on requirements for the applications. In addition to the base information described in Appendix C.2.1 of [RFC8743], it contains the following information:
(a) Unique Session ID: This uniquely identifies the session between the CCM 206 and the NCM 236 in a network (see e.g., Appendix C.2.2 of [RFC8743]).
(b) A list of MX Application MADP Associations, with each entry as follows:
(1) Connection ID: Represents the anchor connection number of the MADP instance.
(2) MX Configuration ID: Identifies the MX configuration of the MADP instance.
(3) Traffic Flow Template Uplink: Traffic Flow Template to be used in the UL direction (see e.g., Appendix C.2.16 of [RFC8743]).
(4) Traffic Flow Template Downlink: Traffic Flow Template to be used in the DL direction (see e.g., Appendix C.2.16 of [RFC8743]).

MX Application MADP Association Response (mx_app_madp_assoc_rsp): This message is sent by the NCM 236 to the CCM 206 to confirm the selected MADP instances provided in the MX Application MADP Association Request by the CCM 206. In addition to the base information described in Appendix C.2.1 of [RFC8743], it contains information if the request has been successful.

MX Network Analytics Request (mx_network_analytics_req): This message is sent by the CCM 206 to the NCM 236 to request parameters like bandwidth, jitter, latency, and signal quality predicted by the network analytics function. In addition to the base information, it contains the following parameter:
  (a) Unique Session ID: Same identifier as the identifier provided in the MX Capability Response (see e.g., Appendix C.2.2 of [RFC8743]).
  (b) Parameter List: List of parameters in which the CCM 206 is interested: one or more of "bandwidth", "jitter", "latency", and "signal_quality".

MX Network Analytics Response (mx_network_analytics_rsp): This message is sent by the NCM 236 to the CCM 206 in response to the MX Network Analytics Request. For each delivery connection that the client has, the NCM 236 reports the requested parameter predictions and their respective likelihoods (between 1 and 100 percent). In addition to the base information described in Appendix C.2.1 of [RFC8743], it contains the following information:
  (a) Number of Delivery Connections: The number of delivery connections that are currently configured for the client.
  (b) The following information is provided for each delivery connection:
    (1) Connection ID: Connection ID of the delivery connection for which the parameters are being predicted.
    (2) Connection Type: Type of connection. Can be "WiFi", "5G_NR", "MulteFire", or "LTE".
    (3) List of Parameters for which Prediction is requested, where each of the predicted parameters consists of the following:
      (a) Parameter Name: Name of the parameter being predicted (e.g., "bandwidth", "jitter", "latency", "signal_quality", and/or the like).
      (b) Additional Parameter: If Parameter name is "signal_quality", then this qualifies the quality parameter (e.g., "lte_rsrp", "lte_rsrq", "nr_rsrp", "nr_rsrq", "wifi_rssi", and/or the like).
      (c) Predicted Value: Provides the predicted value of the parameter and, if applicable, the additional parameter.
      (d) Likelihood: Provides a stochastic likelihood of the predicted value.
      (e) Validity Time: The time duration for which the predictions are valid.

In addition to the above, where the MAMS system implements the GMA protocol (see e.g., FIGS. 7-8) the following new messages are introduced:

MX Session Suspend Request (mx_session_suspend_req): used to notify the server 140 that the client 101 has suspended MAMS/GMA (session) operation, and may be used for time synchronization as discussed herein. The mx_session_suspend_req shares the same format as the mx_session_termination_req, and carries a unique_session_id.

MX Session Suspend Response (mx_session_suspend_rsp): used to notify the client 101 that the server 140 has suspended MAMS/GMA (session) operation, and may be used for time synchronization. The mx_session_suspend_rsp shares the same format as the mx_session_termination_rsp, and carries a unique_session_id.

MX Session Resume Request (mx_session_resume_req): used to notify the server 140 that the client 101 has resumed MAMS/GMA (session) operation and/or may be used for time synchronization. The mx_session_resume_req shares the same format as the mx_session_termination_req and/or mx_session_termination_rsp, and carries the unique_session_id. The reason for resuming the session (e.g., MAMS and/or GMA operation) may be different than those listed for the mx_session_termination_req. The reason for the resuming a session may be, for example, application or device waking up from idle or sleep state (e.g., "APP_ACTIVE", "GC_ACTIVE", "GS ACTIVE", etc.), delivery connection being (re)established (e.g., "MX_RESPONSE"), a screen being turned on, one or more packets being sent over a delivery connection, a total throughput being at or above a threshold amount of throughput, link quality being at or above a threshold quality measurement, and/or other reasons.

MX Session Resume Response (mx_session_resume_rsp): used to notify the client 101 that the server 140 has resumed MAMS/GMA (session) operation and/or may be used for time synchronization. The mx_session_resume_rsp shares the same format as the mx_session_termination_req and/or mx_session_termination_rsp, and carries a unique_session_id.

The above messages may be used during a suspend/resume procedure, which allows the MAMS client 101 to notify the MAMS server 140 about temporarily suspending all MAMS operations to conserve resources and/or save power. In response, the MAMS server 140 keeps all the MAMS context information of the client 101 and stops performing any MAMS-specific operations (e.g., GMA convergence on the data plane). This procedure enhances the MAMS framework to improve client power efficiency and reduce resource consumption, for example, when the client device 101 is unattended or/and has very little active traffic.

The previously described MAMS control/management messages may include the following data types.

Base information (MXBase): This data type is the base information that every message between the CCM 206 and NCM 236 exchanges has including the following information:
  (a) Version: Version of MAMS used.
  (b) Message Type: Message type being sent, where the following are considered valid values: "mx_discover", "mx_system_info", "mx_capability_req", "mx_capability_rsp", "mx_capability_ack", "mx_up_setup_conf_req", "mx_up_setup_cnf", "mx_reconf_req", "mx_reconf_rsp", "mx_path_est_req", "mx_path_est_results", "mx_traffic_steering_req", "mx_traffic_steering_rsp", "mx_ssid_indication", "mx_keep_alive_req", "mx_keep_alive_rsp", "mx_measurement_conf", "mx_measurement_report", "mx_session_termination_req", "mx_session_termination_rsp", "mx_session_resume_req", "mx_session_resume_rsp", "mx_app_madp_assoc_req", "mx_app_madp_assoc_rsp", "mx_network_analytics_req", "mx_network_analytics_rsp"
  (c) Sequence Number: Sequence number to uniquely identify a particular message exchange (e.g., MX Capability Request/Response/Acknowledge).

Unique Session ID: This data type represents the unique session ID between a CCM 206 and NCM 236 entity. It contains an NCM ID that is unique in the network and a session ID that is allocated by the NCM for that session. On receipt of the MX Discover message, if the session exists, then the old session ID is returned in the MX System Info message; otherwise, the NCM 236 allocates a new session ID for the CCM 206 and sends the new ID in the MX System Info message.

NCM Connections: This data type represents the connection available at the NCM 236 for MAMS connectivity toward the client. It contains a list of NCM 236 connections available, where each connection has the following information:
  (a) Connection Information, see Appendix C.2.4 of [RFC8743].
  (b) NCM Endpoint Information: Contains the network address (e.g., IP address or the like) and port exposed by the NCM 236 endpoint for the CCM 206.

Connection Information: This data type provides the mapping of connection ID and connection type. This data type contains the following information:
  (a) Connection ID: Unique number or string identifying the connection.
  (b) Connection Type: Type of RAT connection associated with the connection ID. Examples of the type of connection include "Wi-Fi", "5G_NR", "MulteFire", "LTE", "DSL", etc.

Features and Their Activation Status: This data type provides the list of all features with their activation status. Each feature status contains the following:
  (a) Feature Name: the name of the feature can be one of the following: "lossless_switching", "fragmentation", "concatenation", "uplink_aggregation", "downlink_aggregation", and "measurement".
  (b) Active status: Activation status of the feature: "true" means that the feature is active, and "false" means that the feature is inactive.

Anchor Connections: This data type contains the list of Connection Information items (see e.g., Appendix C.2.4 of [RFC8743]) that are supported on the anchor (core) side.

Delivery Connections: This data type contains the list of Connection Information items (see e.g., Appendix C.2.4 of [RFC8743]) that are supported on the delivery (access) side.

Method Support: This data type provides the support for a particular convergence or adaptation method. It consists of the following:
  (a) Method: Name of the method.
  (b) Supported: Whether the method listed above is supported or not. Possible values are "true" and "false".

Convergence Methods: This data type contains the list of all convergence methods and their support status. Examples of the possible convergence methods include: "GMA", "MPTCP_Proxy", "GRE_Aggregation_Proxy", and "MPQUIC".

Adaptation Methods: This data type contains the list of all adaptation methods and their support status. Examples of the possible adaptation methods include: "UDP_without_DTLS", "UDP_with_DTLS", "IPsec", and "Client_NAT".

Setup of Anchor Connections: This data type represents the setup configuration for each anchor connection that is required on the client's side. It contains the following information, in addition to the connection ID and type of the anchor connection:
  (a) Number of Active MX Configurations: If more than one active configuration is present for this anchor, then this identifies the number of such connections.
  (b) The following convergence parameters are provided for each active configuration:
    (1) MX Configuration ID: Present if there are multiple active configurations. Identifies the configuration for this MADP instance ID.
    (2) Convergence Method: Convergence method selected (see convergence methods discussed previously and/or described in Appendix C.2.9 of [RFC8743]).
    (3) Convergence Method Parameters described in Appendix C.2.11.1 of [RFC8743].
    (4) Number of Delivery Connections: The number of delivery connections (access side) that are supported for this anchor connection.
    (5) Setup of delivery connections described in Appendix C.2.11.2 of [RFC8743].

Convergence Method Parameters: This data type represents the parameters used for the convergence method and contains the following:
  (a) Proxy IP: IP address of the proxy that is provided by the selected convergence method.
  (b) Proxy Port: Port of the proxy that is provided by the selected convergence method.

Setup Delivery Connections: This is the list of delivery connections and their parameters to be configured on the client. Each delivery connection defined by its connection information (see e.g., Appendix C.2.4 of [RFC8743]) optionally contains the following:
  (a) Adaptation Method: Selected adaptation method name. This shall be one of the methods listed in Appendix C.2.10 of [RFC8743].
  (b) Adaptation Method Parameters: Depending on the adaptation method, one or more of the following parameters shall be provided:
    (1) Tunnel Network Address (e.g., IP address or the like).
    (2) Tunnel Port address.
    (3) Shared Secret.
    (4) MX header optimization: If the adaptation method is UDP_without_DTLS or UDP_with_DTLS, and convergence is GMA, then this flag represents whether or not the checksum field and the length field in the IP header of an MX PDU should be recalculated by the MX Convergence Layer. The possible values are "true" and "false". If it is "true", both fields remain unchanged; otherwise, both fields should be recalculated. If this field is not present, then the default of "false" should be considered.

Init Probe Results: This data type provides the results of the init probe request made by the NCM. It consists of the following information:
  (a) Lost Probes: Percentage of probes lost.
  (b) Probe Delay: Average delay of probe message, in microseconds.
  (c) Probe Rate: Probe rate achieved, in megabits per second.

Active Probe Results: This data type provides the results of the active probe request made by the NCM. It consists of the following information:
  (a) Average Probe Throughput: Average active probe throughput achieved, in megabits per second.

Downlink Delivery: This data type represents the list of connections that are enabled on the delivery side to be used in the downlink direction.

Uplink Delivery: This data type represents the list of connections and parameters enabled for the delivery side to be used in the uplink direction. The uplink delivery consists of multiple uplink delivery entities, where each entity consists of a Traffic Flow Template (TFT) (see e.g., Appendix C.2.16 of [RFC8743]) and a list of connection IDs in the uplink, where traffic qualifying for such a Traffic Flow Template can be redirected.

Traffic Flow Template: The Traffic Flow Template generally follows the guidelines specified in 3GPP TS 23.060 v 16.0.0 (2019 Mar. 25). The Traffic Flow Template in MAMS consists of one or more of the following:
  (a) Remote Address and Mask: IP address and subnet for remote addresses represented in Classless Inter-Domain Routing (CIDR) notation. Default: "0.0.0.0/0".
  (b) Local Address and Mask: IP address and subnet for local addresses represented in CIDR notation. Default: "0.0.0.0/0"
  (c) Protocol Type: IP protocol number of the payload being carried by an IP packet (e.g., UDP, TCP). Default: 255.
  (d) Local Port Range: Range of ports for local ports for which the Traffic Flow Template is applicable. Default: Start=0, End=65535.
  (e) Remote Port Range: Range of ports for remote ports for which the Traffic Flow Template is applicable. Default: Start=0, End=65535.
  (f) Traffic Class: Represented by Type of Service in IPv4 and Traffic Class in IPv6. Default: 255
  (g) Flow Label: Flow label for IPv6, applicable only for IPv6 protocol type. Default: 0.

Measurement Report Configuration: This data type represents the configuration done by the NCM 236 toward the CCM 206 for reporting measurement events:
  (a) Measurement Report Parameter: Parameter that shall be measured and reported. This is dependent on the connection type:
    (1) For the connection type of "Wi-Fi", the allowed measurement type parameters are "WLAN_RSSI", "WLAN_LOAD", "UL_TPUT", "DL_TPUT", "EST_UL_TPUT", and "EST_DL_TPUT".
    (2) For the connection type of "LTE", the allowed measurement type parameters are "LTE_RSRP", "LTE_RSRQ", "UL_TPUT", and "DL_TPUT".
    (3) For the connection type of "5G_NR", the allowed measurement type parameters are "NR_RSRP", "NR_RSRQ", "UL_TPUT", and "DL TPUT".
  (b) Threshold: High and low threshold for reporting.
  (c) Period: Period for reporting, in milliseconds.

Measurement Report: This data type represents the measurements reported by the CCM for each access network measured. This type contains the connection information, the Delivery Node ID that identifies either the cell (ECGI) or the WiFi Access Point ID or MAC address (or equivalent identifier in other technologies), and the actual measurement performed by the CCM in the last measurement period 1.3. Generic Multi-Access (GMA) Encapsulation Protocol As alluded to previously, for MX devices, it is desirable to combine the multiple access network connections seamlessly to improve quality of experience. Such optimization may require additional control information, for example, Sequence Number (SN), in each data packet (e.g., IP packet). The Generic Multi-Access (GMA) Encapsulation Protocol [GMA07], [GMA09] is a new light-weight and flexible encapsulation protocol for this need.

Referring back to FIG. 1C, the convergence (sub)layer in the MAMS DPPS 100C is responsible for multi-access operations, including multi-link (path) aggregation, splitting/reordering, lossless switching/retransmission, fragmentation, concatenation, etc. It operates on top of the adaptation (sub)layer in the protocol stack 102, 142. From the Tx perspective, a User Payload (e.g., IP packet) is processed by the convergence layer first, and then by the adaptation layer before being transported over a delivery connection; from the Receiver perspective, an IP packet received over a delivery connection is processed by the adaptation layer first, and then by the convergence layer.

Today, Generic Routing Encapsulation (GRE) is used as the encapsulation protocol at the convergence layer to encode additional control information (e.g., Key, Sequence Number) (see e.g., 3GPP TS 36.361 v 15.0.0 (2018 Jul. 9) ("[LWIPEP]"), Dommety, G., "Key and Sequence Number Extensions to GRE", IETF RFC 2890, (September 2000) ("[GRE1]"), and Leymann et al., "Huawei's GRE Tunnel Bonding Protocol", IETF RFC 8157 (May 2017) ("[GRE2]"). However, there are two main drawbacks with this approach including, for example, IP-over-IP tunnelling (required for GRE) leads to higher overhead especially for small packets; and it is difficult to introduce new control fields. For example, the overhead of IP-over-IP/GRE tunnelling with both Key and Sequence Number is 32 Bytes (20 Bytes IP header+12 Bytes GRE header), which is 80% of a 40 Bytes TCP ACK packet.

The GMA encapsulation protocol is implemented at the convergence layer. GMA supports three encapsulation methods/formats: trailer-based IP encapsulation, header-based IP encapsulation, and non-IP encapsulation. Particularly, the IP Encapsulation methods avoid IP-over-IP tunneling overhead (e.g., 20 Bytes), which is 50% of a 40 Bytes TCP ACK packet. Moreover, GMA introduces new control fields to support fragmentation and concatenation, which are not available in conventional GRE-based solutions such as in [LWIPEP], [GRE1], and [GRE2].

GMA operates between endpoints that have been configured to operate with GMA through additional control messages and procedures (see e.g., [RFC8743]). Moreover, UDP or IPSec tunneling may be used at the adaptation sublayer to protect GMA operation from intermediate nodes.

As shown by FIGS. 1A, 1B, 1C, a client device 101 (e.g., a smartphone, laptop, IoT device, etc.) may connect to the Internet via multiple access network connections 105. One of these connections (e.g., connection 105A) may operate as an anchor connection, and the other connection (e.g., connection 105B) may operate as the delivery connection. The anchor connection provides the network address (e.g., IP address or the like) and connectivity for end-to-end (e2e) Internet access, and the delivery connection provides additional path between the client 101 and the MX gateway (e.g., MX server 140) for multi-access optimizations. In some implementations, the anchor connection when GMA is used may be a virtual IP connection similar to what is used in a VPN, and there may be up to two simultaneous delivery connections (e.g., 5G/NR, LTE, WiFi, etc.), each of which has a dedicated UDP tunnel established over for data transfer.

For example, per-packet aggregation allows a single IP flow to use the combined bandwidth of the two connections. In another example, packets lost due to temporarily link outage may be retransmitted. Moreover, packets may be duplicated over multiple connections to achieve high reliability and low latency, and duplicated packets should be eliminated by the receiving side. Such multi-access optimization requires additional control information (e.g., SN) in each IP data packet, which can be supported by the GMA encapsulation protocol described herein, and/or in [GMA07] and/or [GMA09].

GMA is usually used when multiple access network connections are used, but may also be used when only a single access network connection is used. In these scenarios, GMA may be used for loss detection and recovery purposes, or used to concatenate multiple small packets to reduce per packet overhead/resource consumption.

1.3.1. GMA Encapsulation Methods and Formats

The GMA encapsulation protocol supports the following three methods: trailer-based IP encapsulation; header-based IP encapsulation; and (header-based) non-IP encapsulation. Trailer-based IP encapsulation should be used as long as implementation allows. Header-based encapsulation should be used if trailered-based encapsulation is not feasible due to any reason (e.g., implementation constraints). In this case, if the adaptation layer (e.g., UDP tunnelling) supports non-IP packet format, header-based non-IP encapsulation should be used; otherwise, header-based IP encapsulation should be used.

If non-IP encapsulation is configured, GMA header should always be present in every packet. In comparison, if IP encapsulation is configured, GMA header or trailer may be added dynamically on per-packet basis, and it indicates the presence of GMA header (or trailer) to set the protocol type of the GMA PDU to "114".

Figure 7:
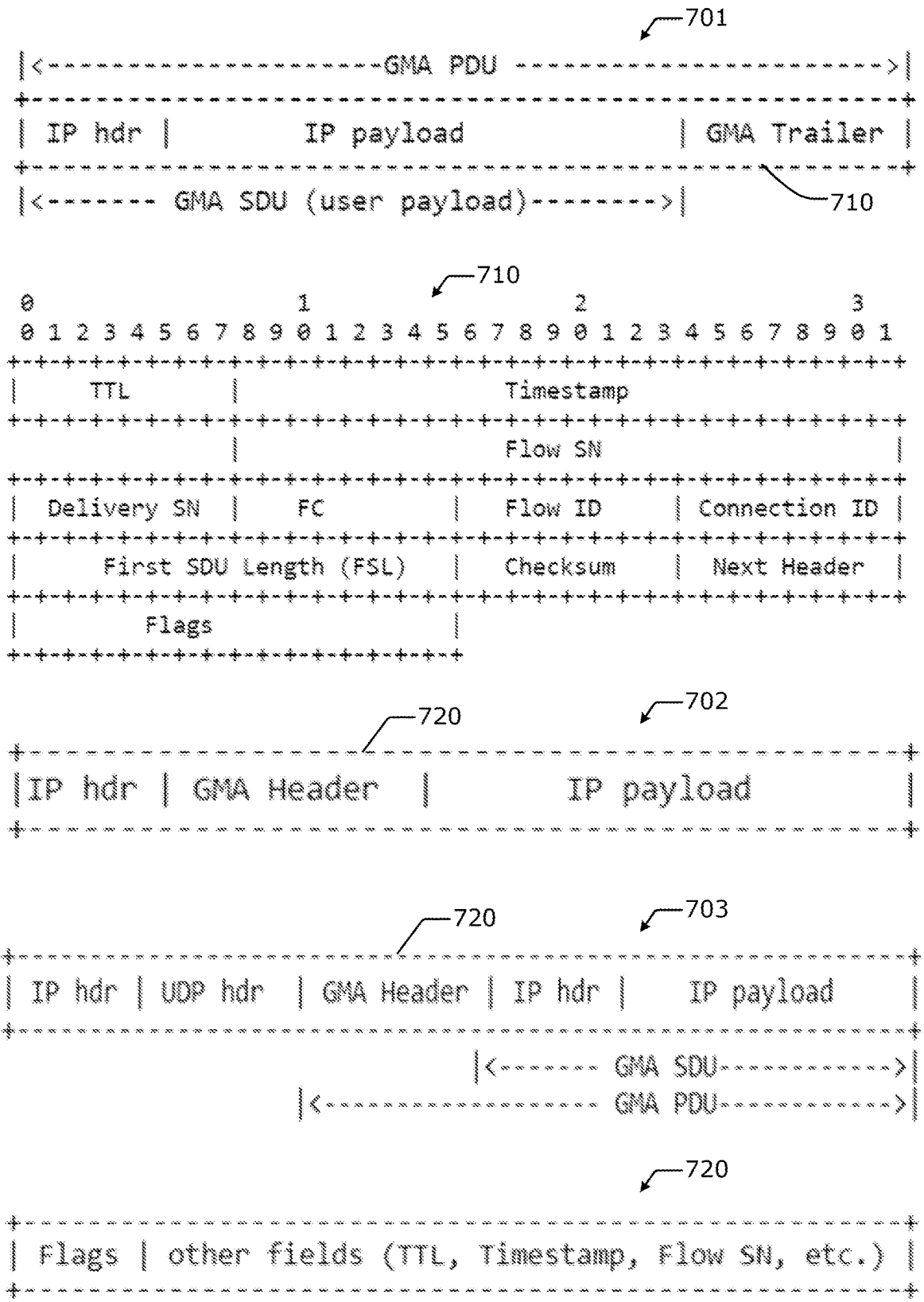
FIG. 7 illustrates various Generic Multi-Access (GMA) packet formats.

The GMA endpoints may configure the encapsulation method through control signaling (see e.g., FIG. 2B) or pre-configuration. For example, an "MX UP Setup Configuration Request" message as discussed in [RFC8743] includes the "MX Convergence Method Parameters," which provides the list of parameters to configure the convergence layer, and can be extended to indicate the GMA encapsulation method. A "GMA encapsulation format" parameter may be included to indicate one of the three GMA encapsulation methods FIG. 7 shows various GMA Protocol Data Unit (PDU) formats including a GMA PDU Format with Trailer-based IP Encapsulation 701, a GMA PDU Format with Header-based IP Encapsulation 702, and a GMA PDU Format with Non-IP Encapsulation 703. Each GMA PDU (regardless of the particular format used) may carry one or more IP packets (also referred to as (GMA) service data units (SDUs)), or a fragment of an IP packet (or (GMA) SDU fragment), in the payload section of the PDU.

The GMA PDU 701 includes an IP header, IP payload, and a GMA trailer 710. The other GMA PDUs 702 and 703 include a GMA header 420 instead of the GMA trailer 710. The GMA trailer 710 and GMA header 720 include various GMA control fields. Usually, the trailer-based IP encapsulation GMA PDU 701 is used as long as implementation allows/permits. However, the header-based encapsulation PDUs 702 and 703 may be used if the GMA control fields cannot be added at the end of the packets.

1.3.1.1. Trailer-Based IP Encapsulation

For the trailer-based GMA PDU 701, the Protocol Type field in the IP header is changed to "114" (any 0-hop protocol) to indicate the presence of the GMA trailer 710.

If the original IP packet is IPv4, the following three IP header fields may be changed:
  IP length field—add the length of the "GMA Trailer" to the length of the original IP packet;
  Time to Live (TTL)—set the TTL field to "1";
  IP checksum field—recalculate IP checksum after changing the "Protocol Type" field, "TTL", and "IP Length".

If the original IP packet is Ipv 6, the following two IP header fields may be changed:
  IP length field—add the length of the "GMA Trailer" to the length of the original IP packet;
  Hop Limit (HL) field—set the HL field to "0".

If UDP tunnelling is used at the adaptation layer to carry the GMA PDU 701, 702 or 703, these three IP header fields may remain unchanged, and the Rx will determine the GMA PDU length based on the UDP packet length.

FIG. 7 also shows an example format of the GMA trailer 710, which shows various control fields present. The GMA trailer 710 includes one or more mandatory fields and zero or more optional fields. The mandatory fields include the "flags" field and "next header" field, which are the last 3 bytes of the GMA trailer 710. The Next Header field (1 Byte) indicates the IP protocol type of the (first) SDU in a PDU, and it stores the value before it was overwritten to '114.' For the Flags field (2 Bytes), Bit 0 is the most significant bit (MSB), and Bit 15 is the least significant bit (LSB). The Flags field includes the following fields: Checksum Present (bit 0): If the Checksum Present bit is set to 1, then the Checksum field is present; Concatenation Present (bit 1): If the Concatenation Present bit is set to 1, then the PDU carries multiple SDUs, and the First SDU Length field is present; Connection ID Present (bit 2): If the Connection ID Present bit is set to 1, then the Connection ID field is present; Flow ID Present (bit 3): If the Flow ID Present bit is set to 1, then the Flow ID field is present; Fragmentation Present (bit 4): If the Fragmentation Present bit is set to 1, then the PDU carry a fragment of the SDU and the Fragmentation Control field is present; Delivery SN Present (bit 5): If the Delivery Sequence Number (SN) Present bit is set to 1, then the Delivery SN field is present and contains the valid information; Flow SN Present (bit 6): If the Flow SN Present bit is set to 1, then the Sequence Number field is present; Timestamp Present (bit 7): If the Timestamp Present bit is set to 1, then the Timestamp field is present; TTL Present (bit 8): If the TTL Present bit is set to 1, then the TTL field is present; Reserved (bit 9-12): set to "0" and ignored on receipt; Version (bit 13-15): GMA version number, set to 0 for the GMA encapsulation protocol specified in [GMA07] and/or [GMA09]. The Flags field is at the end of the PDU and the Next Header field is the second to last field. The GMA Rx may decode the Flags field first to determine the length of the GMA trailer, and then decodes the one or more optional fields included in the GMA PDU (discussed infra).

The GMA trailer 710 may also include zero or more of the following optional fields: Checksum (1 Byte) to contain the (one's complement) checksum sum of all the 8 bits in the trailer 710 (for purposes of computing the checksum, the value of the checksum field is Zero; this field is present only if the Checksum Present bit is set to one); First SDU Length (2 Bytes) indicates the length of the first IP packet in the PDU, only included if a PDU contains multiple IP packets (e.g., this field is present only if the Concatenation Present bit is set to one); Connection ID (1 Byte) includes an unsigned integer to identify the anchor and/or delivery connection of the GMA PDU (e.g., this field is present only if the Connection ID Present bit is set to one): the Anchor Connection ID data element/field (MSB 4 Bits of the Connection ID field) is an unsigned integer to identify the anchor connection, and the Delivery Connection ID data element/field (LSB 4 Bits of the Connection ID field) is an unsigned integer to identify the delivery connection; Flow ID (1 Byte) includes an unsigned integer to identify the IP flow that a PDU belongs to, for example, Data Radio Bearer (DRB) ID [LWIPEP] for a cellular (e.g. LTE, 5G/NR, etc.) connection (e.g., this field is present only if the Flow ID Present bit is set to one); Fragmentation Control (FC) (e.g. 1 Byte) to provide necessary information for re-assembly, only needed if a PDU carries fragments (e.g., this field is present only if the Fragmentation Present bit is set to one; see e.g., section 5 in [GMA07] and/or [GMA09]); Delivery SN (1 Byte) includes an auto-incremented integer to indicate the GMA PDU transmission order on a delivery connection (e.g., the Delivery SN may be needed to measure packet loss of each delivery connection and therefore generated per delivery connection per flow; e.g., this field is present only if the Delivery SN Present bit is set to one); Flow SN (3 Bytes) includes an auto-incremented integer to indicate the GMA SDU (e.g., IP packet) order of a flow (e.g., the flow SN may be needed for retransmission, reordering, and fragmentation; the flow SN may be generated per flow; e.g., this field is present only if the Flow SN Present bit is set to one; Timestamp (4 Bytes) to contain the current value of the timestamp clock of the transmitter in the unit of 1 millisecond. This field is present only if the Timestamp Present bit is set to one; and TTL (1 Byte) to contain the TTL value of the original IP header if the GMA SDU is IPv4, or the Hop-Limit value of the IP header if the GMA SDU is IPv6 (e.g., field is present only if the TTL Present bit is set to one). The GMA control fields follow the bit order in the flags field (e.g., Bit 0 (MSB) of the flags field is the checksum present bit, and the checksum field is the last in the trailer 710 except for the two mandatory fields; Bit 1 is the concatenation present bit and the FSL field is the second to last, and so forth).

1.3.1.2. Header-Based IP Encapsulation

FIG. 7 also shows the header-based IP encapsulation format 702. Here, the GMA header 720 is inserted right after the IP header of the GMA SDU.

FIG. 7 also shows an example GMA header (hdr) format 720, which includes the Flags field and the GMA control fields. In comparison to GMA trailer 710, the only difference is that the Flags field is now in the front so that the Rx can first decode the Flags field to determine the GMA header length. Moreover, the IP header fields of the GMA PDU should be changed in the same way as trailered-based IP encapsulation (as discussed previously). Additionally or alternatively, the TTL, FSL, and Next Header fields are removed from the GMA control fields since the IP header fields of the GMA SDU remain unchanged during encapsulation. The order of the other GMA control fields is/are the same as discussed previously.

In some implementations, if the adaptation layer (e.g., UDP tunnelling or the like) supports a non-IP packet format, the GMA PDU 702 may be used without modification. If the adaptation layer (see e.g., FIG. 1B) only supports the IP packet format, the header-based IP encapsulation GMA PDU 703 may be used. In the header-based IP encapsulation PDU 703, the IP header of the GMA SDU (e.g., IP payload) is moved to the front of the packet so that the GMA PDU 703 becomes an IP packet, and the IP header fields of the GMA PDU 703 may be changed in the same manner as the trailer-based IP encapsulation PDU 701.

The header or trailer based IP encapsulation PDUs 702, 701 may be used dynamically on a per-packet basis, and setting the protocol type of the GMA PDU to "114" indicates the presence of the GMA header 720 in an IP packet.

1.3.1.3. (Header-Based) Non-IP Encapsulation

FIG. 7 also shows the header-based non-IP encapsulation format 703. Here, "UDP Tunnelling" is configured at the MX adaptation layer. Additionally, the "TTL", "FSL", and "Next Header" are no longer needed. Moreover, the IP header fields of the GMA SDU remain unchanged. If non-IP encapsulation is configured, the GMA header 720 is also present.

1.3.2. Fragmentation

The convergence layer MAY support fragmentation if a delivery connection has a smaller maximum transmission unit (MTU) than the original IP packet (SDU). The fragmentation procedure at the convergence sublayer is similar to IP fragmentation (see e.g., "DARPA Internet Program Protocol Specification" IETF RFC 791 (September 1981)) in principle, but with the following two differences for less overhead: the fragment offset field is expressed in number of fragments; and the maximum number of fragments per SDU is $2^7$ (=128).

The Fragmentation Control (FC) field in the GMA trailer (or header) contains the following bits: Bit #7: a More Fragment (MF) flag to indicate if the fragment is the last one (0) or not (1); and Bit #0~#6: Fragment Offset (in units of fragments) to specify the offset of a particular fragment relative to the beginning of the SDU.

A PDU carries a whole SDU without fragmentation if the FC field is set to all "0"s or the FC field is not present in the trailer. Otherwise, the PDU contains a fragment of the SDU.

The Flow SN field in the trailer is used to distinguish the fragments of one SDU from those of another. The Fragment Offset (FO) field tells the receiver the position of a fragment in the original SDU. The More Fragment (MF) flag indicates the last fragment.

To fragment a long SDU, the transmitter creates n PDUs and copies the content of the IP header fields from the long PDU into the IP header of all the PDUs. The length field in the IP header of PDU should be changed to the length of the PDU, and the protocol type should be changed to 114.

The data of the long SDU is divided into n portions based on the MTU size of the delivery connection. The first portion of the data is placed in the first PDU. The MF flag is set to "1", and the FO field is set to "0". The i-th portion of the data is placed in the i-th PDU. The MF flag is set to "0" if it is the last fragment and set to "1" otherwise. The FO field is set to i−1.

To assemble the fragments of a SDU, the receiver combines PDUs that all have the same Flow SN. The combination is done by placing the data portion of each fragment in the relative order indicated by the Fragment Offset in that fragment's GMA trailer (or header). The first fragment will have the Fragment Offset set to "0", and the last fragment will have the More-Fragments flag set to "0".

GMA fragmentation operates above the IP layer of individual access connection (e.g., RAT1, RAT2, etc.) and between the two end points of convergence layer. The convergence layer end points (client, multi-access gateway) should obtain the MTU of individual connection through either manual configuration or implementing Path MTU Discovery (PMTUD) as suggested in Bonica et al., "IP Fragmentation Considered Fragile", IETF RFC 8900 (September 2020).

1.3.3. Concatenation

The convergence sublayer may support concatenation if a delivery connection has a larger maximum transmission unit (MTU) than the original IP packet (SDU). Only the SDUs with the same client network address (e.g., IP address or the like), and the same Flow ID may be concatenated. If the (trailer or header based) IP encapsulation method is used, the First SDU Length (FSL) field should be included in the GMA trailer (or header) to indicate the length of the first SDU. Otherwise, the FSL field should not be included.

To concatenate two or more SDUs, the transmitter creates one PDU and copies the content of the IP header field from the first SDU into the IP header of the PDU. The data of the first SDU is placed in the first portion of the data of the PDU. The whole second SDU is then placed in the second portion of the data of the PDU. The procedure continues till the PDU size reaches the MTU of the delivery connection. If the FSL field is present, the IP length field of the PDU should be updated to include all concatenated SDUs and the trailer (or header), and the IP checksum field should be recalculated if the packet is IPv4.

To disaggregate a PDU, if the (header or trailer based) IP encapsulation method is used, the receiver first obtains the length of the first SDU from the FSL field and decodes the first SDU. The receiver then obtains the length of the second SDU based on the length field in the second SDU IP header and decodes the second SDU. The procedure continues till no byte is left in the PDU. If the non-IP encapsulation method is used, the IP header of the first SDU will not change during the encapsulation process, and the receiver SHOULD obtain the length of the first SDU directly from its IP header.

If a PDU contains multiple SDUs, the Flow SN field is for the last SDU, and the Flow SN of other SDU carried by the same PDU can be obtained according to its order in the PDU. For example, if the SN field is 6 and a PDU contains 3 SDUs (IP packets), the SN is 4, 5, and 6 for the first, second, and last SDU respectively. GMA concatenation can be used for packing small packets of a single application, e.g. TCP ACKs, or from multiple applications. Notice that a single GMA flow may carry multiple application flows (TCP, UDP, etc.).

1.3.4. GMA Protocol Stack

Figure 8:
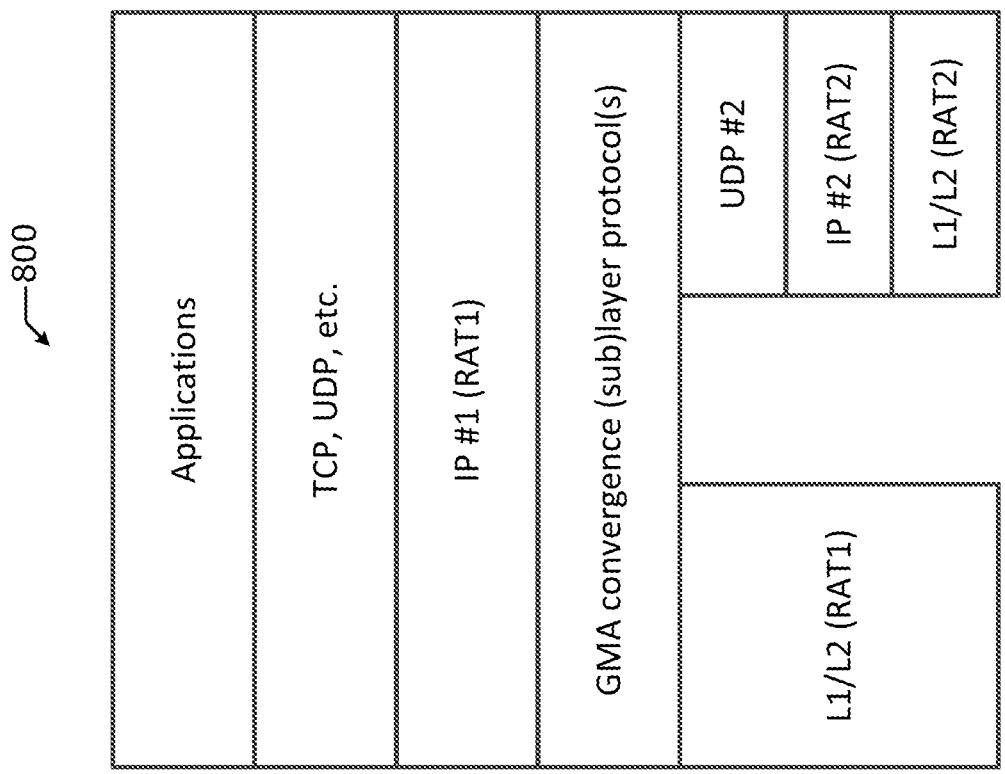
FIG. 8 shows an example GMA-based MAMS data plane protocol stack.

FIG. 8 shows an (anchored) integrated GMA convergence protocol stack 800. As alluded to previously, GMA data plane functions (e.g., Gc and Gs) may be integrated into one or more existing network functions (e.g., a Gateway (GW), MEC, etc.) to avoid using virtual network interface (e.g., IP #3). FIG. 8 shows the integrated GMA data plane protocol stack 800 using the RAT1 connection as the anchor connection. As a result, only one UDP tunnel is needed for delivering traffic over the non-anchor connection, which is the RAT2 connection.

In one example, the RAT1 anchor connection is a cellular connection (e.g., 5G/NR, LTE, etc.) and the RAT2 non-anchor connection is a WiFi connection. If using the 5G/LTE connection as the anchor for applications, and the WiFi connection as the delivery connection, UDP tunneling (or IPSec) may be used for delivering 5G/LTE IP traffic over a WiFi network. The GMA convergence sublayer (see also e.g., FIGS. 1A, 1B, 1C) is responsible for multi-path management operations (e.g., lossless switching, aggregation/splitting, etc.). In another example, a virtual IP connection may be used as the anchor, and the server 140 will provide all necessary information through MAMS signaling to configure the virtual IP connection on the client side 101. In the example GMA-MAMS DPPS 800, the GMA data plane functions (Gc 301 and Gs 340) may be integrated into an existing network function (e.g., Gateway, edge server/host such as a MEC server/host, etc.) to avoid using a virtual network interface.

1.3.5. GMA Configuration Parameters

Some example GMA configuration parameters are as follows:

RAT1 probing interval: 30 seconds
RAT2 probing interval in state 1 and 2: 30 seconds
RAT2 probing interval in state 3: 10 second
RAT2 reconnecting interval: 60 seconds
Low throughput threshold: 10 kBps
Link disconnect timer: 10 minutes
RAT1 signal quality low threshold: −75 dBm
RAT1 signal quality high threshold: −70 dBm
RAT1 packet loss low threshold: 1%
RAT1 packet loss high threshold: 10%
Reordering queue size for High Throughput Flow (Flow ID=3): 1000 packets
Reordering timer for High Throughput Flow (Flow ID=3): 100 ms
Reordering queue size for High Reliability Flow (Flow ID=1): 20 packets
Reordering timer for High Reliability Flow (Flow ID=1): 10 ms
Measurement Interval (MI): 30 seconds
Reporting Interval (RI): 50 (MIs)
Default Flow ID (DFI): 3
Control message retransmission limit: 3
Virtual NIC MTU size: 1400 (bytes)
Idle Timer: 1 minute
Timestamp unit: 1000 (us)
UL-over-LTE flag: 0 (disabled, default)/1 (enabled)
Wi-Fi Congestion Detection flag: 0 (disabled, default)/1 (enabled)
Power Save flag: 0 (disabled, default)/1 (enabled)

Both Gc and Gs maintain the following (per-client) parameter(s):

Start_Time: the duration between now and next "time zero" when Start Time is reset (in the unit of 1 ms).
tx_timeStamp: a timestamp of when a packet is transmitted.
rx_timeStamp: a timestamp of when a packet is received.
Sync_Guard_Time: configurable parameter that controls how long Gc or Gs should wait before starting measurements (based on timestamp info in received packet(s)).

Gc and Gs reset their respective "Start_Time" immediately after the successful exchange of mx_session_resume_req/rsp, and the (tx) timestamp parameter in a control message indicates the duration between transmitting the message and resetting Start Time.

In the above example, RAT1 is a WLAN connection/RAT (e.g., WiFi or the like) and RAT2 is a cellular connection/RAT (e.g., LTE, 5G/NR, GSM, WiMAX, or the like).

1.3.6. GMA Deployment Scenarios

Some example GMA based deployments may be as follows:

In a first GMA deployment, GMA client modules (e.g., GMA Gc and/or CCM 206) may be implemented as a "multi-home VPN" application and run on a UE (e.g., smartphone, tablet, PC, etc.) without any impact to platform or operation system.

In a second GMA deployment, the GMA server modules (e.g., GMA Gs and/or NCM 236) may be implemented as an "edge/cloud server" application (e.g., MEC app or the like) and run in the edge or cloud server without any impact to platform or operation system. If running GMA server on the edge, the traffic routing policy may be configured on the edge platform such that the following three flows are routed locally to the edge platform:

TCP flow (for MAMS management messages): IP #1 (or IP #2)+TCP #1
UDP flow (for tunneling traffic over the 1$^{st}$ delivery connection): IP #1+UDP #1
UDP flow (for tunneling traffic over the second delivery connection): IP #2+UDP #2

Moreover, a DNS configuration may be added to the edge platform such that "gmaserver.mec.com" is mapped to IP #1 and IP #2 over the two delivery connections, respectively.

2. Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to edge computing configurations provided within Multi-Access Edge Computing (MEC) and 5G network implementations. However, many other standards and network implementations are applicable to the edge and service management concepts discussed herein. Additionally or alternatively, many other edge computing/networking technologies in various combinations and layouts of devices located at the edge of a network may be used. Examples of such other edge computing/networking technologies include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used.

FIG. 9 illustrates a MEC system reference architecture (or MEC architecture) 900 providing functionalities in accordance with ETSI GS MEC 003 v 2.1.1 (2019 January) ("[MEC003]"). MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP C-V2X based protocols) need to exchange data, provide data to aggregation points and access to data in databases which provide an overview of the local situation derived from a multitude of sensors (by various cars, roadside units, etc.).

The MEC architecture 900 includes MEC hosts 902, a virtualization infrastructure manager (VIM) 908, an MEC platform manager 906, an MEC orchestrator 910, an operations support system (OSS) 912, a user app proxy 914, a UE app 918 running on UE 920, and CFS portal 916. The MEC host 902 can include a MEC platform 932 with filtering rules control component 940, a DNS handling component 942, a service registry 938, and MEC services 936. The MEC services 936 can include at least one scheduler, which can be used to select resources for instantiating MEC apps (or NFVs) 926 upon virtualization infrastructure (VI) 922. The MEC apps 926 can be configured to provide services 930, which can include processing network communications traffic of different types associated with one or more wireless connections (e.g., connections to one or more RANs or core network functions) and/or some other services such as those discussed herein. The other MEC host 902 may have a same or similar configuration/implementation as the MEC host 902, and the other MEC app 926 instantiated within other MEC host 902 can be similar to the MEC apps 926 instantiated within MEC host 902. The VI 922 includes a data plane 924 coupled to the MEC platform 922 via an MP2 interface. Additional interfaces between various network entities of the MEC architecture 900 are illustrated in FIG. 9.

The MEC system 900 includes three groups of reference points, including "Mp" reference points regarding the MEC platform functionality; "Mm" reference points, which are management reference points; and "Mx" reference points, which connect MEC entities to external entities. The interfaces/reference points in the MEC system 900 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces.

The logical connections between various entities of the MEC architecture 900 may be access-agnostic and not dependent on a particular deployment. MEC enables implementation of MEC apps 926 as software-only entities that run on top of a VI 922, which is located in or close to the network edge. A MEC app 926 is an application that can be instantiated on a MEC host 902 within the MEC system 900 and can potentially provide or consume MEC services 936.

The MEC entities depicted by FIG. 9 can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE 920, and is discussed in more detail infra. The MEC host level includes one or more MEC hosts 902, 904 and MEC management entities, which provide functionality to run MEC Apps 926 within an operator network or a subset of an operator network. The MEC management entities include various components that handle the management of the MEC-specific functionality of a particular MEC platform 932, MEC host 902, and the MEC Apps 926 to be run.

The MEC platform manager 906 is a MEC management entity including MEC platform element management component 944, MEC app rules and requirements management component 946, and MEC app lifecycle management component 948. The various entities within the MEC architecture 900 can perform functionalities as discussed in [MEC003]. The remote app 950 is configured to communicate with the MEC host 902 (e.g., with the MEC apps 926) via the MEC orchestrator 910 and the MEC platform manager 906.

The MEC host 902 is an entity that contains an MEC platform 932 and VI 922 which provides compute, storage, and network resources for the purpose of running MEC Apps 926. The VI 922 includes a data plane (DP) 924 that executes traffic rules 940 received by the MEC platform 932, and routes the traffic among MEC Apps 926, MEC services 936, DNS server/proxy (see e.g., via DNS handling entity 942), 3GPP network, local networks, and external networks. The MEC DP 924 may be connected with the (R)AN nodes and the 3GPP core network, and/or may be connected with an access point via a wider network, such as the internet, an enterprise network, or the like.

The MEC platform 932 is a collection of essential functionality required to run MEC Apps 926 on a particular VI 922 and enable them to provide and consume MEC services 936, and that can provide itself a number of MEC services 937*a*. The MEC platform 932 can also provide various services and/or functions, such as offering an environment where the MEC Apps 926 can discover, advertise, consume and offer MEC services 936 (discussed infra), including MEC services 936 available via other platforms when supported. The MEC platform 932 may be able to allow authorized MEC Apps 926 to communicate with third party servers located in external networks. The MEC platform 932 may receive traffic rules from the MEC platform manager 906, applications, or services, and instruct the data plane accordingly (see e.g., Traffic Rules Control 940). The MEC platform 932 may send instructions to the DP 924 within the VI 922 via the Mp2 reference point. The Mp2 reference point between the MEC platform 932 and the DP 924 of the VI 922 may be used to instruct the DP 934 on how to route traffic among applications, networks, services, etc. The MEC platform 932 may translate tokens representing UEs 920, UE apps, individual sessions, and/or individual flows within a session in the traffic rules into specific network addresses (e.g., IP addresses or the like). The MEC platform 932 also receives DNS records from the MEC platform manager 906 and configures a DNS proxy/server accordingly. The MEC platform 932 hosts MEC services 936 including the multi-access edge services discussed infra, and provide access to persistent storage and time of day information. Furthermore, the MEC platform 932 may communicate with other MEC platforms 932 of other MEC servers 902 via the Mp3 reference point. Upon receipt of update, activation or deactivation of traffic rules from the MEC platform manager 906, apps, or services, the MEC platform 932 instructs the data plane 924 accordingly. The MEC platform 932 also receives DNS records from the MEC platform manager 906 and uses them to configure a DNS proxy/server 942. The traffic rules control 940 allows the MEC platform 932 to perform traffic routing including traffic rules update, activation, and deactivation. Additionally or alternatively, the traffic rules control 940 allows the MEC platform 932 to perform traffic steering, for example, by directing data packets over one or more access network connections in a multi-access environment comprising multiple access networks, each of which may have multiple access network connections and/or may implement different access technologies.

The VI 922 represents the totality of all hardware and software components which build up the environment in which MEC Apps 926 and/or MEC platform 932 are deployed, managed and executed. The VI 922 may span across several locations, and the network providing connectivity between these locations is regarded to be part of the VI 922. The physical hardware resources of the VI 922 includes computing, storage and network resources that provide processing, storage and connectivity to MEC Apps 926 and/or MEC platform 932 through a virtualization layer (e.g., a hypervisor, VM monitor (VMM), or the like). The virtualization layer may abstract and/or logically partition the physical hardware resources of the MEC server 902 as a hardware abstraction layer. The virtualization layer may also enable the software that implements the MEC Apps 926 and/or MEC platform 932 to use the underlying VI 922, and may provide virtualized resources to the MEC Apps 926 and/or MEC platform 932, so that the MEC Apps 926 and/or MEC platform 932 can be executed.

The MEC Apps 926 are applications that can be instantiated on a MEC host/server 902 within the MEC system 900 and can potentially provide or consume MEC services 936. The term "MEC service" refers to a service provided via a MEC platform 932 either by the MEC platform 932 itself or by a MEC App 926. MEC Apps 926 may run as VM on top of the VI 922 provided by the MEC server 902, and can interact with the MEC platform 932 to consume and provide the MEC services 936. The Mp1 reference point between the MEC platform 932 and the MEC Apps 926 is used for consuming and providing service specific functionality. Mp1 provides service registration 938, service discovery, and communication support for various services, such as the MEC services 936 provided by MEC host 902. Mp1 may also provide application availability, session state relocation support procedures, traffic rules and DNS rules activation, access to persistent storage and time of day information, and/or the like. Additionally or alternatively, the MEC Apps 926 may communicate with the MEC platform 932 using the MEC APIs discussed in ETSI GS MEC 011 V 2.1.1 (2019 November).

The MEC Apps 926 are instantiated on the VI 922 of the MEC server 902 based on configuration or requests validated by the MEC management (e.g., MEC platform manager 906). The MEC Apps 926 can also interact with the MEC platform 932 to perform certain support procedures related to the lifecycle of the MEC Apps 926, such as indicating availability, preparing relocation of user state, etc. The MEC Apps 926 may have a certain number of rules and requirements associated to them, such as required resources, maximum latency, required or useful services, etc. These requirements may be validated by the MEC management, and can be assigned to default values if missing. MEC services 936 are services provided and/or consumed either by the MEC platform 932 and/or MEC Apps 926. The service consumers (e.g., MEC Apps 926 and/or MEC platform 932) may communicate with particular MEC services 936 over individual APIs (including MEC V2X API and the other MEC APIs discussed herein). When provided by an application, a MEC service 936 can be registered in a list of services in the service registries 938 to the MEC platform 932 over the Mp1 reference point. Additionally, a MEC App 926 can subscribe to one or more services 930/936 for which it is authorized over the Mp1 reference point.

Examples of MEC services 936 include V2X information services (VIS), RNIS (see e.g., ETSI GS MEC 012 V 1.1.1 (2017 July) ("[MEC012]")), Location Services (see e.g., ETSI GS MEC 013 v 1.1.1 (2017 July)), UE identity services (see e.g., ETSI GS MEC 014 V 1.1.1 (2018 February)), BWMS (see e.g., ETSI GS MEC 015 V 1.1.1 (2017 October)), WLAN Access Information (WAI) services, Fixed Access Information (FAI) services (see e.g., ETSI GS MEC 029 v 2.1.1 (2019 July)), and/or other MEC services. The RNIS, when available, provides authorized MEC Apps 926 with radio network related information, and expose appropriate up-to-date radio network information to the MEC Apps 926. The RNI may include, inter alia, radio network conditions, measurement and statistics information related to the UP, information related to UEs 920 served by the radio node(s) associated with the MEC host 902 (e.g., UE context and radio access bearers), changes on information related to UEs 920 served by the radio node(s) associated with the MEC host XE136, and/or the like. The RNI may be provided at the relevant granularity (e.g., per UE 920, per cell, per period of time).

The service consumers (e.g., MEC Apps 926, MEC platform 932, etc.) may communicate with the RNIS over an RNI API to obtain contextual information from a corresponding RAN. RNI may be provided to the service consumers via a NAN (e.g., (R)AN node, RRH, AP, etc.). The RNI API may support both query and subscription (e.g., a pub/sub) based mechanisms that are used over a Representational State Transfer (RESTful) API or over a message broker of the MEC platform 932 (not shown). A MEC App 926 may query information on a message broker via a transport information query procedure, wherein the transport information may be pre-provisioned to the MEC App 926 via a suitable configuration mechanism. The various messages communicated via the RNI API may be in XML, JSON, Protobuf, or some other suitable format.

The VIS provides supports various V2X applications including the journey-aware QoS predictions among many others. The RNI may be used by MEC Apps 926 and MEC platform 932 to optimize the existing services and to provide new types of services that are based on up to date information on radio conditions. As an example, a MEC App 926 may use RNI to optimize current services such as video throughput guidance. In throughput guidance, a radio analytics MEC App 926 may use MEC services to provide a backend video server with a near real-time indication on the throughput estimated to be available at the radio DL interface in a next time instant. The throughput guidance radio analytics application computes throughput guidance based on the required radio network information it obtains from a multi-access edge service running on the MEC server 902. RNI may be also used by the MEC platform 932 to optimize the mobility procedures required to support service continuity, such as when a certain MEC App 926 requests a single piece of information using a simple request-response model (e.g., using RESTful mechanisms) while other MEC Apps 926 subscribe to multiple different notifications regarding information changes (e.g., using a pub/sub mechanism and/or message broker mechanisms).

The LS, when available, may provide authorized MEC Apps 926 with location-related information, and expose such information to the MEC Apps 926. With location related information, the MEC platform 932 or one or more MEC Apps 926 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 920 currently served by the radio node(s) associated with the MEC server 902, information about the location of all UEs 920 currently served by the radio node(s) associated with the MEC server XE136, information about the location of a certain category of UEs 920 currently served by the radio node(s) associated with the MEC server XE136, a list of UEs 920 in a particular location, information about the location of all radio nodes currently associated with the MEC host 902, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 902, or a subset thereof, according to a desired deployment. In this regard, the OMA Zonal Presence API provides means for MEC Apps 926 to retrieve information about a zone, the access points associated to the zones and the users that are connected to the access points. In addition, the OMA Zonal Presence API, allows authorized application to subscribe to a notification mechanism, reporting about user activities within a zone. A MEC server 902 may access location information or zonal presence information of individual UEs 920 using the OMA Zonal Presence API to identify the relative location or positions of the UEs 920.

The BWMS provides for the allocation of bandwidth to certain traffic routed to and from MEC Apps 926, and specify static/dynamic up/down bandwidth resources, including bandwidth size and bandwidth priority. MEC Apps 926 may use the BWMS to update/receive bandwidth information to/from the MEC platform 932. Different MEC Apps 926 running in parallel on the same MEC server 902 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism. The BWM service is for allocating/adjusting BW resources for MEC apps, and allows MEC apps to provide their BW requirements.

Different MEC applications (apps) running in parallel on the same MEC host may require specific static/dynamic up/down bandwidth (BW) resources, including BW size and BW priority. In some cases different sessions running in parallel on the same app may each have specific BW requirements. In addition, sessions driven by Apps running from closer to end users (e.g., shorter RTT) may receive unfair advantage over session driven by apps running from distant locations (e.g., outside the RAN). To resolve potential resource conflicts between such competing applications, BWM and/or Multi-access Traffic Steering (MTS) services may be used.

The MTS services may be provided as part of the BWMS or separately from the BWMS. The MTS service is for seamlessly steering/splitting/duplicating app data traffic across multiple access network connections. The MTS service allows apps/MEC apps to get informed of various MTS capabilities and MX network connection info. The MTS also allows MEC apps to provide requirements (e.g., delay, throughput, loss, etc.) for influencing traffic management operations. The specific session or app/MEC app may be identified using a set of filters and/or identifiers (IDs) within the resource request.

The purpose of the UE Identity feature is to allow UE specific traffic rules in the MEC system 900. When the MEC system 900 supports the UE Identity feature, the MEC platform 932 provides the functionality (e.g., UE Identity API) for a MEC App 926 to register a tag representing a UE 920 or a list of tags representing respective UEs 920. Each tag is mapped into a specific UE 920 in the MNO's system, and the MEC platform 932 is provided with the mapping information. The UE Identity tag registration triggers the MEC platform 932 to activate the corresponding traffic rule(s) 940 linked to the tag. The MEC platform 932 also provides the functionality (e.g., UE Identity API) for a MEC App 926 to invoke a de-registration procedure to disable or otherwise stop using the traffic rule for that user.

The WAIS is a service that provides WLAN access related information to service consumers within the MEC System 900. The WAIS is available for authorized MEC Apps 926 and is discovered over the Mp1 reference point. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System 900. The FAIS is available for the authorized MEC Apps 926 and is discovered over the Mp1 reference point. The FAI may be used by MEC Apps 926 and the MEC platform 932 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 926 and the MEC platform 932 may consume the FAIS; and both the MEC platform 932 and the MEC Apps 926 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 906 and the VI manager (VIM) 908, and handles the management of MEC-specific functionality of a particular MEC server 902 and the applications running on it. In some implementations, some or all of the multi-access edge management components may be implemented by one or more servers located in one or more data centers, and may use virtualization infrastructure that is connected with NFV infrastructure used to virtualize NFs, or using the same hardware as the NFV infrastructure.

The MEC platform manager 906 is responsible for managing the life cycle of applications including informing the MEC orchestrator (MEC-O) 910 of relevant application related events. The MEC platform manager 906 may also provide MEC Platform Element management functions 944 to the MEC platform 932, manage MEC App rules and requirements 946 including service authorizations, traffic rules, DNS configuration and resolving conflicts, and manage MEC App lifecycles mgmt 948. The MEC platform manager 906 may also receive virtualized resources, fault reports, and performance measurements from the VIM 908 for further processing. The Mm5 reference point between the MEC platform manager 906 and the MEC platform 932 is used to perform platform configuration, configuration of the MEC Platform element mgmt 944, MEC App rules and reqts 946, MEC App lifecycles mgmt 948, and management of application relocation.

The VIM 908 may be an entity that allocates, manages and releases virtualized (compute, storage and networking) resources of the VI 922, and prepares the VI 922 to run a software image. To do so, the VIM 908 may communicate with the VI 922 over the Mm7 reference point between the VIM 908 and the VI 922. Preparing the VI 922 may include configuring the VI 922, and receiving/storing the software image. When supported, the VIM 908 may provide rapid provisioning of applications, such as described in "Openstack++ for Cloudlet Deployments", available at http://reports-archive.adm.cs.cmu.edu/anon/2015/CMU-CS-15-123.pdf The VIM 908 may also collect and report performance and fault information about the virtualized resources, and perform application relocation when supported. For application relocation from/to external cloud environments, the VIM 908 may interact with an external cloud manager to perform the application relocation, for example using the mechanism described in "Adaptive VM Handoff Across Cloudlets", and/or possibly through a proxy. Furthermore, the VIM 908 may communicate with the MEC platform manager 906 via the Mm6 reference point, which may be used to manage virtualized resources, for example, to realize the application lifecycle management. Moreover, the VIM 908 may communicate with the MEC-O 910 via the Mm4 reference point, which may be used to manage virtualized resources of the MEC server 902, and to manage application images. Managing the virtualized resources may include tracking available resource capacity, etc.

The MEC system level management includes the MEC-O 910, which has an overview of the complete MEC system 900. The MEC-O 910 may maintain an overall view of the MEC system 900 based on deployed MEC hosts 902, available resources, available MEC services 936, and topology. The Mm3 reference point between the MEC-O 910 and the MEC platform manager 906 may be used for the management of the application lifecycle, application rules and requirements and keeping track of available MEC services 936. The MEC-O 910 may communicate with the user application lifecycle management proxy (UALMP) 914 via the Mm9 reference point in order to manage MEC Apps 926 requested by UE app 918.

The MEC-O 910 may also be responsible for on-boarding of application packages, including checking the integrity and authenticity of the packages, validating application rules and requirements and if necessary adjusting them to comply with operator policies, keeping a record of on-boarded packages, and preparing the VIM(s) 908 to handle the applications. The MEC-O 910 may select appropriate MEC host(s) 901 for application instantiation based on constraints, such as latency, available resources, and available services. The MEC-O 910 may also trigger application instantiation and termination, as well as trigger application relocation as needed and when supported.

The Operations Support System (OSS) 912 is the OSS of an operator that receives requests via the Customer Facing Service (CFS) portal 916 over the Mx1 reference point and from UE apps 918 for instantiation or termination of MEC Apps 926. The OSS 912 decides on the granting of these requests. The CFS portal 916 (and the Mx1 interface) may be used by third-parties to request the MEC system 900 to run apps 918 in the MEC system 900. Granted requests may be forwarded to the MEC-O 910 for further processing. When supported, the OSS 912 also receives requests from UE apps 918 for relocating applications between external clouds and the MEC system 900. The Mm2 reference point between the OSS 912 and the MEC platform manager 906 is used for the MEC platform manager 906 configuration, fault and performance management. The Mm1 reference point between the MEC-O 910 and the OSS 912 is used for triggering the instantiation and the termination of MEC Apps 926 in the MEC system 900.

The UE app(s) 918 (also referred to as "device applications" or the like) is one or more apps running in a device 920 that has the capability to interact with the MEC system 900 via the user application lifecycle management proxy 914. The UE app(s) 918 may be, include, or interact with one or more client applications, which in the context of MEC, is application software running on the device 918 that utilizes functionality provided by one or more specific MEC Apps 926. The user app LCM proxy 914 may authorize requests from UE apps 918 in the UE 920 and interacts with the OSS 912 and the MEC-O 910 for further processing of these requests. The term "lifecycle management," in the context of MEC, refers to a set of functions required to manage the instantiation, maintenance and termination of a MEC App 926 instance. The user app LCM proxy 914 may interact with the OSS 912 via the Mm8 reference point, and is used to handle UE 918 requests for running applications in the MEC system 900. A user app may be an MEC App 926 that is instantiated in the MEC system 900 in response to a request of a user via an application running in the UE 920 (e.g., UE App 918). The user app LCM proxy 914 allows UE apps 918 to request on-boarding, instantiation, termination of user applications and when supported, relocation of user applications in and out of the MEC system 900. It also allows informing the user apps about the state of the user apps. The user app LCM proxy 914 is only accessible from within the mobile network, and may only be available when supported by the MEC system 900. A UE app 918 may use the Mx2 reference point between the user app LCM proxy 914 and the UE app 918 to request the MEC system 900 to run an application in the MEC system 900, or to move an application in or out of the MEC system 900. The Mx2 reference point may only be accessible within the mobile network and may only be available when supported by the MEC system 900.

In order to run an MEC App 926 in the MEC system 900, the MEC-O 910 receives requests triggered by the OSS 912, a third-party, or a UE app 918. In response to receipt of such requests, the MEC-O 910 selects a MEC server/host 902 to host the MEC App 926 for computational offloading, etc. These requests may include information about the application to be run, and possibly other information, such as the location where the application needs to be active, other application rules and requirements, as well as the location of the application image if it is not yet on-boarded in the MEC system 900.

The MEC-O 910 may select one or more MEC servers 902 for computational intensive tasks. The selected one or more MEC servers XE136 may offload computational tasks of a UE app 918 based on various operational parameters, such as network capabilities and conditions, computational capabilities and conditions, application requirements, and/or other like operational parameters. The application requirements may be rules and requirements associated to/with one or more MEC Apps 926, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 926 to be able to run; multi-access edge services that the MEC Apps 926 can take advantage of, if available; connectivity or mobility support/requirements (e.g., application state relocation, application instance relocation); required multi-access edge features, such as VM relocation support or UE identity; required network connectivity (e.g., connectivity to applications within the MEC system 900, connectivity to local networks, or to the Internet); information on the operator's MEC system 900 deployment or mobile network deployment (e.g., topology, cost); requirements on access to user traffic; requirements on persistent storage; traffic rules 940; DNS rules 942; etc.

The MEC-O 910 considers the requirements and information listed above and information on the resources currently available in the MEC system 900 to select one or several MEC servers 902 to host MEC Apps 926 and/or for computational offloading. After one or more MEC servers XE136 are selected, the MEC-O 910 requests the selected MEC host(s) 902 to instantiate the application(s) or application tasks. The actual algorithm used to select the MEC servers 902 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 910 may decide to select one or more new MEC hosts 902 to act as a master node, and initiates the transfer of an application instance or application-related state information from the one or more source MEC hosts 902 to the one or more target MEC hosts 902.

In a first implementation, a UPF of the 5GS is mapped into the MEC architecture 900 as the MEC data plane 924. In this implementation, the UPF handles the UP path of PDU sessions. Additionally, the UPF provides the interface to a data network (e.g., DN 175 and/or local service 170 in FIGS. 1A-1B) and supports the functionality of a PDU session anchor.

In a second implementation, an application function (AF) of the 5GS is mapped into the MEC architecture 900 as the MEC platform 932. In these implementations, the AF is configurable or operable to perform application influence on traffic routing, access network capability exposure, and interact with the policy framework for policy control. The second implementation may be combined with the first implementation, or may be a standalone implementation. In the first and/or second implementations, since user traffic is routed to the local DN, MEC apps 926, 927, and/or 928 can be mapped in or to the DN of the 5GS.

In a third implementation, the RAN of 5GS can be a virtual RAN based on a VNF, and the UPF is configurable or operable to function as the MEC data plane 924 within an NF virtualization infrastructure (NFVI) (e.g., VI 922). In these implementations, the AF can be configured as MEC platform VNF with MEC APIs, MEC app enablement functionality (see e.g., [MEC009]), and API principles functionality (see e.g., [MEC009]). Additionally, the local DN an include MEC apps 926, 927, and/or 928 instantiated as VNFs. This implementation can be configured to provide functionalities in accordance with the [MEC003] and/or ETSI GR MEC 017 V 1.1.1 (2018 February) ("[MEC017]"). The third implementation may be combined with the first implementation and/or the second implementation, or may be a standalone implementation.

Additionally or alternatively, the access level edge (e.g., the various NANs and/or (R)ANs discussed herein) can use one or more APIs to communicate with local/regional level edge networks. The local/regional level edge networks can include network nodes using corresponding applications to communicate with a national level edge network. The national level edge can include various NANs that use applications for accessing one or more remote clouds within the global level edge. The NANs are also configurable or operable for vertical segment management and SLA compliance. Additionally or alternatively, MEC deployment can be based on the definition of "edge" to provide degrees of freedom to MNOs, especially when deploying MEC in an NFV environment (e.g., MEC entities can be instantiated as Virtualized NFs (VNFs), thus with high flexibility in terms of deployment for the operator).

Additionally or alternatively, MEC system 900 can be flexibly deployed depending on the use case/vertical segment/information to be processed. Some components of the MEC system 900 can be co-located with other elements of the system. As an example, in certain use cases (e.g., enterprise), a MEC app 926 may need to consume a MEC service locally, and it may be efficient to deploy a MEC host locally equipped with the needed set of APIs. In another example, deploying a MEC server 902 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. In some other aspects, a bandwidth management API may be present both at the access level edge and also in more remote edge locations, in order to set up transport networks (e.g., for CDN-based services).

FIG. 10 illustrates an example MEC service architecture 1000. MEC service architecture 1000 includes the MEC service 1005, ME platform 1010 (corresponding to MEC platform 932), and applications (Apps) 1 to N (where N is a number). As an example, the App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform 1010) and consumers (e.g., UEs 101, user apps instantiated by individual UEs 101, other servers/services, network functions, application functions, etc.). Each session represents an interactive information exchange between two or more elements, such as a client-side app and its corresponding server-side app, a user app instantiated by a UE 101 and a MEC app instantiated by the ME platform 1010, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE 101 and a DN that provides a PDU connectivity service, which is a service that provides for the exchange of PDUs between a UE 101 and a Data Network 170, 175. An MA PDU session is a PDU Session that provides a PDU connectivity service, which can use one access network at a time, or simultaneously a 3GPP access network 110A and a non-3GPP access network 110B. Furthermore, each session may be associated with a session identifier (ID) which is data the uniquely identifies a session, and each App (or App instance) may be associated with an App ID (or App instance ID) which is data the uniquely identifies an App (or App instance).

The MEC service 1005 provides one or more MEC services 936 to MEC service consumers (e.g., Apps 1 to N). The MEC service 1005 may optionally run as part of the platform (e.g., ME platform 1010) or as an application (e.g., ME app). Different Apps 1 to N, whether managing a single instance or several sessions (e.g., CDN), may request specific service info per their requirements for the whole application instance or different requirements per session. The MEC service 1005 may aggregate all the requests and act in a manner that will help optimize the BW usage and improve Quality of Experience (QoE) for applications.

The MEC service 1005 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource." Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of ETSI GS MEC 009 V 2.1.1 (2019 January) ("[MEC009]")). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure:

{apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry 938 in FIG. 9). It includes the scheme ("http" or "https"), host and optional port, and an optional prefix string. For the a given MEC API, the "apiName" may be set to "mec" and "apiVersion" may be set to a suitable version number (e.g., "v 1" for version 1). The MEC APIs supportHTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

3. Hardware Components, Configurations, and Arrangements

Figure 11:
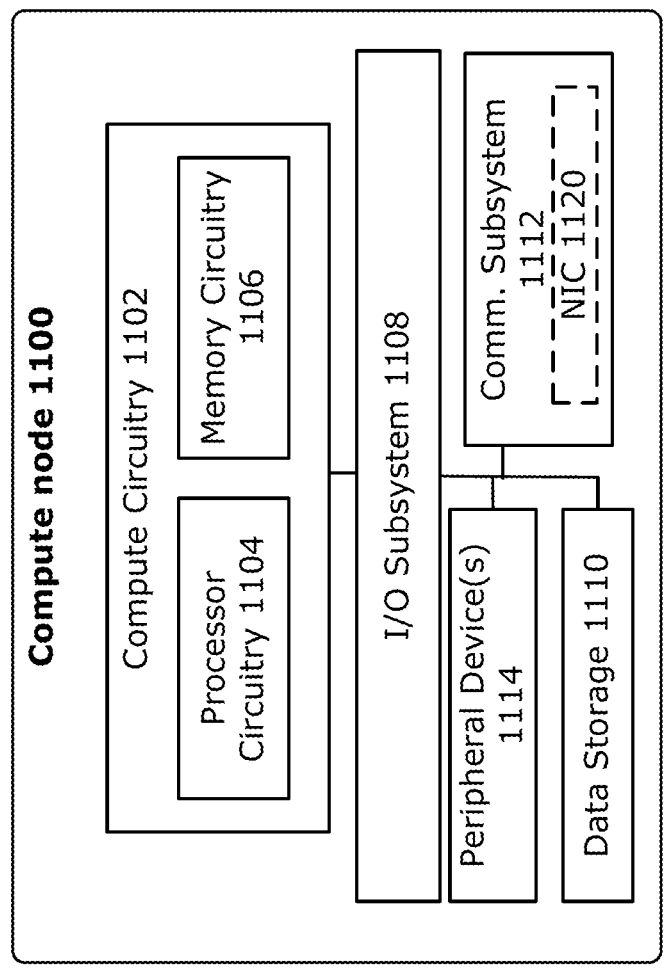
FIGS. 11 and 12 depict example components of various compute nodes in edge computing system(s).
Figure 12:
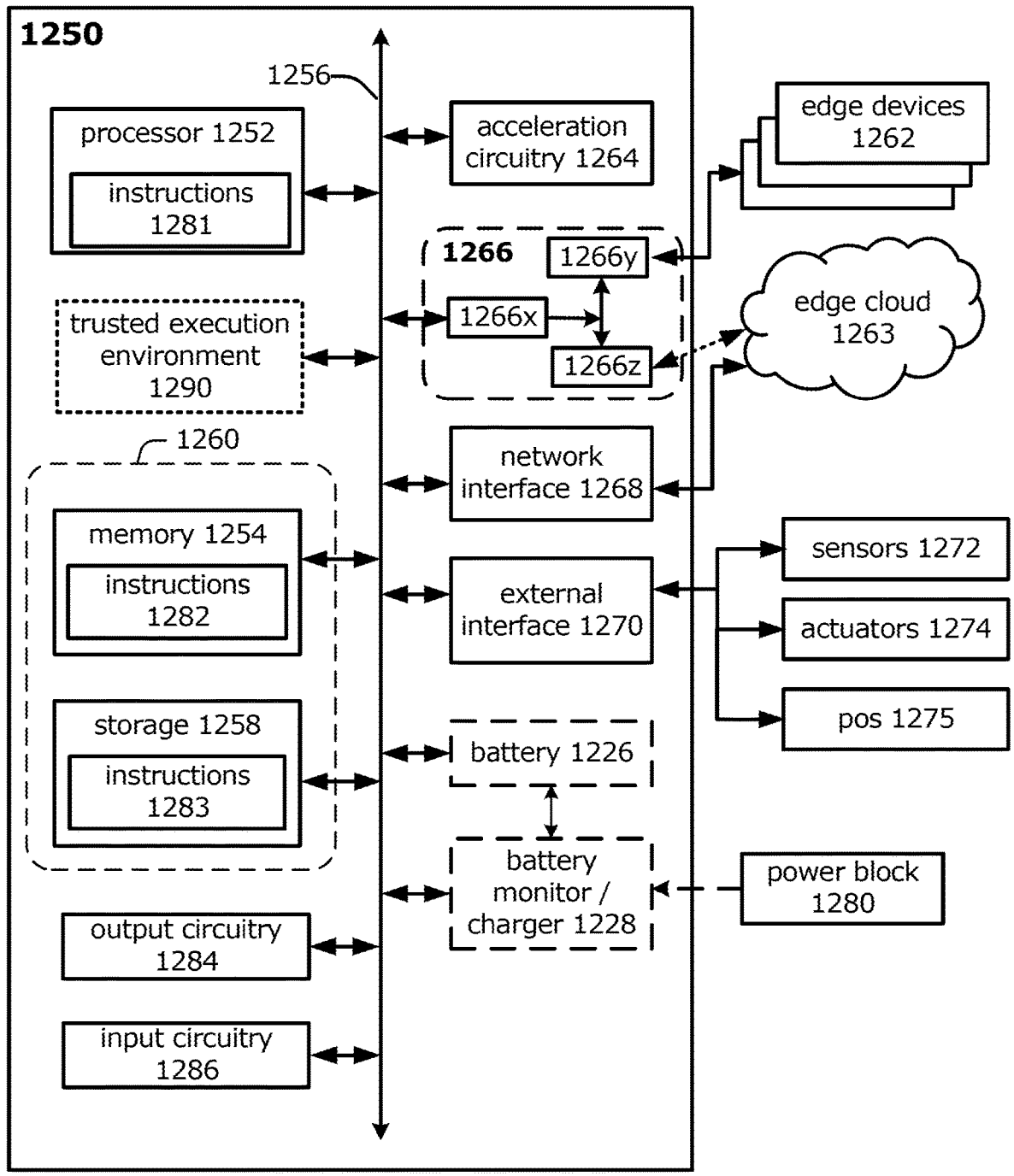

FIGS. 11 and 12 depict further examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

In FIG. 11, an edge compute node 1100 includes a compute engine (also referred to herein as "compute circuitry") 1102, an input/output (I/O) subsystem 1108, data storage 1110, a communication circuitry subsystem 1112, and, optionally, one or more peripheral devices 1114. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1100 may be embodied as any type of engine, device, or collection of devices capable of performing various compute functions. In some examples, the compute node 1100 may be embodied as a single device such as an integrated circuit, an embedded system, an FPGA, a System-on-Chip (SoC), or other integrated system or device. The compute node 1100 includes or is embodied as a processor 1104 and a memory 1106. The processor 1104 may be embodied as any type of processor capable of performing the functions described herein (e.g., executing an application). For example, the processor 1104 may be embodied as a multi-core processor(s), a microcontroller, or other processor or processing/controlling circuit.

In some examples, the processor 1104 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1104 may work in coordination with each other to execute many types of operations and instructions within and on behalf of the compute node 1100.

The memory 1106 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 1106 may be integrated into the processor 1104. The main memory 1106 may store various software and data used during operation such as one or more applications, data operated on by the application(s), libraries, and drivers.

The compute circuitry 1102 is communicatively coupled to other components of the compute node 1100 via the I/O subsystem 1108, which may be embodied as circuitry and/or components to facilitate input/output operations with the compute circuitry 1102 (e.g., with the processor 1104 and/or the main memory 1106) and other components of the compute circuitry 1102. For example, the I/O subsystem 1108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1108 may form a portion of an SoC and be incorporated, along with one or more of the processor 1104, the main memory 1106, and other components of the compute circuitry 1102, into the compute circuitry 1102.

The one or more illustrative data storage devices/disks 1110 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 1110 may include a system partition that stores data and firmware code for the data storage device/disk 1110. Individual data storage devices/disks 1110 may also include one or more operating system partitions that store data files and executables for operating systems depending on, for example, the type of compute node 1100.

The communication circuitry 1112 may be embodied as any communication circuit, device, or collection thereof, capable of enabling communications over a network between the compute circuitry 1102 and another compute device (e.g., an edge gateway node or the like). The communication circuitry 1112 may be configured to use any one or more communication technology (e.g., wired or wireless communications) and associated protocols (e.g., a cellular networking protocol such a 3GPP 4G or 5G standard, a wireless local area network protocol such as IEEE 802.11/WiFi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1112 includes a network interface controller (NIC) 1120, which may also be referred to as a host fabric interface (HFI). The NIC 1120 may be embodied as one or more add-in-boards, daughter cards, network interface cards, controller chips, chipsets, or other devices that may be used by the compute node 1100 to connect with another compute device. In some examples, the NIC 1120 may be embodied as part of a system-on-a-chip (SoC) that includes one or more processors, or included on a multichip package that also contains one or more processors. In some examples, the NIC 1120 may include a local processor (not shown) and/or a local memory (not shown) that are both local to the NIC 1120. In such examples, the local processor of the NIC 1120 may be capable of performing one or more of the functions of the compute circuitry 1102 described herein. Additionally, or alternatively, in such examples, the local memory of the NIC 1120 may be integrated into one or more components of the client compute node at the board level, socket level, chip level, and/or other levels.

Additionally, in some examples, a respective compute node 1100 may include one or more peripheral devices 1114. Such peripheral devices 1114 may include any type of peripheral device found in a compute device or server such as audio input devices, a display, other input/output devices, interface devices, and/or other peripheral devices, depending on the particular type of the compute node 1100. In further examples, the compute node 1100 may be embodied by a respective edge compute node in an edge computing system (e.g., client compute node, edge gateway node, edge aggregation node, V-ITS-Ss discussed previous, etc.) or like forms of appliances, computers, subsystems, circuitry, or other components.

FIG. 12 illustrates an example of components that may be present in an edge computing node 1250 for implementing the techniques (e.g., operations, processes, methods, and methodologies) described herein. This edge computing node 1250 provides a closer view of the respective components of node 1250 when implemented as or as part of a computing device (e.g., as a mobile device, a base station, server, gateway, etc.). The edge computing node 1250 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 1250, or as components otherwise incorporated within a chassis of a larger system.

The edge computing node 1250 includes processing circuitry in the form of one or more processors 1252, which may be the same or similar as processor(s) 1152. The processor circuitry 1252 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. The processor circuitry 1252 may include one or more hardware accelerators (e.g., same or similar to acceleration circuitry 1264), which may be microprocessors, programmable processing devices (e.g., FPGA, ASIC, etc.), or the like. The one or more accelerators may include, for example, computer vision and/or deep learning accelerators. In some implementations, the processor circuitry 1252 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1252 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, an xPU/DPU/IPU/NPU, special purpose processing unit, specialized processing unit, or any other known processing elements, or any suitable combination thereof. The processors (or cores) 1252 may be coupled with or may include memory/storage and may be configured to execute instructions stored in the memory/storage to enable various applications or operating systems to run on the platform 1250. The processors (or cores) 1252 is configured to operate application software to provide a specific service to a user of the platform 1250. Additionally or alternatively, the processor(s) 1252 may be a special-purpose processor(s)/controller(s) configured (or configurable) to operate according to the elements, features, and implementations discussed herein.

As examples, the processor(s) 1252 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1252 may be a part of a system on a chip (SoC), System-in-Package (SiP), a multi-chip package (MCP), and/or the like, in which the processor(s) 1252 and other components are formed into a single integrated circuit, or a single package, such as the Edison™ or Galileo™ SoC boards from Intel® Corporation. Other examples of the processor(s) 1252 are mentioned elsewhere in the present disclosure.

The processor(s) 1252 may communicate with system memory 1254 over an interconnect (IX) 1256. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1258 may also couple to the processor 1252 via the IX 1256.

In an example, the storage 1258 may be implemented via a solid-state disk drive (SSDD) and/or high-speed electrically erasable memory (commonly referred to as "flash memory"). Other devices that may be used for the storage 1258 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1254 and/or storage circuitry 1258 may also incorporate three-dimensional (3D) cross-point (XPOINT) memories from Intel® and Micron®.

In low power implementations, the storage 1258 may be on-die memory or registers associated with the processor 1252. However, in some examples, the storage 1158 may be implemented using a micro hard disk drive (HDD). Further, any number of new technologies may be used for the storage 1258 in addition to, or instead of, the technologies described, such resistance change memories, phase change memories, holographic memories, or chemical memories, among others.

The components of edge computing device 1250 may communicate over an interconnect (IX) 1256. The IX 1256 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 1256 may be a proprietary bus, for example, used in a SoC based system.

The IX 1256 couples the processor 1252 to communication circuitry 1266 for communications with other devices, such as remote server(s) (not shown), an edge cloud 1263, and/or the connected edge devices 1262. The communication circuitry 1266 is a hardware element, or collection of hardware elements, used to communicate over one or more networks (e.g., cloud 1263) and/or with other devices (e.g., edge devices 1262). Communication circuitry 1266 includes modem circuitry 1266x may interface with application circuitry of system 800 (e.g., a combination of processor circuitry 802 and CRM 860) for generation and processing of baseband signals and for controlling operations of the TRx 812. The modem circuitry 1266x may handle various radio control functions that enable communication with one or more (R)ANs via the transceivers (TRx) 1266y and 1266z according to one or more wireless communication protocols and/or RATs. The modem circuitry 1266x may include circuitry such as, but not limited to, one or more single-core or multi-core processors (e.g., one or more baseband processors) or control logic to process baseband signals received from a receive signal path of the TRxs 1266y, 1266z, and to generate baseband signals to be provided to the TRxs 1266y, 1266z via a transmit signal path. The modem circuitry 1266x may implement a real-time OS (RTOS) to manage resources of the modem circuitry 1266x, schedule tasks, perform the various radio control functions, process the transmit/receive signal paths, and the like.

The TRx 1266y may use any number of frequencies and protocols for communicating with the connected edge devices 1262, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1262. For example, a wireless local area network (WLAN) unit may be used to implement WiFi® communications in accordance with an Institute of Electrical and Electronics Engineers (IEEE) 802.11 standard. In addition, wireless wide area communications, e.g., according to a cellular or other wireless wide area protocol, may occur via a wireless wide area network (WWAN) unit. The TRx 1266y (or multiple transceivers 1266y) may communicate using multiple standards or radios for communications at a different range. For example, the edge computing node 1250 may communicate with relatively close devices (e.g., within about 10 meters) using a local transceiver based on BLE, or another low power radio, to save power. More distant connected edge devices 1262, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A TRx 1266z may be included to communicate with devices or services in the edge cloud 1263 via WLAN, wireless wide area network (WWAN), and/or cellular protocols. The TRx 1266z may be an LPWA transceiver that follows the IEEE 802.15.4, or IEEE 802.15.4g standards, among others. The edge computing node 1263 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used. Any number of other radio communications and protocols may be used in addition to the systems mentioned for the TRx 1266z, as described herein. For example, the TRx 1266z may include a cellular transceiver that uses spread spectrum (SPA/SAS) communications for implementing high-speed communications. Further, any number of other protocols may be used, such as WiFi® networks for medium speed communications and provision of network communications. The TRx 1266z may include radios that are compatible with any number of 3GPP specifications, such as LTE and 5G/NR communication systems.

A network interface controller (NIC) 1268 may be included to provide a wired communication to nodes of the edge cloud 1263 or to other devices, such as the connected edge devices 1262 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 1268 may be included to enable connecting to a second network, for example, a first NIC 1268 providing communications to the cloud over Ethernet, and a second NIC 1268 providing communications to other devices over another type of network.

Given the variety of types of applicable communications from the device to another component or network, applicable communications circuitry used by the device may include or be embodied by any one or more of components 1264, 1266, 1268, or 1270. Accordingly, in various examples, applicable means for communicating (e.g., receiving, transmitting, etc.) may be embodied by such communications circuitry.

The edge computing node 1250 may include or be coupled to acceleration circuitry 1264, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1264 may comprise logic blocks or logic fabric and other interconnected resources that may be programmed (configured) to perform various functions, such as the procedures, methods, functions, etc. discussed herein. In such implementations, the acceleration circuitry 1264 may also include memory cells (e.g., EPROM, EEPROM, flash memory, static memory (e.g., SRAM, anti-fuses, etc.) used to store logic blocks, logic fabric, data, etc. in LUTs and the like.

The IX 1256 also couples the processor 1252 to a sensor hub or external interface 1270 that is used to connect additional devices or subsystems. The additional/external devices may include sensors 1272, actuators 1274, and positioning circuitry 1275.

The sensor circuitry 1272 includes devices, modules, or subsystems whose purpose is to detect events or changes in its environment and send the information (sensor data) about the detected events to some other a device, module, subsystem, etc. Examples of such sensors 1272 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1274, allow platform 1250 to change its state, position, and/or orientation, or move or control a mechanism or system. The actuators 1274 comprise electrical and/or mechanical devices for moving or controlling a mechanism or system, and converts energy (e.g., electric current or moving air and/or liquid) into some kind of motion. The actuators 1274 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1274 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1250 may be configured to operate one or more actuators 1274 based on one or more captured events and/or instructions or control signals received from a service provider and/or various client systems The positioning circuitry (POS) 1275 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radiopositioning Integrated by Satellite (DORIS), etc.), or the like. The POS 1275 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the POS 1275 may include a Micro-Technology for Positioning, Navigation, and Timing (Micro-PNT) IC that uses a master timing clock to perform position tracking/estimation without GNSS assistance. The POS 1275 may also be part of, or interact with, the communication circuitry 1266 to communicate with the nodes and components of the positioning network. The POS 1275 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the POS 1275 is, or includes an INS, which is a system or device that uses sensor circuitry 1272 (e.g., motion sensors such as accelerometers, rotation sensors such as gyroscopes, and altimeters (altimimeters), magnetic sensors, and/or the like to continuously calculate (e.g., using dead by dead reckoning, triangulation, or the like) a position, orientation, and/or velocity (including direction and speed of movement) of the platform 1250 without the need for external references.

In some optional examples, various input/output (I/O) devices may be present within or connected to, the edge computing node 1250, which are referred to as input circuitry 1286 and output circuitry 1284 in FIG. 12. The input circuitry 1286 and output circuitry 1284 include one or more user interfaces designed to enable user interaction with the platform 1250 and/or peripheral component interfaces designed to enable peripheral component interaction with the platform 1250. Input circuitry 1286 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1284 may be included to show information or otherwise convey information, such as sensor readings, actuator position(s), or other like information. Data and/or graphics may be displayed on one or more user interface components of the output circuitry 1284. Output circuitry 1284 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1250. The output circuitry 1284 may also include speakers or other audio emitting devices, printer(s), and/or the like. Additionally or alternatively, the sensor circuitry 1272 may be used as the input circuitry 1286 (e.g., an image capture device, motion capture device, or the like) and one or more actuators 1274 may be used as the output device circuitry 1284 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1276 may power the edge computing node 1250, although, in examples in which the edge computing node 1250 is mounted in a fixed location, it may have a power supply coupled to an electrical grid, or the battery may be used as a backup or for temporary capabilities. The battery 1276 may be a lithium ion battery, or a metal-air battery, such as a zinc-air battery, an aluminum-air battery, a lithium-air battery, and the like.

A battery monitor/charger 1278 may be included in the edge computing node 1250 to track the state of charge (SoCh) of the battery 1276, if included. The battery monitor/charger 1278 may be used to monitor other parameters of the battery 1276 to provide failure predictions, such as the state of health (SoH) and the state of function (SoF) of the battery 1276. The battery monitor/charger 1278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1278 may communicate the information on the battery 1276 to the processor 1252 over the IX 1256. The battery monitor/charger 1278 may also include an analog-to-digital (ADC) converter that enables the processor 1252 to directly monitor the voltage of the battery 1276 or the current flow from the battery 1276. The battery parameters may be used to determine actions that the edge computing node 1250 may perform, such as transmission frequency, mesh network operation, sensing frequency, and the like.

A power block 1280, or other power supply coupled to a grid, may be coupled with the battery monitor/charger 1278 to charge the battery 1276. In some examples, the power block 1280 may be replaced with a wireless power receiver to obtain the power wirelessly, for example, through a loop antenna in the edge computing node 1250. A wireless battery charging circuit, such as an LTC4020 chip from Linear Technologies of Milpitas, California, among others, may be included in the battery monitor/charger 1278. The specific charging circuits may be selected based on the size of the battery 1276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The memory 1254 and storage 1258 may include instructions 1282 and 1283 in the form of software, firmware, or hardware commands to implement the techniques described herein. Although such instructions 1282, 1283 are shown as code blocks included in the memory 1254 and the storage 1258, any of the code blocks may be replaced with hardwired circuits, for example, built into an a ASIC, FPGA, acceleration circuitry 1264, and/or the like.

In an example, the instructions 1281, 1282, 1283 provided via the memory 1254, the storage 1258, or the processor 1252 may be embodied as a non-transitory machine-readable medium 1260 (or non-transitory computer-readable media (NTCRM) 1260) including code to direct the processor 1252 to perform electronic operations in the edge computing node 1250. The processor 1252 may access the NTCRM 1260 over the IX 1256. For instance, the NTCRM 1260 may be embodied by devices described for the storage 1258 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTCRM 1260 may include instructions to direct the processor 1252 to perform a specific sequence or flow of actions, for example, as described with respect to the flowchart(s) and block diagram(s) of operations and functionality depicted above.

As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media. Additionally or alternatively, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 11 and 12 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 11 and 12 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions-even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

FIGS. 11 and 12 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 13:
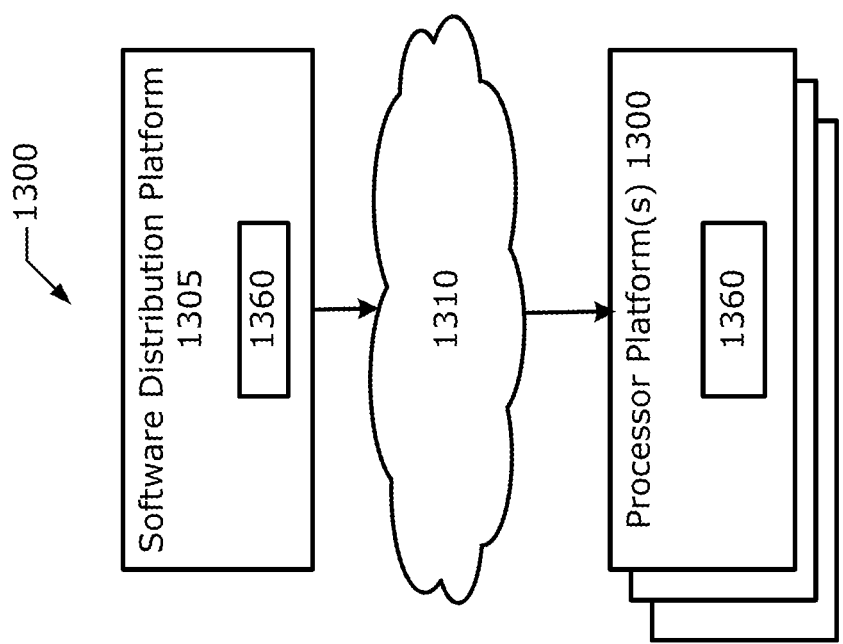
FIG. 13 illustrates an example software distribution platform.

FIG. 13 illustrates an example software distribution platform 1305 to distribute software 1360, such as the example computer readable instructions 1281, 1282, 1283 of FIG. 12, to one or more devices, such as example processor platform(s) 1300 and/or example connected edge devices 1262 (see e.g., FIG. 12) and/or any of the other computing systems/devices discussed herein. The example software distribution platform 1305 may be implemented by any computer server, data facility, cloud service, etc., capable of storing and transmitting software to other computing devices (e.g., third parties, the example connected edge devices 1262 of FIG. 12). Example connected edge devices may be customers, clients, managing devices (e.g., servers), third parties (e.g., customers of an entity owning and/or operating the software distribution platform 1305). Example connected edge devices may operate in commercial and/or home automation environments. Additionally or alternatively, a third party is a developer, a seller, and/or a licensor of software such as the example computer readable instructions 1281, 1282, 1283 of FIG. 12. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In FIG. 13, the software distribution platform 1305 includes one or more servers and one or more storage devices. The storage devices store the computer readable instructions 1360, which may correspond to the example computer readable instructions 1281, 1282, 1283 of FIG. 12, as described above. The one or more servers of the example software distribution platform 1305 are in communication with a network 1310, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1360 from the software distribution platform 1305. For example, the software 1360, which may correspond to the example computer readable instructions 1281, 1282, 1283 of FIG. 12, may be downloaded to the example processor platform(s) 1300, which is/are to execute the computer readable instructions 1360 to implement Radio apps.

In some examples, one or more servers of the software distribution platform 1305 are communicatively connected to one or more security domains and/or security devices through which requests and transmissions of the example computer readable instructions 1360 must pass. In some examples, one or more servers of the software distribution platform 1305 periodically offer, transmit, and/or force updates to the software (e.g., the example computer readable instructions 1281, 1282, 1283 of FIG. 12) to ensure improvements, patches, updates, etc. are distributed and applied to the software at the end user devices.

In FIG. 13, the computer readable instructions 1360 are stored on storage devices of the software distribution platform 1305 in a particular format. A format of computer readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.). In some examples, the computer readable instructions D182 stored in the software distribution platform 1305 are in a first format when transmitted to the example processor platform(s) 1300. In some examples, the first format is an executable binary in which particular types of the processor platform(s) 1300 can execute. However, in some examples, the first format is uncompiled code that requires one or more preparation tasks to transform the first format to a second format to enable execution on the example processor platform(s) 1300. For instance, the receiving processor platform(s) 1300 may need to compile the computer readable instructions 1360 in the first format to generate executable code in a second format that is capable of being executed on the processor platform(s) 1300. In still other examples, the first format is interpreted code that, upon reaching the processor platform(s) 1300, is interpreted by an interpreter to facilitate execution of instructions.

4. Example Implementations

Additional examples of the presently described systems, devices, and methods include the following, non-limiting example implementations. Each of the following non-limiting examples may stand on its own or may be combined in any permutation or combination with any one or more of the other examples provided below or throughout the present disclosure.

Example A01 includes a method in a multi-access (MX) network including multiple access networks, the method comprising: setting a virtual connection to be an anchor connection in the MX network. Example A02 includes the method of example A01 and/or some other example(s) herein, wherein the virtual connection is part of or based on a virtual private network (VPN). Example A03 includes the method of example A02 and/or some other example(s) herein, further comprising bringing up a virtual network adapter, and configuring an network address (e.g., IP address or the like), Gateway, and DNS accordingly.

Example B01 A method for configuration of a multi-access communication in an multi-access communication environment, the method comprising: sending, by a client manager during a discovery and capability exchange procedure, a capability request message (cap_req) to a network manager, cap_req including a virtual network address used in a previous session; and receiving, by the client manager during the discovery and capability exchange procedure, a capability response message (cap_rsp) from the network manager, the cap_rsp including a unique session identifier (ID) for a current session.

Example B01 includes a method for configuration of a multi-access communication in an multi-access communication environment, the method comprising:

Example B02 includes the method of example B01 and/or some other example(s) herein, wherein the previous session is an immediately preceding session.

Example B03 includes the method of examples B01-B02 and/or some other example(s) herein, wherein the cap_req includes a last_session_id field, the last_session_id field including a unique session ID of the previous session.

Example B04 includes the method of examples B01-B03 and/or some other example(s) herein, wherein the cap_req includes a last_ip_address field, the last_ip_address field including the virtual network address.

Example B05 includes the method of examples B01-B04 and/or some other example(s) herein, wherein the cap_req message further includes a device type of a device that implements the client manager.

Example B06 includes the method of example B05 and/or some other example(s) herein, wherein the cap_req includes a device_type field, the device_type field including the device type.

Example B07 includes the method of examples B01-B06 and/or some other example(s) herein, wherein the cap_rsp further a number of anchor connections parameter, the number of anchor connections parameter indicating a number of anchor connections supported by the network manager.

Example B08 includes the method of example B07 and/or some other example(s) herein, further comprising: stopping the discovery and capability exchange procedure when the number of anchor connections parameter in the cap_rsp is set to "0"; and waiting for a next event to restart the discovery and capability exchange procedure.

Example B09 includes the method of examples B01-B08 and/or some other example(s) herein, further comprising: receiving, by the client manager during a user-plane (UP) configuration procedure, a UP setup configuration request message (up_setup_conf_req) from the network manager, the up_setup_conf_req including information to create one or more data proxy instances, wherein each of the one or more data proxy instances includes a respective anchor connection, and each respective anchor connection includes one or more anchor connection configurations; and sending, by the client manager during the UP configuration procedure, a UP setup configuration confirmation message (up_setup_conf_cnf) to the network manager, the up_setup_conf_cnf including virtual network configuration parameters for configuring a virtual network interface.

Example B10 includes the method of example B09 and/or some other example(s) herein, wherein the up_setup_conf_req includes a number of anchor connections.

Example B11 includes the method of example B10 and/or some other example(s) herein, wherein the up_setup_conf_req includes, for each anchor connection of the number of anchor connections, an anchor connection identity (ID), a connection type, and a number of active connection configurations.

Example B12 includes the method of example B 11 and/or some other example(s) herein, wherein the up_setup_conf_req includes, for each active connection configuration of the number of active connection configurations, a configuration ID, a convergence method, convergence method parameters, convergence control parameters, and a number of delivery connections, and for each delivery connection of the number of delivery connections, a delivery connection ID, connection type, an adaptation method, and adaptation method parameters.

Example B13 includes the method of examples B09-B12 and/or some other example(s) herein, wherein the up_setup_conf_cnf further includes a Unique Session ID.

Example B14 includes the method of examples B09-B13 and/or some other example(s) herein, wherein the virtual network configuration parameters include a network address of the virtual network, a gateway of the virtual network, a Domain Name Service (DNS) server of the virtual network, and a network mask of the virtual network.

Example B15 includes the method of examples B09-B14 and/or some other example(s) herein, wherein the up_setup_conf_cnf further includes one or more Generic Multi-Access (GMA) client configuration parameters.

Example B16 includes the method of examples B09-B15 and/or some other example(s) herein, wherein the up_setup_conf_cnf further includes a list of applications permitted to use GMA optimizations.

Example B17 includes the method of examples B01-B16 and/or some other example(s) herein, further comprising: sending, by the client manager during a traffic splitting procedure, a session resume request message (session_resume_req) to the network manager, the session_resume_req to notify the network manager that GMA operation has resumed and to synchronize with the network manager; and receiving, by the client manager, a session resume response message (session_resume_rsp) message from the network manager for the synchronization.

Example B18 includes the method of example B17 and/or some other example(s) herein, further comprising: updating, by the client manager, a start time parameter in response to receipt of the session_resume_rsp.

Example B19 includes the method of examples B017-B18 and/or some other example(s) herein, wherein the session_resume_req includes a unique session ID and a reason for resuming the GMA operation.

Example B20 includes the method of example B19 and/or some other example(s) herein, wherein the reason for resuming the GMA operation includes a client device in which the client manager operates being activated from an idle or sleep state, a screen of the client being turned on, an application operated by the client being activated or executed, one or more packets being sent over a delivery connection, a total throughput being at or above a throughput threshold amount of, and a link quality of a delivery connection being at or above a link quality threshold.

Example B21 includes the method of examples B01-B20 and/or some other example(s) herein, further comprising: sending, by the client manager during the discovery and capability exchange procedure, a discovery message to the network manager; and receiving, by the client manager during the discovery and capability exchange procedure, a system information message from the network manager.

Example B22 includes the method of examples B01-B21 and/or some other example(s) herein, further comprising: selecting, by the client manager, one or more delivery connections of a plurality of delivery connections over which to send one or more management messages to the network manager based on a current state of the client manager.

Example B23 includes the method of example B22 and/or some other example(s) herein, further comprising: selecting, by the client manager, one or more delivery connections of the plurality of delivery connections over which to send one or more data packets based on the current state of the client manager.

Example B24 includes the method of examples B22-B23 and/or some other example(s) herein, wherein the current state of the client manager is based on one or more of a congestion level of each delivery connection of the plurality of delivery connections, a signal quality of each delivery connection, a total throughput of each delivery connection, an amount of time each delivery connection is lost or disconnected, and an idle or inactive time of the client in which the client manager is operating.

Example B25 includes the method of examples B01-B24 and/or some other example(s) herein, wherein the multi-access communication environment is a Multi-Access Management Services (MAMS) communication environment.

Example B26 includes the method of example B25 and/or some other example(s) herein, wherein the MAMS communication environment comprises a Multi-Access Management Services (MAMS) framework.

Example B27 includes the method of examples B21-B26 and/or some other example(s) herein, wherein the discovery message is a multi-access discover message (mx_discover).

Example B28 includes the method of examples B21-B27 and/or some other example(s) herein, wherein the system information message is a multi-access system information (mx_system_info) message.

Example B29 includes the method of examples B17-B28 and/or some other example(s) herein, wherein the session_resume_req is a multi-access session resume request (mx_session_resume_req) message.

Example B30 includes the method of examples B17-B29 and/or some other example(s) herein, wherein the session_resume_rsp is a multi-access session resume response (mx_session_resume_rsp) message.

Example B31 includes the method of examples B09-B30 and/or some other example(s) herein, wherein the UP configuration procedure is a MAMS user-plane configuration procedure.

Example B32 includes the method of examples B09-B31 and/or some other example(s) herein, wherein the up_setup_conf_req is a multi-access user-plane setup configuration request (mx_up_setup_conf_req) message.

Example B33 includes the method of examples B09-B32 and/or some other example(s) herein, wherein the up_setup_conf_cnf is a multi-access user-plane setup configuration confirmation (mx_up_setup_conf_cnf) message.

Example B34 includes the method of examples B09-B33 and/or some other example(s) herein, wherein the one or more data proxy instances are one or more Multi-Access Data Proxy (MADP) instances.

Example B35 includes the method of examples B09-B34 and/or some other example(s) herein, wherein the one or more anchor connection configurations are one or more multi-access (MX) configurations.

Example B36 includes the method of examples B12-B35 and/or some other example(s) herein, wherein the configuration ID is an MX configuration ID.

Example B37 includes the method of examples B12-B36 and/or some other example(s) herein, wherein the convergence method is an MX convergence method.

Example B38 includes the method of example B37 and/or some other example(s) herein, wherein the MX convergence method is one of Generic Multi-Access (GMA), MultiPath Transmission Control Protocol (MPTCP) Proxy, Generic Routing Encapsulation (GRE) Aggregation Proxy, and MultiPath MPQUIC.

Example B39 includes the method of examples B12-B38 and/or some other example(s) herein, wherein the convergence method parameters are MX convergence method parameters.

Example B40 includes the method of example B39 and/or some other example(s) herein, wherein the MX convergence method parameters include a convergence proxy Internet Protocol (IP) address, a convergence proxy port, and a client key.

Example B41 includes the method of examples B12-B40 and/or some other example(s) herein, wherein the convergence control parameters are MX convergence control parameters.

Example B42 includes the method of example B41 and/or some other example(s) herein, wherein the MX convergence control parameters include a User Datagram Protocol (UDP) port number for sending and receiving MX control protocol data units (PDUs) and a convergence proxy port.

Example B43 includes the method of examples B12-B42 and/or some other example(s) herein, wherein the adaptation method is an MX adaptation method.

Example B44 includes the method of example B43 and/or some other example(s) herein, wherein the MX adaptation method is one of UDP without Datagram Transport Layer Security (DTLS), UDP with DTLS, Internet Protocol Security Protocol (IPSec), or client Network Address Translation (NAT).

Example B45 includes the method of examples B12-B44 and/or some other example(s) herein, wherein the adaptation method parameters are MX adaptation method parameters.

Example B46 includes the method of example B45 and/or some other example(s) herein, wherein the MX adaptation method parameters include one or more of tunnel endpoint IP address, tunnel endpoint port, shared secret, and header optimization (included only if the MX Convergence Method is GMA).

Example B47 includes the method of examples B01-B46 and/or some other example(s) herein, wherein the cap_req is a multi-access capability request (mx_capability_req) message.

Example B48 includes the method of examples B01-B47 and/or some other example(s) herein, wherein the cap_rsp a multi-access capability response (mx_capability_rsp) message.

Example B49 includes the method of examples B01-B48 and/or some other example(s) herein, wherein the discovery and capability exchange procedure is a MAMS discovery and capability exchange procedure.

Example B50 includes the method of examples B01-B49 and/or some other example(s) herein, wherein the previous session is a previous MAMS session and the current session is a current MAMS session.

Example B51 includes the method of examples B01-B50 and/or some other example(s) herein, wherein the virtual network address is a network address of a virtual private network (VPN).

Example B52 includes the method of example B51 and/or some other example(s) herein, wherein the virtual network address is a network address selected from a group comprising: a Closed Access Group Identifier (CAG-ID), a Bluetooth hardware device address (BD_ADDR), an Access Point Name (APN), an Access and Mobility Management Function (AMF) identifier (ID), an Application Function (AF)-Service-Identifier, an application ID, an Edge Application Server (EAS) ID, a Data Network Access Identifier (DNAI), a Data Network Name (DNN), an email address, an Electronic Product Code (EPC) as defined by the EPCglobal Tag Data Standard, an endpoint address, an Enterprise Application Server (EAS) ID, an EPS Bearer Identity (EBI), an Equipment Identity Register (EIR), an Extended Unique Identifier (EUI), a Fully Qualified Domain Name (FQDN), a Group ID for Network Selection (GIN), a Generic Public Subscription Identifier (GPSI), a Globally Unique AMF Identifier (GUAMI), a Globally Unique Temporary Identifier (GUTI), an internet protocol (IP) address, an internet packet exchange (IPX) address, an International Mobile Equipment Identity (IMEI), an IMEI Type Allocation Code (IMEA/TAC), an International Mobile Subscriber Identity (IMSI), a Local Area Data Network (LADN) DNN, a Local Area Network (LAN) ID, a media access control (MAC) address, a Mobile Subscriber Identification Number (MSIN), a Mobile Subscriber/Station ISDN Number (MSISDN), a Network identifier (NID), aNetwork Slice Instance (NSI) ID, personal area network (PAN) ID, aPermanent Equipment Identifier (PEI), a Public Land Mobile Network (PLMN) ID, a Quality of Service (QoS) Flow ID (QFI), a 5G QoS Identifier (5QI), Quick UDP Internet Connections (QUIC) connection ID, a Radio Access Network (RAN) ID, a Radio-Frequency Identification (RFID) tag, a Routing Indicator, a service set identifier (SSID), a short message service (SMS) Function (SMSF) ID, a Standalone Non-Public Network (SNPN) ID, a Subscription Concealed Identifier (SUCI), a Subscription Permanent Identifier (SUPI), a telephone numbers in a public switched telephone network (PTSN), a Temporary Mobile Subscriber Identity (TMSI), one or more Transmission Control Protocol (TCP) port numbers, a user equipment (UE) Access Category and Identity, one or more UDP port numbers, a universally unique identifier (UUID), a Universal Resource Identifier (URI), a Universal Resource Locator (URL), Virtual LAN (VLAN) ID, an X.21 address, an X.25 address, a Zigbee® ID, and a Zigbee® Device Network ID.

Example B53 includes the method of examples B01-52 and/or some other example(s) herein, wherein the network manager is a Network Connection Manager (NCM).

Example B54 includes the method of examples B01-53 and/or some other example(s) herein, wherein the network manager is implemented in a gateway device, a radio access network node, a network appliance, a network function within a core network, an application server, an edge server of an edge computing network, or a server of a cloud computing service.

Example B55 includes the method of examples B01-54 and/or some other example(s) herein, wherein the client manager is a Client Connection Manager (CCM).

Example B56 includes the method of examples B01-55 and/or some other example(s) herein, wherein the client manager is implemented in a desktop computer, a workstation, a smartphone, a tablet computer, a wearable device, an Internet of Things (IoT) device, or a smart appliance.

Example 101 includes a cloud-based OTT MAMS service model, in which MAMS server is deployed as part of cloud service instead of in the (access) network. Example 102 includes a method to allow a virtual connection operates as the MAMS anchor connection. Example 103 includes information in the MX System Info message to indicate the anchor connection is a virtual connection. Example 104 includes information in the MX UP Setup Config message to provide all the configuration parameter of the virtual connection, e.g. client network address (e.g., IP address or the like), gateway address, and DNS address. Example 105 includes an apparatus configurable to operate the method of examples A01-A03, B01-B56, and/or I02 using the information and/or messages of examples I03-I04.

An example implementation is an edge computing system, including respective edge processing devices and nodes to invoke or perform the operations of examples A01-A03, B01-B56, I01-I05, or other subject matter described herein. Another example implementation is a client endpoint node, operable to invoke or perform the operations of examples A01-A03, B01-B56, I01-I05, or other subject matter described herein. Another example implementation is an aggregation node, network hub node, gateway node, or core data processing node, within or coupled to an edge computing system, operable to invoke or perform the operations of examples A01-A03, B01-B56, I01-I05, or other subject matter described herein. Another example implementation is an access point, base station, road-side unit, street-side unit, or on-premise unit, within or coupled to an edge computing system, operable to invoke or perform the operations of examples A01-A03, B01-B56, I01-I05, or other subject matter described herein. Another example implementation is an edge provisioning node, service orchestration node, application orchestration node, or multi-tenant management node, within or coupled to an edge computing system, operable to invoke or perform the operations of examples A01-A03, B01-B56, I01-I05, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of examples A01-A03, B01-B56, I01-I05, or other subject matter described herein. Another example implementation is an edge computing system operable as an edge mesh, as an edge mesh with side car loading, or with mesh-to-mesh communications, operable to invoke or perform the operations of examples A01-A03, B01-B56, I01-I05, or other subject matter described herein. Another example implementation is an edge computing system including aspects of network functions, acceleration functions, acceleration hardware, storage hardware, or computation hardware resources, operable to invoke or perform the use cases discussed herein, with use of examples A01-A03, B01-B56, I01-I05, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples A01-A03, B01-B56, I01-I05, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples A01-A03, B01-B56, I01-I05, or other subject matter described herein.

Example Z01 includes one or more computer readable media comprising instructions, wherein execution of the instructions by processor circuitry is to cause the processor circuitry to perform the method of examples A01-A03, B01-B56, I01-I05.

Example Z02 includes a computer program comprising the instructions of example Z01.

Example Z03 includes an Application Programming Interface defining functions, methods, variables, data structures, and/or protocols for the computer program of example Z02.

Example Z04 includes an apparatus comprising circuitry loaded with the instructions of example Z01.

Example Z05 includes an apparatus comprising circuitry operable to run the instructions of example Z01.

Example Z06 includes an integrated circuit comprising one or more of the processor circuitry of example Z01 and the one or more computer readable media of example Z01.

Example Z07 includes a computing system comprising the one or more computer readable media and the processor circuitry of example Z01.

Example Z08 includes an apparatus comprising means for executing the instructions of example Z01.

Example Z09 includes a signal generated as a result of executing the instructions of example Z01.

Example Z10 includes a data unit generated as a result of executing the instructions of example Z01.

Example Z 11 includes the data unit of example Z10, wherein the data unit is a datagram, network packet, data frame, data segment, a PDU, a service data unit (SDU), a message, or a database object.

Example Z12 includes a signal encoded with the data unit of example Z10 or Z11.

Example Z13 includes an electromagnetic signal carrying the instructions of example Z01.

Example Z14 includes an apparatus comprising means for performing the method of examples A01-A03, B01-B56, I01-I05.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a stand-alone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The "RAT type" identifies the transmission technology used in an access network, for example, new radio (NR), narrowband IoT (NB-IOT), Untrusted Non-3GPP, Trusted Non-3GPP, Trusted IEEE 802.11, Non-3GPP access, Wireline, Wireline-Cable, Wireline Broadband Forum (wireline-BBF), etc.

The term "V2X" refers to vehicle to vehicle (V2V), vehicle to infrastructure (V21), infrastructure to vehicle (12V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel"

may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "session" refers to a temporary and interactive information interchange between two or more communicating devices, two or more application instances, between a computer and user, or between any two or more entities or elements.

The term "Data Network" or "DN" refers to a network hosting data-centric services such as, for example, operator services, the internet, third-party services, or enterprise networks. Additionally or alternatively, a DN refers to service networks that belong to an operator or third party, which are offered as a service to a client or user equipment (UE). DNs are sometimes referred to as "Packet Data Networks" or "PDNs". The term "Local Area Data Network" or "LADN" refers to a DN that is accessible by the UE only in specific locations, that provides connectivity to a specific DNN, and whose availability is provided to the UE.

The term "PDU Connectivity Service" refers to a service that provides exchange of protocol data units (PDUs) between a UE and a DN. The term "PDU Session" refers to an association between a UE and a DN that provides a PDU connectivity service. A PDU Session type can be IPv4, IPv6, IPv4v 6, Ethernet, Unstructured, or any other network/connection type, such as those discussed herein. The term "MA PDU Session" refers to a PDU Session that provides a PDU connectivity service, which can use one access network at a time or multiple access networks simultaneously.

The term "core" as used herein refers to a functional element that anchors a client network address (e.g., IP address) used for communication with applications via the network. The term "anchor connection" as used herein refers to the network path from a network element (e.g., an N-MADP) to a UP gateway (e.g., IP anchor) that has assigned a network address (e.g., IP address) to a client. The term "delivery connection" as used herein refers a network path from a network element (e.g., an N-MADP) to a client.

The term "network address" refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof. The term "application identifier", "application ID", or "app ID" refers to an identifier that can be mapped to a specific application or application instance; in the context of 3GPP 5G/NR systems, an "application identifier" may refer to an identifier that can be mapped to a specific application traffic detection rule. An "endpoint address" may refer to an address used to determine the host/authority part of a target URI, where the target URI is used to access an NF service (e.g., to invoke service operations) of an NF service producer or for notifications to an NF service consumer. The term "CAG-ID" refers to an identifier of a Closed Access Group (CAG), and the term "closed access group" or "CAG" refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "port" as used herein (e.g., in the context of computer networks) refers to a communication endpoint, a virtual data connection between two or more entities, and/or a virtual point where network connections start and end; additionally or alternatively, a "port" is associated with a specific process or service.

The term "subnetwork" or "subnet" refers to a logical subdivision of a network, such as an IP network. The practice of dividing a network into two or more networks is called "subnetting." The term "netmask" or "subnet mask" refers to a bitmask applied by bitwise AND operations to a network address (e.g., an IP address in an IP network) to yield a routing prefix, and/or is a 32-bit "mask" used to divide an IP address into subnets and specify the network's available hosts.

The term "Residential Gateway" or "RG" refers to a device providing, for example, voice, data, broadcast video, video on demand, to other devices in customer premises. The term "Wireline 5G Access Network" or "W-5GAN" refers to a wireline AN that connects to a 5GC via N2 and N3 reference points. The W-5GAN can be either a W-5GBAN or W-5GCAN. The term "Wireline 5G Cable Access Network" or "W-5GCAN" refers to an Access Network defined in/by CableLabs. The term "Wireline BBF Access Network" or "W-5GBAN" refers to an Access Network defined in/by the Broadband Forum (BBF). The term "Wireline Access Gateway Function" or "W-AGF" refers to a Network function in W-5GAN that provides connectivity to a 3GPP 5G Core network (5GC) to 5G-RG and/or FN-RG. The term "5G-RG" refers to an RG capable of connecting to a 5GC playing the role of a user equipment with regard to the 5GC; it supports secure element and exchanges N1 signaling with 5GC. The 5G-RG can be either a 5G-BRG or 5G-CRG.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.).

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

We claim:

1. An apparatus employed as a client manager for configuration of a multi-access communication in a multi-access communication environment, the apparatus comprising:
   network interface circuitry to send during a discovery and capability exchange procedure, a capability request message (cap_req) to a network manager, wherein the cap_req includes a virtual network address used in a previous session; and
   processor circuitry connected to memory circuitry and network interface circuitry, wherein the processor circuitry is to receive, via the network interface circuitry during the discovery and capability exchange procedure, a capability response message (cap_rsp) from the network manager, wherein the cap_rsp includes a unique session identifier (ID) for a current session.

2. The apparatus of claim 1, wherein the previous session is an immediately preceding session.

3. The apparatus of claim 1, wherein the cap_req includes one or more of a last_session_id field, including a unique session ID of the previous session; a last_ip_address field, including the virtual network address; and a device_type field, including a device type of a device that implements the client manager.

4. The apparatus of claim 1, wherein the cap_rsp includes a number of anchor connections parameter, wherein the number of anchor connections parameter indicates a number of anchor connections supported by the network manager.

5. The apparatus of claim 4, wherein the processor circuitry is to:
stop the discovery and capability exchange procedure when the number of anchor connections parameter in the cap_rsp is set to "0"; and
wait for a next event to restart the discovery and capability exchange procedure.

6. The apparatus of claim 1, wherein:
the processor circuitry is to receive, during a user-plane (UP) configuration procedure, a UP setup configuration request message (up_setup_conf_req) from the network manager, wherein the up_setup_conf_req includes information to create one or more data proxy instances, each of the one or more data proxy instances includes a respective anchor connection, and each respective anchor connection includes one or more anchor connection configurations; and
the network interface circuitry is to send, during the UP configuration procedure, a UP setup configuration confirmation message (up_setup_conf_cnf) to the network manager, wherein the up_setup_conf_cnf includes a set of virtual network configuration parameters for configuring a virtual network interface.

7. The apparatus of claim 6, wherein the up_setup_conf_req includes:
a number of anchor connections,
for each anchor connection of the number of anchor connections, an anchor connection identifier (ID), a connection type, and a number of active connection configurations;
for each active connection configuration of the number of active connection configurations, a configuration ID, a convergence method, a set of convergence method parameters, a set of convergence control parameters, and a number of delivery connections, and
for each delivery connection of the number of delivery connections, a delivery connection ID, connection type, an adaptation method, and a set of adaptation method parameters.

8. The apparatus of claim 6, wherein the up_setup_conf_cnf includes a unique session identifier (ID), a set of Generic Multi-Access (GMA) client configuration parameters, and a list of applications permitted to use GMA optimizations, wherein the virtual network configuration parameters include a network address of the virtual network, a gateway of the virtual network, a Domain Name Service (DNS) server of the virtual network, and a network mask of the virtual network.

9. The apparatus of claim 1, wherein:
the network interface circuitry is to send, during a traffic splitting procedure, a session resume request message (session_resume_req) to the network manager, the session_resume_req to notify the network manager that GMA operation has resumed and to synchronize with the network manager; and
the processor circuitry is to:
receive a session resume response message (session_resume_rsp) message from the network manager for the synchronization, and
update a start time parameter in response to receipt of the session_resume_rsp,
wherein the session_resume_req includes a unique session ID and a reason for resuming the GMA operation, and the reason for resuming the GMA operation includes one or more of:
a client device in which the client manager operates being activated from an idle or sleep state, a screen of the client being turned on, an application operated by the client being activated or executed, one or more packets being sent over a delivery connection, a total throughput being at or above a throughput threshold, and a link quality of a delivery connection being at or above a link quality threshold.

10. The apparatus of claim 1, wherein:
the network interface circuitry is to send, during the discovery and capability exchange procedure, a discovery message to the network manager; and
the processor circuitry is to receive, during the discovery and capability exchange procedure, a system information message from the network manager.

11. The apparatus of claim 1, wherein the processor circuitry is to:
select one or more delivery connections of a plurality of delivery connections over which to send one or more management messages to the network manager based on a current state of the client manager; and
select one or more delivery connections of the plurality of delivery connections over which to send one or more data packets based on the current state of the client manager,
wherein the current state of the client manager is based on one or more of a congestion level of each delivery connection of the plurality of delivery connections, a signal quality of each delivery connection, a total throughput of each delivery connection, an amount of time each delivery connection is lost or disconnected, and an idle or inactive time of the client in which the client manager is operating.

12. The apparatus of claim 1, wherein:
the client manager is implemented in a desktop computer, a workstation, a smartphone, a tablet computer, a wearable device, an Internet of Things (IoT) device, or a smart appliance, and
the network manager is implemented in a gateway device, a radio access network node, a network appliance, a network function within a core network, an application server, an edge server of an edge computing network, or a server of a cloud computing service.

13. One or more non-transitory computer readable media (NTCRM) comprising instructions for configuration of a multi-access (MX) communication in a Multi-Access Management Services (MAMS), wherein execution of the instructions by one or more processors of a Client Connection Manager (CCM) is to cause the CCM to:
send, during a MAMS discovery and capability exchange procedure, an MX capability request message (mx_capability_req) to a Network Connection Manager (NCM), wherein the mx_capability_req includes a virtual private network (VPN) address used in a previous MAMS session; and
receive, during the MAMS discovery and capability exchange procedure, an MX capability response message (mx_capability_rsp) from the NCM, wherein the mx_capability_rsp includes a unique session identifier (ID) for a current MAMS session.

14. The one or more NTCRM of claim 13, wherein the mx_capability_req includes one or more of a last_session_id field, including a unique session ID of the previous MAMS session; a last_ip_address field, including the VPN address; and a device type field including a device type of a device that implements the client manager.

15. The one or more NTCRM of claim 13, wherein the mx_capability_rsp includes a number of anchor connections parameter, wherein the number of anchor connections parameter indicates a number of anchor connections supported by the NCM, and execution of the instructions is to cause the CCM to:

stop the MAMS discovery and capability exchange procedure when the number of anchor connections parameter in the mx_capability_rsp is set to "0"; and wait for a next event to restart the MAMS discovery and capability exchange procedure.

16. The one or more NTCRM of claim 13, wherein execution of the instructions is to cause the CCM to:

receive, during a MAMS user-plane (UP) configuration procedure, an MX user-plane setup configuration request message (mx_up_setup_conf_req) from the NCM, wherein the mx_up_setup_conf_req includes information to create one or more Multi-Access Data Proxy (MADP) instances, wherein each of the one or more MADP instances includes a respective anchor connection, and each respective anchor connection includes one or more MX configurations; and send, during the MAMS UP configuration procedure, an MX user-plane setup configuration confirmation message (mx_up_setup_conf_cnf) to the NCM, wherein the mx_up_setup_conf_cnf includes VPN configuration parameters for configuring a virtual network interface.

17. The one or more NTCRM of claim 16, wherein the mx_setup_conf_req includes:

a number of anchor connections, for each anchor connection of the number of anchor connections, an anchor connection identifier (ID), a connection type, and a number of active connection configurations, for each active connection configuration of the number of active connection configurations, an MX configuration ID, an MX convergence method, a set of MX convergence method parameters, a set of MX convergence control parameters, and a number of delivery connections, and for each delivery connection of the number of delivery connections, a delivery connection ID, connection type, an MX adaptation method, and a set of MX adaptation method parameters.

18. The one or more NTCRM of claim 17, wherein:

the MX convergence method is one of Generic Multi-Access (GMA), MultiPath Transmission Control Protocol (MPTCP) Proxy, Generic Routing Encapsulation (GRE) Aggregation Proxy, and MultiPath QUIC (MPQUIC);

the MX convergence method parameters include a convergence proxy Internet Protocol (IP) address, a convergence proxy port, and a client key;

the set of MX convergence control parameters include a User Datagram Protocol (UDP) port number for sending and receiving MX control protocol data units (PDUs) and a convergence proxy port;

the MX adaptation method is one of UDP without Datagram Transport Layer Security (DTLS), UDP with DTLS, Internet Protocol Security (IPSec), or client Network Address Translation (NAT);

the set of MX adaptation method parameters include one or more of tunnel endpoint IP address, tunnel endpoint port, shared secret, and header optimization when the MX convergence method is GMA.

19. The one or more NTCRM of claim 16, wherein the up_setup_conf_cnf includes:

a unique session ID;

a set of GMA client configuration parameters; and a list of applications permitted to use GMA optimizations, wherein the VPN configuration parameters include a network address of the VPN, a gateway of the VPN, a Domain Name Service (DNS) server of the VPN, and a network mask of the VPN.

20. The one or more NTCRM of claim 13, wherein execution of the instructions is to cause the CCM to:

send, during a traffic splitting procedure, an MX session resume request message (mx_session_resume_req) to the NCM, wherein the mx_session_resume_req to notify the NCM that Generic Multi-Access (GMA) operation has resumed and to synchronize with the NCM;

receive an MX session resume response message (mx_session_resume_rsp) from the NCM for the synchronization; and update a start time parameter in response to receipt of the mx_session_resume_rsp, wherein the mx_session_resume_req includes a unique session ID and a reason for resuming the GMA operation, and the reason for resuming the GMA operation includes one or more of: a client device in which the client manager operates being activated from an idle or sleep state, a screen of the client being turned on, an application operated by the client being activated or executed, one or more packets being sent over a delivery connection, a total throughput being at or above a throughput threshold, and a link quality of a delivery connection being at or above a link quality threshold.

21. The one or more NTCRM of claim 13, wherein execution of the instructions is to cause the CCM to:

send, by the client manager during the MAMS discovery and capability exchange procedure, an MX discover message (mx_discover) to the NCM; and receive, by the client manager during the MAMS discovery and capability exchange procedure, an MX system information message (mx_system_info) from the NCM.

22. The one or more NTCRM of claim 13, wherein execution of the instructions is to cause the CCM to:

select one or more delivery connections of a plurality of delivery connections over which to send one or more management messages to the NCM based on a current state of the client manager; and select one or more delivery connections of the plurality of delivery connections over which to send one or more data packets based on the current state of the client manager, wherein the current state of the client manager is based on one or more of a congestion level of each delivery connection of the plurality of delivery connections, a signal quality of each delivery connection, a total throughput of each delivery connection, an amount of time each delivery connection is lost or disconnected, and an idle or inactive time of the client in which the client manager is operating.

23. A method for configuration of a multi-access communication in a multi-access communication environment, the method comprising:

during a discovery and capability exchange procedure, receiving, by a network manager, a capability request message (cap_req) to a client manager, wherein the cap_req includes a virtual network address used in a previous session;

sending, by the network manager, a capability response message (cap_rsp) from the network manager, wherein the cap_rsp includes a unique session identifier (ID) for a current session;

receiving, by the network manager, a discovery message from the client manager; and sending, by the network manager, a system information message to the client manager.

24. The method of claim 23, wherein the method includes:

sending, by the network manager during a user-plane (UP) configuration procedure, a UP setup configuration request message (up_setup_conf_req) to the client manager, wherein the up_setup_conf_req includes information to create one or more data proxy instances, each of the one or more data proxy instances includes a respective anchor connection, and each respective anchor connection includes one or more anchor connection configurations; and receiving, by the network manager during the UP configuration procedure, a UP setup configuration confirmation message (up_setup_conf_cnf) from the client manager, wherein the up_setup_conf_cnf includes a set of virtual network configuration parameters for configuring a virtual network interface.

25. The method of claim 23, wherein the method includes:

receiving, by the network manager during a traffic splitting procedure, a session resume request message from the client manager, wherein the session resume request message is to notify the network manager that Generic Multi-Access (GMA) operation has resumed; and sending, by the network manager, a session resume response message to the client manager for synchronizing with the client manager, wherein the session resume response message is to cause the client manager to update a start time parameter.

\* \* \* \* \*